United States Patent [19]
DeMent

[11] 3,715,596
[45] Feb. 6, 1973

[54] TELLURIAN OPTOEXPLOSIVE SYSTEM INCLUDING NUCLEAR EXPLOSIVE LIGHT GENERATOR AND TARGET IRRADIATION

[76] Inventor: Jack DeMent, 4847 S.E. Division Street, Portland, Oreg. 97206

[22] Filed: Aug. 7, 1968

[21] Appl. No.: 750,979

Related U.S. Application Data

[63] Continuation-in-part of Ser. No. 407,461, Oct. 29, 1964, Pat. No. 3,414,838.

[52] U.S. Cl..................250/84, 33/1 HH, 73/35, 240/1 R, 331/94.5, 350/161, 250/83 R
[51] Int. Cl................................................G21h 5/03
[58] Field of Search..........331/94.5; 240/1 R; 250/84

[56] References Cited

UNITED STATES PATENTS

3,300,734   1/1967   DeMent ..............................331/94.5

*Primary Examiner*—Roy Lake
*Assistant Examiner*—Darwin R. Hostetter

[57] ABSTRACT

This disclosure relates to a tellurian(underground) system(an explotron) for the close-in treatment of an irradiable target by explosion-formed electromagnetic energies characterized as reflectable off a frangible reflective optic such that the target is not overwhelmed by non-reflectable explosion energies like blast and plasma. A typical tellurian explotron is a main duct horizontally sited below the ground, within one end of which is positioned and fired a mass of chemical or nuclear explosive (the optoexplosive) that generates electromagnetic and kinetic energies. Junctured midway or at any other convenient site along the main duct is at least one ductoid branch member, which rises to the ground surface and couples with the irradiable target. At the furcation of main duct and branch there is emplaced at a suitable angle a frangible reflective optic such as an aluminum foil mirror which delivers the faster-moving, reflectable radiation via the branch to the target, while the slower-moving, non-reflectable energies transit the main duct and break out the frangible reflective optic, being deposited in the opposite end of the main duct(the shock sink).

25 Claims, 8 Drawing Figures

PATENTED FEB 6 1973 3,715,596

PATENTED FEB 6 1973

TELLURIAN OPTOEXPLOSIVE SYSTEM INCLUDING NUCLEAR EXPLOSIVE LIGHT GENERATOR AND TARGET IRRADIATION

This is a continuation-in-part of my U.S. Ser. No. 407,461, filed Oct. 29, 1964, titled "Explodable Light Source and Laser Light Generator", now U.S. Pat. No. 3,414,838, granted Dec. 3, 1968, filed Oct. 29, 1964.

This invention relates to optoexplosive systems, particularly those of the tellurian variety, which employ chemical explosives or explosions(CX) and nuclear explosives or explosions(NX), generally of substantial yield, for the production of certain electromagnetic radiations.

These electromagnetic radiations include those lying in the long wavelength(or so-called soft) X-ray, ultraviolet, visible, infrared, and/or the trans-infrared portions of the spectrum.

The present improvement also includes target irradiation, as well as nuclear explosive light generation. Additionally there is included light pulse generation of sinusoid nature, also a new family of optics—which I designate as frangible reflective optics(FRO).

In addition to the feature of light generation by CX and NX explosions, this improvement is characterized by light (which term will be taken to broadly include the electromagnetic spectrum just delineated, and further explained below) substantially free of blast(or shock), explosion debris, highly penetrating electromagnetic and particulate radiation, and the like, depending upon the explosive employed.

This disclosure includes the following sections:
Objects — Features
Drawings
Geoengineering — Systems Design
Frangible Reflective Optics
Chemical Optoexplosives
Nuclear Optoexplosives
Optoexplosion Modifiers
Beam Manipulation — Large Area Optics
Irradiable Target In my presentation I have liberally cross-referenced in an endeavor to tie the many facets of this broad subject into a coherent package.

Since this and the parent invention encompass many branches of the arts, sciences and industries—and is a highly multi-disciplinary engineering and systems design entity—it is necessary for me to: (a) explain certain of the relevant facts in the one or more specialties which may otherwise not be clear to those in other specialties, theoretical and/or applied; (b) provide a consistent nomenclature and terminology derived substantially from the various specialties wherever the need may be evident, including the sparse use of acronyms for convenience and brevity, also to point up the novelty of the large family of optoexplosive systems—tellurian or other; and (c) cite and give pertinent, relevant and follow-through literature and sources of information which the artizan, student or other interested party can get a basis in-depth understanding of the phenomena of separation of light from shock in an explosive light source, which information is not always necessary or practicable to set out in lengthy discourse herein.

Herein I employ the term "light" in a generic sense, to include electromagnetic radiation defined as "optical radiation" lying within the "optical spectrum." The optical spectrum is taken to mean that portion of the electromagnetic spectrum between approximately $10^{-2}$ and $10^3$ microns. This definition agrees with good physics practice in that the ultraviolet, visible and infrared radiations can be thought of collectively as the optical spectrum not only due to similar emission processes, but also due to common experimental techniques such as the use of lenses and mirrors for focusing the radiation and prisms and gratings for separating the constituent wavelengths, as well as filters, polarizers and like optic elements for imparting some special characteristic to a light beam. The end points of the spectrum are rather arbitrary. On the long wavelength end the infrared and microwaves overlap(hence my use of the term "trans-infrared," supra). The same is true where X-rays and ultraviolet merge, at about $10^{-2}$ microns(100 Angstroms(A)). Division of the various regions into near, intermediate, far, and extreme, differ somewhat among physicists, and the standard literature is referred to for information of this kind. Depending upon the discipline the wavelengths units may differ, e.g., the micron for the infrared, the millimicron(or nanometer) for the visible, and the Angstrom for the ultraviolet and soft-X-ray. Herein, these units may be used interchangeably.

While I prefer to utilize highly reflective, mirror-like substances of the conventional kinds(e.g., polished metals) in the make-up of an FRO, I particularly point out that when I employ terms like "reflection" and "reflective" I use them in the context of optics, physical optics and like disciplines. Thus: when light(as defined herein) strikes a boundary separating two media(more than two can be involved) of different refractivities, some of the light is specularly reflected, some is scattered or diffusely reflected, and the remainder enters the second medium. The amount specularly reflected depends upon both the angle of incidence, $i$, and the polarization of the incident light. To the best of my knowledge, for explosive light sources very little factual data are available on polarized explosion light. Unless $\angle i = 0$, the reflected light is plane-polarized(partially), even when the incident light is not. The component has its electric vector perpendicular to the plane of $i$(i.e., polarized in the plane of incidence) and is more strongly reflected than the other. As $i$ increases from 0° to 90° the ratio of the reflectivities of the two components passes through a maximum, called the Brewster angle and given by the relation $\tan \angle i = n$. At the Brewster angle the reflected light is almost completely plane-polarized.

The reflectivity or reflectance, R, is the ratio $R = I_r/I_i$ where $I_i$ and $I_r$ are the intensities of the incident and of the specularly reflected light, respectively. Neglecting absorption and scattering the reflectivity of a transparent medium is $$R_p = \sin^2(i-r)/\sin^2(i+r)$$

if the incident light is plane-polarized in the plane of $i$(i.e., electric vector parallel to the reflecting surface); and $$R_n = \tan^2(i-r)/\tan^2(i+r)$$

if it is plane-polarized normal to the plane of incidence, wherein $i$ is the angle of incidence and $r$ that of refraction.

If the incident light is unpolarized, as appears to be the case of a symmetric or spheroidal explosion of CX or NX, then R should be half the sum of the two foregoing expressions. In the case of an asymmetric, directed-energy or other specialty CX or NX explosion(or explosive light source) it should be expected that R should lie between 0.5 and 1.0.

As the index of refraction of the second medium(the FRO in this case) with reference to the first medium(loading gas or environmental medium in this case) is $n = \sin i/\sin r$, the expressions may be derived to the usual fresnel relation of:

If $i = 0$, $R_p = R_n = (n-1)^2/(n+1)^2$

For purposes of orientation the parent invention sets out the extraction of substantially shock free light from an explosive(or explodable) light source whereby there is fired or detonated an explosive light source characterized as generating electromagnetic energies concurrently with non-electromagnetic energies; directing both of the said energies against a frangible optic; reflecting the said electromagnetic energies from the optic; and shortly thereafter by virtue of the inherent velocity differences between the two forms of energy impacting the non-electromagnetic energies upon the frangible, reflective optic to cause the destruction of the optic; and directing the destructed optic together with the non-electromagnetic energies in a direction away from the direction of the reflected electromagnetic energies.

Typically, the frangible optic includes a breakable or like destructible mirror or mirror-optic, e.g., mirror lens or reflection grating, impacted by energies derived from explosives (e.g., solid chemical explosive, hypergolics, and exploded colloidochemical systems(e.g., metal particulates and gases); also, exploding and imploding wires, sheets, tubes and the like).

There is thus derived a large and flexible family of light sources—which I designate by the term EXPLOTRON—typically made up of a T or Y furcated tubular system wherein the frangible, reflective optic is positioned at the crotch so as to receive explosion-generated light and pass same into one arm of the system while into a shock-sink there is subsequently received non-light energies, i.e., blast and the like.

In this invention I refine and extend certain of the basic features of the parent invention. For example, the frangible, reflective optic can be of timed-life character. Typically this is an optic which fails to reflect incident light at some specific or special point in the explosive light pulse, which point may be well before impingement of the subsequent blast. The result is the reflection of a sinusoid fragment or bit of light from that pulse.

Thus, in the double pulse which characterizes many nuclear explosives all of the light energy of the initial or prompt pulse plus a portion of the longer lasting and usually less intense second or delayed pulse can be extracted by timed-life frangible, reflective optic and shunted into an irradiable target.

Furthermore, the frangible, reflective optic(FRO) can in this improvement be either passive or active. In the case of the usual mirror lens system it is passive; in contrast, when energy is introduced into an FRO to give it special optical qualities it can be said to comprise an active FRO. This an similar features are set out in detail hereinafter, including FRO of both simple(e.g., purely reflective) and compound(e.g., reflection-refraction by virtue of an overlay of refractive or other optically active medium) types.

In addition, herein there is set forth explosive light sources which may be symmetric or asymmetric in terms of light release. For example, CX os mass configuration which upon explosion creates light of cruciform nature and distribution.

It is a feature of the present improvement to utilize fully or partially earth or earth-like conduit arrangements in a furcated mode and having at least one frangible reflective optic to separate and shunt the reflective portion of the electromagnetic spectrum into a light leg, away from and substantially freed of blast/shock energies, explosion debris, penetrating radiation, and the like, the combination of the aforesaid reflective electromagnetic radiations and the unwanted and ancillary energies originating together in the explosion of a chemical explosive(CX), a nuclear explosive(NX), or the combination of the two (CX/NX), as may be desired.

It is a feature of this invention to supply to an irradiable target reflected and reflectable light of electromagnetic nature for purposes of absorption by that target.

It is a feature of this improvement to provide (a) ultrahigh power electromagnetic energy fluxes reflected to an irradiable target and/or (b) specific and special light bands characterized by profiles of large aperture, area or the like.

It is a feature of the present invention to select from an explosion pulse, whether it be CX or NX or the like, a sinusoid fragment of light of particular intensity-time configuration and deliver that sinusoid light bit free of blast and extraneous energies to an irradiable target.

Accordingly:

It is an object of this invention to provide method and means for the separation of light from blast and shock, debris, particulate and penetrating, and like energies generated in a chemical or nuclear explosion or both;

It is also an object of this invention to provide explosive method and means for the production of reflectable X-ray(often called soft X-ray), ultraviolet, visible, infrared and transinfrared light in beams of high energy and/or large cross-sectional area, as may be desired;

It is an object hereof to generate light beams originating in a nuclear explosion which may be characterized as free of nuclear blast and debris and unwanted particulate and penetrating nuclear radiations, which light beams I designate as "clean atomic light"(CAL);

Likewise, to generate CAL beams of shaped cross-sectional profile, which CAL beams I designate herein as "shaped atomic light"(SAL);

It is also an object of this invention to produce intense light beams originating in chemical or nuclear explosion and to irradiate an irradiable target with said beams;

It is an object of this improvement to produce high power light pulses characterized as varying in intensity with time, i.e., the sinusoid bits of optical energy disclosed herein.

Other objects of this invention are set out hereinafter.

Traditionally, explosives have been utilized for their blast and shock effects. In fact, the energy which appears as light flash has often been considered undesirable. Generally this may be said to be true of chemical explosives, and, increasingly true of nuclear explosives. Perhaps an exception would be photoflash bombs which are usually designed for aerial use, but which are characterized by a small amount of blast and a relatively long burning time. Perhaps another exception includes nuclear explosions at reduced atmospheric pressure (at high altitudes), where the optical energy output may attain upwards of 80 percent of the overall yield of the device; for present purposes this will have to be regarded as rather coincidental in that it is an environment-dependent quality and not having to do with the design of the NX per se.

Evidently, then, an entire new science and technology—which I call *optoexplosives technology*—opens once it is feasible to (a) extract blast-free light from a chemical or nuclear explosion and (b) optimize CX and NX to liberate larger proportions of their energies as usable optical energies or light than they presently do. The parent invention as well as the instant disclosure provides method and means for attaining (a). The design optimization of conventional CX and, quite particularly, of certain NX for light generation must be regarded as a rather neglected aspect of the overall energy picture.

Thus, nuclear blast is used, as in PLOWSHARE and like nuclear engineering work; and nuclear radiation is used for food or other product irradiation. But apparently little or no attention has been given the production of blast-free and radiation-free nuclear light by NX, let alone its many actual and potential uses.

DRAWINGS

For other objects and features and for a better understanding of the invention, reference is made to the parent disclosure cited supra and to the following detailed description taken in conjunction with the accompanying drawings which, unless otherwise noted hereinafter, may be taken as diagrammatic, sectional, foreshortened, subgrade elevation:

The drawings in brief:

Figure 7:
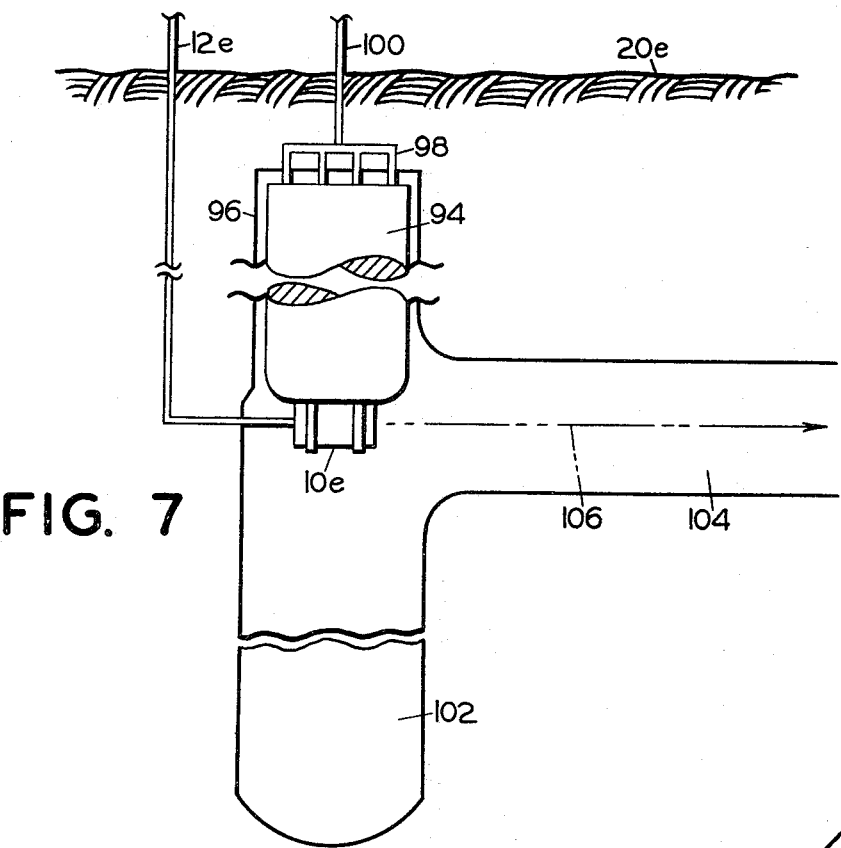
Figure 8:
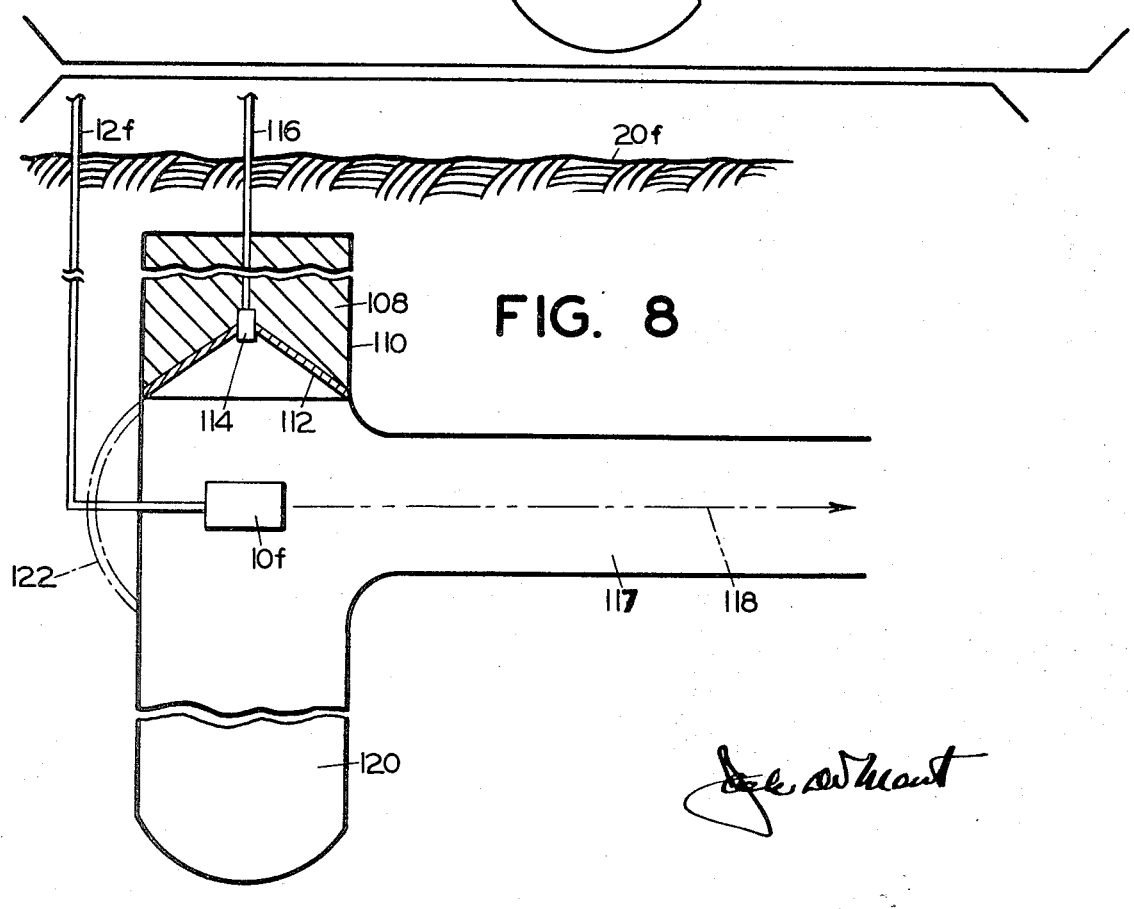

FIG. 7 schematically represents in side elevation a portion of a typical tellurian optoexplosive system of say T-butt configuration wherein interial (falling, sliding or the like) mass is operant; and FIG. 8 is similar to FIG. 7, except that a shaped charge or directed or asymmetric explosive force is involved.

Whereas the accompanying drawings generally portray the present invention in terms of (a) side elevation and (b) tellurian (e.g., subterranean) environment, it is noted that the optoexplosive system may be viewed in plan or other appropriate manner as regards spatial arrangement with respect to ground or surface line or contour. Also that the tellurian optoexplosive system can, as desired and according to the modification hereof, be wholly closed or partially closed, i.e., with access and egress in terms of explosive, target, venting or the like. As will be recognized by those skilled in the art and as detailed subsequently, numerous modifications and variations are feasible. The choice of these will naturally depend upon the parameters involved.

Figure 1:
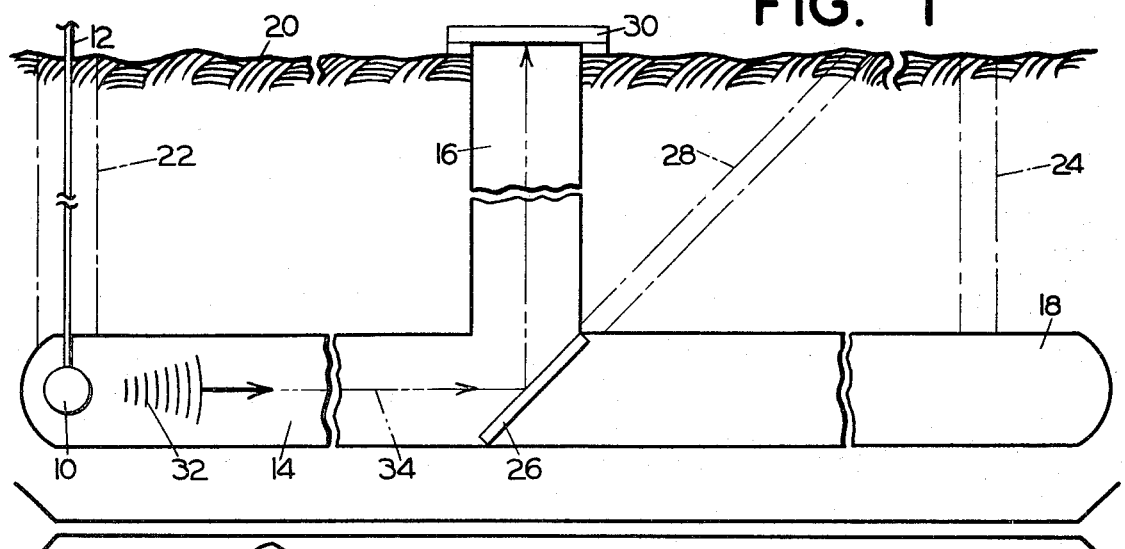
FIG. 1 is in side elevation an optoexplosive system of tellurian character of T-configuration.

Taking the accompanying drawings in detail, with elaboration and modifications subsequently disclosed:

FIG. 1 shows in side elevation a tellurian optoexplosive system characterized by T-configuration. Beneath the surface of the earth (e.g., rock, ice, permafrost or the like) 20, there is a T-shaped tunnel, duct, shaft or like system having three legs 14, 16 and 18. Positioned at or near the end of explosion leg 14 is an explosive device or mass 10, which may be chemical explosive or nuclear explosive or both (CX, NX or CX/NX, respectively), 10 being in communication with firing or detonating cable or the like 12 exiting at 20. Optionally, 14 may have a vent or like duct 22 rising to 20. Optionally, 18 may have a vent or like shaft 24 rising to 20.

Positioned at the juncture or crotch of the T tunnel system, 14, 16, 18, is a frangible, reflective optic 26, which may be a breakable plane or non-plane mirror optic or other frangible, reflective optic (FRO) as hereinafter described. The angular positioning of member 26 is such that it is optically coupled to light passing down 14 and to an irradiable target shown as 30. Thus upon the detonation via 12 and explosion of 10 a prompt burst of light 34 is created, with blast and shock and explosion debris 32 following thereafter, depending upon the nature of 10 and the pressure within the system. Light 34 incidents upon 26 and reflects therefrom to 30. Subsequent blast 32 may destroy the FRO 26, to pass into the shock-sink leg 18.

Further in FIG. 1, FRO 26 may be of such nature that it is characterized by a "timed-life." That is, by virtue of melting, burning, vaporization, explosion, or the like, it ceases to perform as a FRO at a point before the arrival of blast 32, its reflecting lifetime hence deciding the intensity-time qualities of the light pulse reflected into 16. FRO members 26 of a rather large number and wide variety can be employed, and both active and passive FRO members are described later herein.

In FIG. 1 it is noted that the irradiable target 30 is schematically depicted as positioned at the mount of 16 at 20. As may be desired, 30 may be placed in any appropriate position and at any appropriate distance, e.g., mounted upon or within a tower, suspended by balloon, or otherwise positioned in the atmosphere, as long as 30 is optically coupled via 26 to light 34. In the case of explosions of low yield or relatively little destruction to the T system an angular duct 28 can, optionally, be employed to feed subsequent FRO members for a sequence of explosions; 28 may, as desired, also serve as venting means.

Alternatively, in FIG. 1, light leg 16 together with target 30 need not egress at 20. For example, the entire T system can be subterranean and comprise a closed system, in which case 30 may be positioned within a closed leg 16, say within a chamber or at the end of 16.

Figure 2:
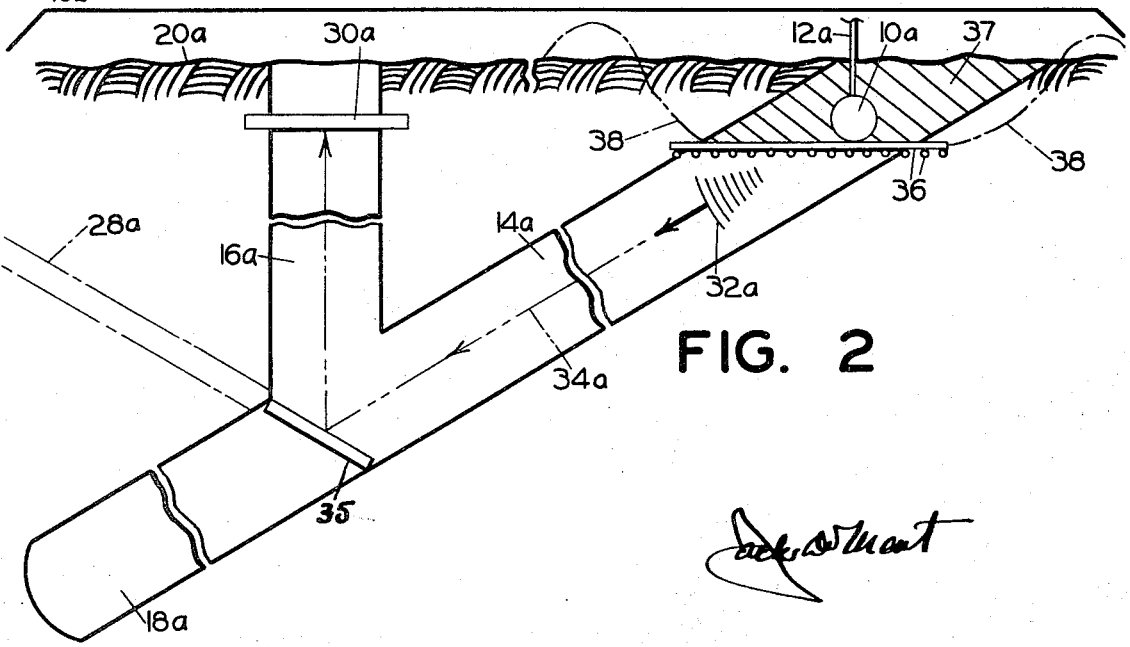
FIG. 2 is in side elevation a tellurian optoexplosive system of Y-configuration.

FIG. 2 shows in side elevation a tellurian optoexplosive system of Y- or acute angle- configuration, i.e., light arm 16a makes an acute angle with respect to 14a(the explosion arm of the system), wherein 10a is the explosive light source and its ancillary firing means 12a positioned in shaft 14a. 10a is placed at or near the ground surface 20a. 10a is supported by cradle, support or like means 36, which is destructible upon explosion, and which may be of appropriate material(e.g., metal, wood, plastic) of sheet, coarse screen or mesh or other appropriate structure. As desired, 10a can be positioned above the surface 20a, as for example in a shot tower. Also, as may be desired, member 36 may be dopant(discussed subsequently) which serves to enhance the optical energy output of the CX or NX 10a.

It is seen that FIG. 2 typically depicts a shallow subsurface explosion, a surface explosion or a near-surface explosion, in contrast to the deeper, contained cavity-producing explosion of 10 in FIG. 1. The consequence in FIG. 2 is an explosively-formed crater 38, which follows blast scaling laws known in the art. The fill material 37 is optional, depending upon the modification being utilized. Thus, no fill material 37 may be employed to allow for dissipation of blast energies into the atmosphere(as in the case of CX and so-called clean NX). Or when fill material 37 is employed it may be decouplant substance, as for example heat absorbing material like graphite or ablatives(natural or synthetic, discussed hereinafter), to reduce the the magnitude of seismic signals which may be undesirable for such reasons as target 30a jitter. When 37 is employed it need not extend to the ground surface 20a, but may be heavily overlaid with rock or the like to minimize surface blow-through of fallout.

Further in FIG. 2, 32a and 34a represent blast and explosion debris, and reflectable light, respectively. 35 is the frangible, reflective optic aligned to receive 34a and shunt it into the light leg 16a and thence to the irradiable target 30a. 28a is an optional shaft say drifting to the surface 20a, after the manner of 28 in FIG. 1. 18a is the third leg of the bifurcated tunnel system, comprising the shock-sink into which blast and explosion debris and non-reflectable energies pass.

In FIG. 2 it is preferable in the case of highly brisant CX and high blast-giving NX that the angle between 14a and 16a be a severely acute one, to lessen escape of secondary shock and to reduce shock diffraction into 16a, consistent with choice of appropriate tunnel lengths and appropriately-chosen explosive sizes. The same considerations obtain in minimizing abrupt excursions(positive and/or negative) in pressure, also in the shoot-through to 16a of a plasma piston which can occur with over-sized NX charges, which considerations are discussed in some detail hereinafter.

Figure 3:
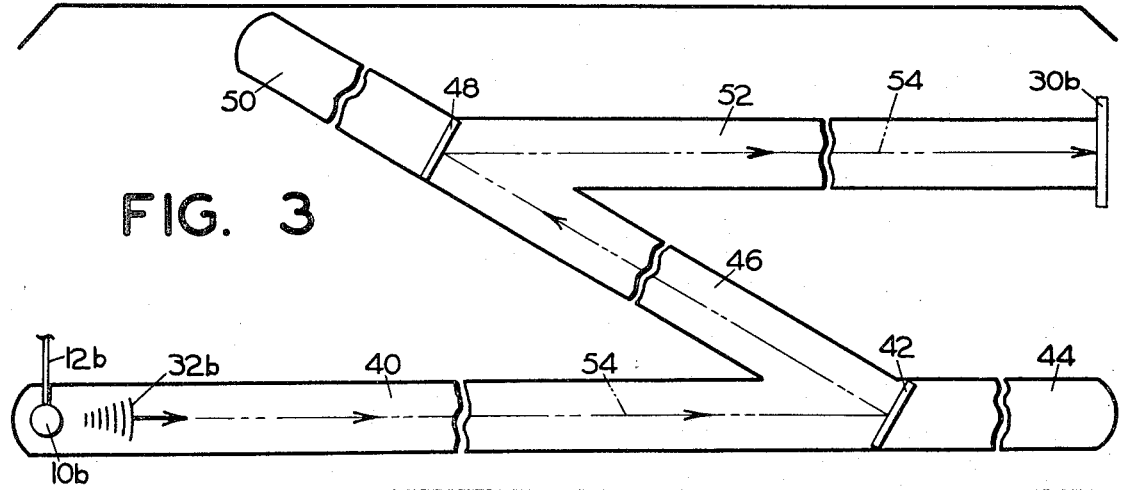
FIG. 3 is in side elevation a tellurian optoexplosive system corresponding to a multiple Y-configuration or multiple T-configuration, or of other furcation as hereinafter described, and termed a zig-zag or blind-alley configuration for purposes of convenience.

FIG. 3 shows in side elevation or in plan elevation, as may be desired, a closed tellurian optoexplosive system corresponding to a multiple Y-configuration or multiple T-configuration or of other branching or furcation as may be desired, which for purposes of convenience can be designated zig-zag or blind-alley. This system is preferred for high yield, large mass explosions, particularly NX, where multiple FRO passes are desired, and where multiple shock-sinks, 44 and 50 in this instance, are necessary to minimize N-wave pressure variations and plasma piston shoot-through to target 30b. Not shown in this schematic diagram are surface-rising drifts which function as vents to compensate for the explosion dynamics just mentioned. Such vents may be of any appropriate number in communication from the ground surface with leg members 40(firing or explosion leg), 44(first shock-sink leg), 46(first light-leg), 50(second shock-sink leg), and 52(second light-leg) carrying the optically-coupled target 30b.

In FIG. 3 the CX or NX or the like is detonated via means 12b (firing cable), the explosive being 10b and of symmetric or asymmetric explosion behavior, within the leg 40, to generate optical radiation of reflectable nature 54 together with the much slower velocity, e.g., several Mach or less, blast and explosion debris 32b. Light 54 strikes the first FRO 42 and reflects therefrom into the first light-leg 46 while the blast and debris and the like pass partly or wholly into the shock-sink leg 44; 54 now incidents the second FRO 48 and passes into 52, which is the light-leg or target leg, and thence to the target 30b as beam 54 in its second pass, while residual, reflected and/or diffracted blast originating with 10b sinks into leg 50 with the destruction of the FRO 48.

Further in FIG. 3 the angular relationship of the various legs of the system may vary with respect to one another; likewise, the tunnel system may or may not be cut parallel or vertical with the ground surface, as may be desired; thus, the various legs may be set in angular rotation with respect to one another. The target 30b may be emplaced within a chamber at the end of leg 52 having an adit for target emplacement and removal.

It is thus apparent that the version shown in FIG. 3 has at least two FRO with corresponding shock-sink legs and light ducts; an appropriate increase in the number of FRO and ancillary legs can be utilized for explosive light production by high yield explosions which incur problems of blast and fireball-derived plasma disposal.

Figure 4:
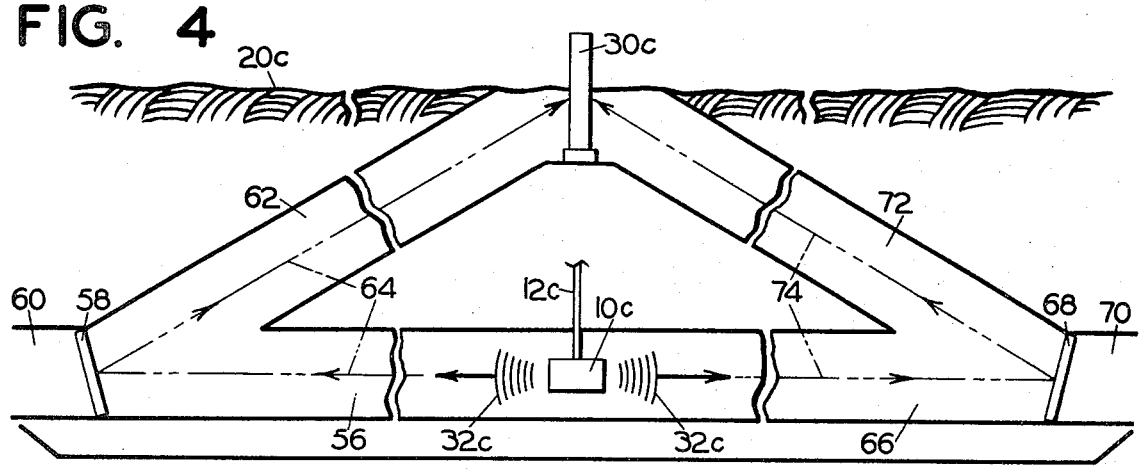
FIG. 4 represents in side elevation a multilegged, tellurian optoexplosive system.

Referring now to FIG. 4. There is shown in side elevation a typical multilegged, tellurian optoexplosive system, which may be closed-loop or open-loop as schematically depicted in the diagram, as desired. In a closed system, e.g., deeply buried, venting adits may or may not be employed. In FIG. 4 10c is CX or NX or both, with firing cable or like means 12c, positioned in a horizontal shaft, say midway therein, represented by legs 56 and 66. Blast and the like from 10c is shown as 32c, with the higher velocity light 64 and 74 striking FRO 58 and 68, and shunting into light legs 62 and 72, which converge upon target 30c. The shock-sink legs for 56 and 66 are shown as 60 and 70, respectively.

Whereas FIG. 4 shows a two-legged(56,66 and 62,72 and 60,70) explosive light generating system, alternatively one or more legs can be added so as to pipe off blast and light from 10c at the level of 56 and 66, to form a juncture therewith at 10c, with corresponding shock-sink legs for each additional explosion leg, and with upwardly target-converging light-legs corresponding to 62 and 72, having suitably mounted and aligned additional FRO means at the Y junction of the tubular arrangement. For example, two additional systems can be 90° each on either side of 56 . . . 66, at 10c. This may be said to correspond to a cruciform, spider-legged subterranean structure. In this modification a symmetric explosion-giving explosive can be used or an asymmetric one, e.g., CX which detonates and explodes with the release of light in a cruciform pattern. In the two-legged modification shown in FIG. 4 an asymmetric explosion-producing gun-type NX device can be utilized so as to release its energy more or less linearly in opposite directions, i.e., so that the two stronger explosion energy fields are directed into 56 and 66, respectively.

Further in FIG. 4, as desired and according to the application, the target 30c may be mounted within or just at the light exits of 62 and 72, with or without suitable housing. Or the target 30c may be aerial, in which case the angles between 56 and 62, and 66 and 72, are appropriately less acute than shown in FIG. 4. In any event, optical coupling between 10c via FRO 58,68 and 30c is maintained.

Figure 5:
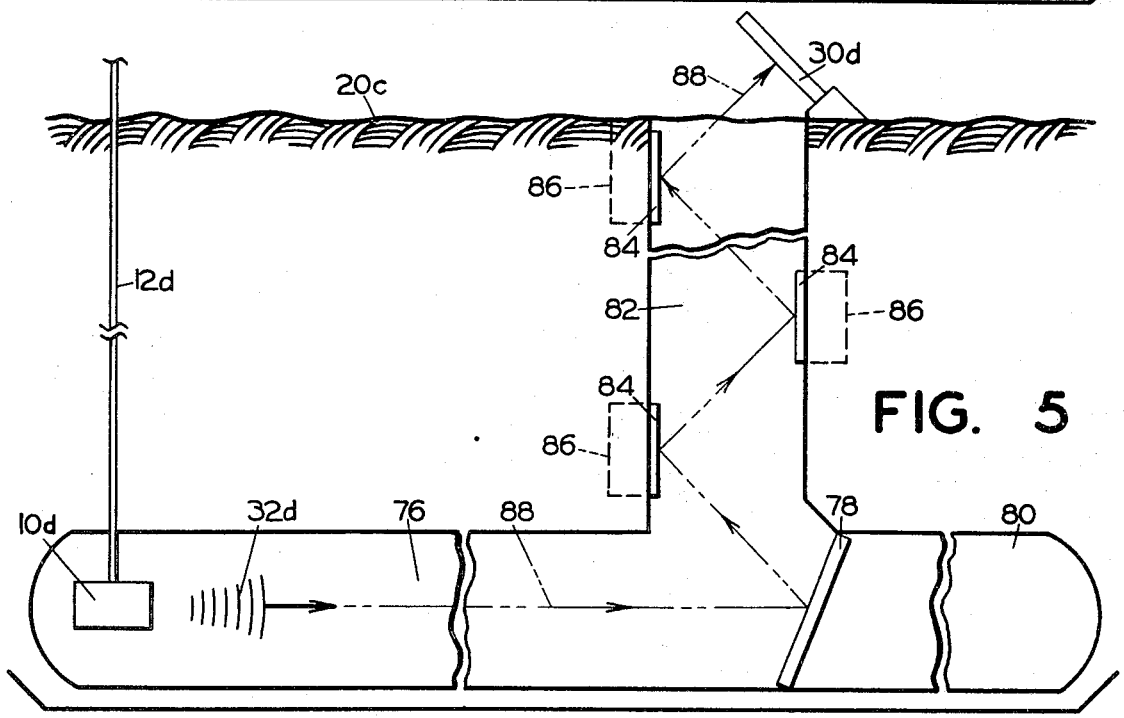
FIG. 5 shows in schematic form and in side elevation a tellurian optoexplosive system of say T-configuration or the like characterized by multiple frangible and/or nonfrangible reflective optics.

Referring now to FIG. 5, depicted as a T-configuration, and in this respect not unlike FIGS. 1 and 2 insofar as the angular relationships of the three legs are concerned. FIG. 5 shows in side elevation and schematic form a tellurian optoexplosive system characterized by multiple FRO and/or non-FRO situated at say the wall portions of light leg 82.

In FIG. 5 the explosive light source and firing means are 10d and 12d, respectively. 32d and 88 designate blast and explosion debris and the like, and reflectable electromagnetic radiation, respectively. 76 is the firing shaft, with 80 the by-pass shock-sink. 78 is a FRO aligned to optically couple light 88 with target 30d via a series of wall or like mounted FRO members 84, which may be any appropriate number and/or which may comprise reflectable lining, as of polished metal, ceramic reflection optic, or the like, at or subset in the wall of leg 82. 86 refers to optional, secondary shock-sink drifts when the modification of FRO 84 members are utilized. 20c refers to the terrain or ground or like surface.

Further in FIG. 5 the target 30d, while optically coupled via the FRO means and the explosive light source, may be set subsurface, at the surface(as within a housing), or disposed at a distance, e.g., aerially.

Alternatively, in FIG. 5, one of more means 84 are set before one or more adits corresponding to 86 which are in communication with ground surface or the atmosphere 20c. In an optoexplosive system which functions under ambient atmospheric conditions said arrangement serves as vent means to minimize target 30d insult by anomalous shock effects, serving to valve and smooth the positive-negative pressure N-wave which may be undesirable when high blast yield CX or NX optoexplosive sources are employed.

It is evident that FIG. 5 may be said to correspond to a hall-of-mirrors or kaleidoscope optical element train characterized by at least one FRO 84 when said train is multiple. The optical train comprising a sequence of optically coupled optic elements of a reflective nature 84 may comprise members either of passive or active properties, or may or may not be selectively or prefrentially reflective, diffracting, polarizing or the like, as desired and as detailed subsequently in this disclosure.

Reflective optics 84 in FIG. 5, or their equivalents when means 84 is rigid(e.g., highly reflective casing, coating or liner for 82) can perform as a flux redistributor. Should spatially non-uniform light flux(as from a spherical FRO) enter 82, then the hall-of-mirrors effect obtains between the focal plane and the sample, the emergent light being uniformly distributed over an area equal to the cross-section of the flux redistributor system comprised of 82 and element(s) 84. The efficiency depends upon the reflectivity of the means 84 or their equivalent(as when rigid, in the form of liner) used at the wall of 82. Arc source thermal imaging systems give about 0.5 transmission by a redistributor of specular-reflecting surfaces.

Figure 6:
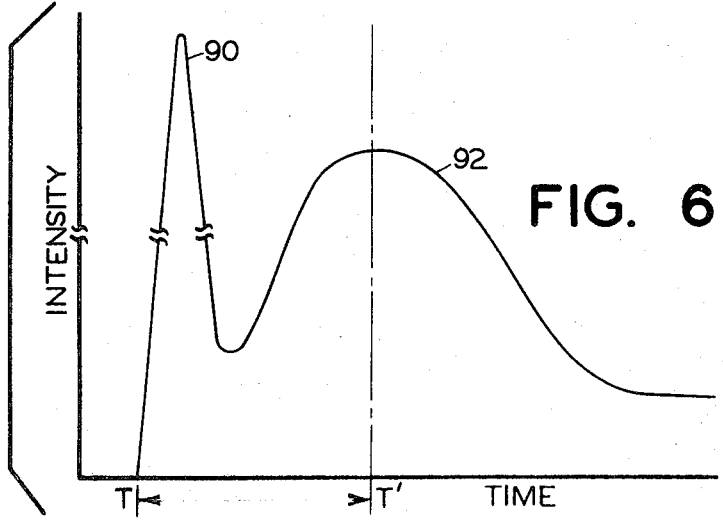
FIG. 6 is a graph with arbitrary intensity and time coordinates, which depicts certain salient facets of the energy-shock release of a nuclear explosive.

In properly understanding FIG. 6 a few preliminary words of explanation are in order. Thus: immediately after detonation and during the initial phase of an explosion, whether that explosion be CX or NX, the dynamics of the event are substantially independent of the surrounding environment. Upon rupture of the CX or NX device there may be said to be an interaction with the environment comprising a feedback of explosion behavior. For example, an explosion in air at atmospheric pressure involves the interaction of mechanical(e.g., blast/shock) and optical(light) energies. When this atmosphere is absent this interaction, especially that of shock formation which, by definition, involves formation of pressure waves(characterized by pressure-time and velocity parameters), is reduced to a point approaching zero (e.g., in an absolute vacuum the ideal situation would be the complete absence of shock because of the lack of pressurable media by which that shock is formed and transmitted; the ideal situation is never attained for large explosive masses because of explosion debris; pragmatically the situation is closely approached by properly designing-out media which favor blast and shock formation, as will be indicated subsequently).

Whereas the blast/light energies from CX(in the atmosphere or like media) or NX(under anatmospherically provided conditions, e.g., at high altitudes or within evacuated enclosures) may be simplistically stated as essentially a curve of rise-time, peak of variable plateau, and fall-time, for each of the two kinds of energies, the situation characteristic of NX is more complex for gas environments. The latter is developed in FIG. 6.

Further in FIG. 6: Fourier analysis lays the basis for the extraction of a sinusoid(bit or fragment, as herein designated) from from a larger or more complex light pulse. Illustratively, the sinusoid light bit is plucked from the explosion light monopulse or multipulse(bipulse form as depicted in FIG. 6) by a timed-life FRO. By definition a timed-life FRO ceases to perform as a reflective optic at a point in time up to and including shock-impaction upon the FRO. The case of blast-destroyed FRO is set out in the parent disclosure; shock-generated light behind the shock front may or may not have time to undergo the necessary optical transition before FRO failure by mechanical insult or the conversion to destructive thermal energy by blast, depending upon such factors as absorbance, rupture strength or yield point, spallation and like properties of the FRO and the shock flux together with Mach value.

FIG. 6 represents the timed-life of a FRO of life T - - - T', with T the start of the life of that FRO. T' and the dashed vertical coordinate at the centrum of the second optical pulse 92 depict the end of the life of the FRO, i.e., the fail-point of the FRO(i.e., failure due to thermal shattering, fusion, vaporization, pyrolysis or burning, sublimation, or the like (note is made of the fact that these and like qualities inherent in the FRO performance are duly set forth in the parent disclosure)). In other words, the T - - - T' value and the linearity or non-linearity of FRO response, particularly as T' is approached and more energy is deposited within the FRO, is essentially decided by the thermophysical properties of that member.

FIG. 6 graphs on arbitrary intensity and time coordinates optical(electromagnetic radiation) output vs. time. This graph, called a double-pulse graph in nuclear explosion phenomenalogy, has its coordinates decided by, among other things, the nature of the NX source and the environmental medium, e.g., air at atmospheric or near-atmospheric pressures. As just indicated, the double-pulse graph tends to coalesce into a single pulse depiction as environmental pressure is reduced. Since nuclear explosions in gasified media other than air, e.g., the so-called inert gases(e.g., He, Ne, Ar), chemically-reactive gases(e.g., $H_2$, nitrogen oxides(of which there are seven potentially available), C—H gases of the aliphatic series of single, double and triple bonding), also inorganic and organic vapors(e.g., water, $D_2O$, $T_2O$, Hg, halogens, polycyclic hydrocarbons) are scantly or fully unknown it is necessary for purposes of development of this facet of the present invention to rely upon FIG. 6 graph.

In FIG. 6 there is shown an initial, prompt pulse of electromagnetic radiation 90 created by an NX within the atmosphere or the like, with subsequent drop due to the start of a slower NX device-created fireball or second-pulse 92 characterized as relatively less intense and of greater duration.

Further in FIG. 6 T - - - T' illustratively depicts the pick-off of sinusoid light bits ranging downward from the coupling of blast with the FRO. Thus: the vertical dashed line of T' can represent the arrival of the shock energy, in which instance the FRO is said to be mechanically destroyed(directed or indirectly, as just indicated), or, below this point in time, for example, only the prompt pulse 90 may be reflected; or, only the leading edge to centrum of 90 may be reflected; or, T' may be set out on the trailing edge of 92 so that the mass of hot gases in the region behind the radiation front, the isothermal sphere of the NX-type explosive light source, is advantageously utilized; or, the like.

The large family of variegated timed-life FRO means is discussed in more detail hereinafter. At this point suffice to state that an FRO can be designed to fail, i.e., possess a definite lifetime, because of its passive thermophysical nature, but also because of active, non-CX or non-NX destruct-energy inputs. For example, the FRO can comprise high detonation rate or velocity(e.g., say of the order of 8000 meters/sec) chemical explosive, so as to exhibit self-destruct-upon-command(as by electric firing).

From FIG. 6 it is thus evident that an object and feature of this invention is an explosive light source which need not rely upon light-trailing shock or blast to chop off light reflection of a FRO.

Referring to FIG. 7 there is shown in side elevation a subterranean 20e, portion of a typical tellurian optoexplosive system of say T-butt configuration wherein inertial or gravity (falling, semi-implled fall, sliding or the like) is operant upon a piston member 94. In FIG. 7 the T-butt portion is formed as secondary extensions conjoining the explosion leg or chamber 104, as described in previous drawings. In apposition to(to form the arms of a T) 104, at say 90° or other appropriate angle, and forming secondary or branching legs are upper and lower drifts 96 and 102, respectively. An inertial load or gravity piston of freely fallable or slidable nature, 94, is suspended within 96 by lug, cable, beam or like means 98. Movable piston 94 is characterized as explosively detachable or impelled by explosive means carried in 98. Thus 98 preferably includes electroexplosive devices, EED's, as for example a series of explosive lugs, bolts or guillotines. A suitable firing cable 100 circuits 98. Optionally, means 98 may carry a bursting charge which serves to assure detachment of 94 and provide an initial impelling force.

Mounted say on the face of 94 is CX or NX 10e with its firing means 12e. 10e is so positioned that preferably upon the initial phase of explosion it sends light 106 through leg 104 to the FRO.

Depending upon the explosion dynamics of CX or NX 10e, and say substantially at the time of firing of 10e(or shortly before or shortly thereafter, depending upon the parameters involved, e.g., the mass and fall rate of 94, and the relative positioning of 10e and 94, as well as the length of shaft 96, and the like, as will be recognized by those skilled in the art) means 100 is fired to explode 98 and release 94. Member 94 falls into sump, pit, tubular vault or the like leg 102, tamping or valving off within 102 the partly developed explosion of 10e, in essence catching the explosion at a point in its formative stage and diverting the developing and immature explosion away from an FRO optical coupling arrangement.

Typically in FIG. 7 the piston 94 falls freely once detached from means 98 into leg 102, as when a 90° angularity of involved between 104, 96 and 102; or, 94 can be adapted to slide from 96 into 102 when the two said legs are shafted at angles off 90°, as may be desired. Concurrently 94 should maintain structural integrity until it enters and plugs 102, at which time the residuum of the explosion of 10e becomes a contained or semi-contained explosion.

Further in FIG. 7 94 is typically a cylindrical mass, as for example a cylindrical container of high strength steel or refractory ceramic having a face of explosion-resistant quality and say interiorly strutted construction to maintain geometric integrity during its force history. Such a piston container is expediently loaded after placement with high density material, e.g., lead or other heavy metals, rock, or a combination of the two. Alternatively, dense core material of diameter less than 96 may be employed. Optionally, a semiprotective sandwich of substance of high thermal energy absorption and low thermal energy conductivity may be emplaced between 10e and the face of 94, as for example a decouplant or inorganic ablative.

Whereas in FIG. 7 the CX or NX 10e may be mounted on the face or bottom of 94, an alternate ensemble is the positioning of 10e on the back wall of the T-configuration(96 . . . 102) in line with the axis of 104, with 94 set at a distance within 96 above 10e. This arrangement may be preferred when T - - - T' sinusoid fragments(cf. FIG. 6) are desired when, say, 10e, is low order detonation or when the environment is anatmospheric. In terms of explosion behavior 10e may be symmetric or asymmetric, as may be desired, as for example in the latter instance to minimize burst force which opposes the fall of 94, as well as to optimize light input 106 into tunnel leg 104.

Commensurate with good mining engineering practice as applied to the present invention drifts 96 and 102 in FIG. 7 (the same obtains for FIG. 8, below) should have substantially smooth walls. The walls can be lapped to remove irregularities and surface projections, flame-sprayed ceramic coating in whole or in part, provided with cemented metal, metal carbide, metal nitride or ceramic tile in tubular lining form, metal or graphite bar slideays, or the like. Moreover, the face of member 94 may be other than plane with rounded or champfered edges, as for example 94 may have a conical nose(which may or may not be truncated) after the fashion of projectile or missile shaping, with or without heat-shielding media known in the art.

Those skilled in the art will readily recognize that the modification shown in FIG. 7 is more suited for relatively small yield 10e energy sources characterized as of low brisancy and low detonation rates with the consequently slower developing fireball (as in NX) or flashbody(as in CX).

In FIG. 8 there is set out in side elevation the subterranean 20f elbow-butt end modification of the explosion leg 117. In apposition at say 90° or other appropriate angle and conjoining 117 are secondary legs or drifts 110 and 120. Emplaced say at the crotch of 110, 120 and 117 and axially with 117 to provide light energy 118(which couples with the FRO) is CX or NX source 10f and its ancillary firing umbilical 12f.

As desired, the back wall delineated by 110 and 120 may comprise a concavity 122. For example, 122 may have a radius of curvature such that should it be a mirror lens the focal point coincides with the FRO placed on down in 117; or, the energy cone generated by 122 may truncate with an area approximating the area of the FRO. 122, in such a modification, may be lined with reflective, temperature-resistant ceramic (e.g., anatase or MgO based material); or, the lining of 122 may be of metal which upon CX or NX radiant energy deposition behaves as a dopant to enhance light generation.

Further in FIG. 8 there is positioned in leg or chamber 110 an asymmetric explosive charge 108. This may be a directed-energy cylindrical CX of high brisancy or, preferably, a shaped or hollow charge(also variously known as Munroe, Neumann, and Stettbacher explosive charges, depending upon the variant—of which there are many known in the CX art in particular).

As schematically shown in FIG. 8 the asymmetric or shaped charge ensemble includes say a cylindrical mass of bursting CX 108 having a conical or like face concavity usually provided with a metal, glass, ceramic or other liner 112. At the apex of the cone (or set out therefrom by support-extension means, as desired) there may be a primer-detonator 114 in axial flash-tube communication with the seat of the charge 108 which, in turn, carries a detonator-booster (not shown) in circuit with a suitable firing line 116. Optionally, member 114 may be thermally sensitive so as to be detonated by the radiant flash of 10f, with or without explosive delay element, eliminating the need for 116 and the synchronization which may be required with the firing of 10f, as explained for FIG. 7. Simpler as well as more sophisticated shaped charge ensembles are well known in the explosives art and need not be detailed at this point.

Further in FIG. 8, upon firing 10f with the simultaneous or time-lapse actuation of 108 there issues from 108 an explosive jet of exceedingly high velocity and force. This acts in the manner of a plasmoid piston first to constrain and then to force the explosion developing out of 10f into vault 120. The interception and cut-off is decided by the hollow charge explosion velocity and pressure, through time, relative to the opposing explosive forces of the CX or NX 10f.

The interaction of the two aforementioned explosions and the blocking and displacement of the 10f explosion in a portion of its formative stages by the more powerful directed-energy explosion of 108 poses problems for solution of rather formidable mathematical complexity. These appear to be reducible by computer using hydrodynamic analogy and similitude. Otherwise, in the simpler optoexplosive systems, e.g., the smaller versions of non-NX variety, empirical or modeling approaches can be utilized to advantage.

GEOENGINEERING — SYSTEMS DESIGN

The tellurian medium(e.g., 20, 20a, and 20c in FIGS. 1, 2 and 4) may be of any appropriate solid. For example, alluvium, tuff, tuff/alluvium, granite, dolomite, rock salt, basalt or other igneous, metamorphic and sedimentary rock or combinations thereof, porose, vesicular or not. The tunnel system may be disposed such that one or more of its legs intersect a stratum, fault or geocline, such that two or more rock types or geologic formations are included for purposes of seismic refraction away from the target and/or FRO; or for density choice so as to enhance lithostatic pressure (or the converse, to provide elastic dissipation of explosion energy); or for reasons of economy and ease of engineering operations.

Included as tellurian media are such miscellaneous environments as those comprising coal and coaliferous rock, ice and highly compacted snow, and permafrost. The latter are of especial interest in connection with optoexplosive light generators which must be remotely located because of high yield explosive sources. Glacial, berg or other high density ice and permafrost are of interest from a workability standpoint, also because of optical properties(e.g., the increased reflectivity of smooth ice on shaft walls). Thus, steam-smoothed ice may have optical dopant characteristics when frozen-in situ slurries of water and metal or other dopant admixtures have been applied to the wall surface.

Coal, on the other hand, behaves as a thermal energy absorbent and a decouplant, as in an explosion chamber sculpted out of a thick coal seam. Likewise, vent drifts rising to the surface and passing through coal perform in a similar manner, serving to take up the energy of and therefore contribute to the degeneration of explosion plasma.

The systems engineering of an optoexplosive generator, especially that disposing to large yield CX and NX light sources, is particularly attractive in the case of tellurian media including frozen water. Permafrost may be taken as an example of such a medium: R.J.E. Brown(The Polar Record, 13(87), 741-751(1967)) details information about perennially frozen ground. Canada and the USSR together possess most of the territory in the Northern Hemisphere underlain by permafrost. Permafrost varies in thickness from a few centimeters at the southern limit to several hundred meters at the boundary of the continuous zone, which is approximately 60 to 100 meters in Canada and 250 to 300 meters in Siberia.

Unfrozen layers—called taliks—are of interest in the systems design of an optoexplosive light generator. Taliks may occur between layers of permafrost and, therefore, from the standpoint of mining engineering workability(tunneling, shafting, or the like) are of considerable potential service-ability. The depth to the permafrost table is widely variable, ranging between about 0.5 and several meters. The active layer, which freezes in winter and thaws in summer, does not always extend to the permafrost table.

In the continuous zone, permafrost occurs everywhere beneath the ground surface(e.g., 20c in FIG. 4, and 20c in FIG. 5, and so forth in the accompanying drawings). In Canada it varies from about 60 to 100 meters in the southern zone, to thicknesses between approximately 400 to 500 meters in the Arctic. There are numerous permafrost features, and in addition to taliks mention should be made of thermokarst associated with the melting of ground ice. Certain of the near-polar Arctic and Antarctic areas exhibit exploitable peculiarities involving the change-of-state of water(i.e., to-and-fro of solid and liquid water).

This is a subject, like that of mining and mining engineering, of long history and extensive documentation. Reference is made to: Marie Tremaine(ed.), "Arctic Bibliography", Arctic Institute of North America, volumes 1 to 7, Washington, D.C., U.S. Government Printing Office, 1953-1957, which seven volumes comprise an alphabetical arrangement by author of 43,464 titles, annotated; also, to V.J. Creasi, "Arctic Bibliography", U.S. Weather Bureau, Washington, D.C., 61 pp., CFSTI(AD 666,894)1968.

From the standpoint of geophysical modeling, thermodynamic treatment, and physicochemical characteristics, I would here point to permafrost as rather a unique medium. Simplistically, it can be viewed as a heterogeneous solid composed of a solid (earth) and a solified liquid(ice), the behaviors of each component as well as the composite being different for different kinetic and electromagnetic input energies. The ice, being vaporizable, acts to take up transfer-energy communicated to it by the more absorptive solid component while, at the same time, may be considered to have the qualities of a decouplant. Concurrently, of course, iced surfaces of shaft and tunnel walls behave as reflecting agents. Depending upon the density of the permafrost and the solid:ice ratio, and taking into consideration sorptivity(as from voids or structural breaks), this tellurian medium should behave to absorb explosion debris and radioactive particulates.

The making of holes for an optoexplosive system is made by any of the conventional tools and techniques, consistent with economic factors. There are four general drilling methods which can be used for boring holes up to 8 feet in diameter: (a) churn drilling, (b) auger drilling, (c) core drilling, and (d) rotary drilling. These not be described in detail here, for they are well known in the art, but suffice to say that by means of rotary drilling holes over 5 feet in diameter to depths of upwards of 3000 feet can be made. As dictated by the medium the hole may or may not be cased. Calyx or large bore core drilling enables hole making in larger diameters, usually with the recovery of a consolidated core. Properly trimmed and cased(and/or faced, as previously described) such a core can be employed as member 94 in FIG. 7, as desired.

Means other than drilling can be used for tunneling at angles abruptly off the vertical. Hard rock nd coal mining techniques using explosives, for example, as well as aquifer and railroad tunnel methods, can be taken advantage of. These essentially non-drilling means are utilized in instances where a shaft of other than circular section is desired.

Full or partial casing of the tunnels may or may not be used, consistent with geologic considerations and the performance desired from the optoexplosive system. Timbering and posting and their equivalents, in accordance with usual mining methods used for lode formations having caving tendencies, can be employed.

Multiply timbered, strutted, posted or equivalent members within a tunnel(e.g., 14 in FIG. 1; 14a in FIG. 2; 40, 46 and/or 52 in FIG. 3; 56 and 66, and/or 62 and/or 72 in FIG. 4; 76 and/or 82 in FIG. 5) are of interest in this invention with respect to the reduction or diversion away from a target of anomalous, secondary, diffracted shock and blast, i.e., utilization of tunnel cross-member equivalents, for CX and mathematical modeling test are reported in the literature available to the artizan (OPERATION DISTANT PLAIN). Evidently, however, the optical parameters of interest in this invention were not monitored in the DISTANT PLAIN series.

The tunnels, shafts, adits, boreholes, ducts, and the like conduit members variously and interchangeably designated herein in accordance with common naming practices, i.e., the one or more of the legs forming the furcated light-blast shunting system hereof, may be conveniently classed as (a) natural and (b) man-made.

The man-made chambers and conduits are the preferred of the two classes, for obvious reasons. However, I point out that for reasons of economy, feasibility workup and prototype testing, and remoteness, and the like, that certain natural cavernous and conduitiferous structures can be advantageously employed. For example, natural caves to provide the shot vault and explosion leg member 14 of FIG. 1, say suitably engineered at or near its orifice to permit the boring of, or construction of, the necessary other legs 16 and 18, leg 16 of which in FIG. 1 may of course correspond to the housed or unhoused target 30 set out at or above the ground surface 20, with a suitable tricoupled FRO 26. Of interest for low order detonation optoexplosive sources, in this connection, is also the use of the naturally formed arched rock or ice structure, as may be desired.

Illustratively, I prefer a tubate, furcated system, (b) supra, comprising at suitable burial depth at least an explosion chamber and explosion leg of any convenient or appropriate attitude with respect to surface terrain. The walls of the tubate system may be partially or wholly: (a) trimmed, lapped, smoothed or the like; (b) cased or lined; and/or (c) provided with wall projecting means characterized as not reducing the optical energy flow below a usable value but, concurrently, operant as say anechoic analogs("anablastic means") which serve to reflect and diffract blast and plasma back into the leg of origin, i.e., away from the direction of the FRO, or at least set up turbulence and eddying of the non-optical forms of energy. Means (C) is designed in accordance with fluid, blast and like mechanics, which aspect of the subject need not be detailed here.

Cased or lined shafts, (b) supra, serve in the usual mechanical reinforcing capacity to prevent cave-in; to reflect light when polished or possessing reflective characteristics; to ablate when it is desired to reduce temperature(more feasible in small CX powered systems) and perhaps at the same time to assist in the degeneration of flame or plasma; to behave as an incandescent or color temperature-increasing optical dopant; and the like. Shaft liners and wall projecting means can be employed cooperantly.

Importantly, shafts which are cased, lined, walled, coated or otherwise sealed function to:
a. maintain reduced pressure within part or all of the system;
b. maintain increased pressure within part or all of the system;
c. maintain a bottling integrity when part or all of the system is loaded with gas other than air at say atmospheric pressure.

Situations (a) and (b), supra, for example, may involve pressure differentials among the various legs, with frangible or rupturable sealing membranes or diaphgrams to assure compartmentalization. These are of suitable materials, physically and optically. The atmosphere within a system may be air, pressurized air, tenuous air, or, say the so-called inert gases(e.g., He, Ar, Ne, Kr), as well as nitrogen, nitrogen oxides, hydrogen or other gaseous media, not excluding the vapors of inorganic, metal-organic and organic substances chosen because of physicochemical and spectral properties.

Sealed shafts and tunnels are also desirable when the rock or other tellurian medium contains water, the steam from which in the absence of venting or like measures may insult the target and instrumentation which may be placed therein.

It is established that NX energy conversion to optical energy with concurrent reduction in shock and blast increases with decreasing pressure. For example, when the pressure of the environmental atmosphere of an NX is taken down to about 9 mm Hg the optical energy output approaches 0.8. Thus in FIG. 6 the bipulse, 90 and 92, of an NX source would tend to coalesce into a monopulse as the pressure is reduced. The consequence, as depicted in FIG. 6, is that the integrated NX output energy is enhanced, and the 30 milliseconds value for a 1 KT NX for T - - - T' is time-extended, i.e., T' has an apparent value more towards the trailing edge of 92.

The cross-sectional profile of the shafts, tunnels and the like is usually circular(as when drilled). However, these may be arched, ovoid, polygonal(square, rectangular, triangular, and so forth), as may be desired. The face or aperture of the various legs may differ from one another. The side-elevation profile, likewise, may vary greatly, as has been described hereinbefore, and as is set out subsequently as regards pressure, plasma and like control.

The cross-sectional profile of the light leg, e.g., 16 of FIG. 1, is important for the production of what I term a shaped light beam. In the special case of nuclear explosive-derived light I employ the term "shaped atomic light"(SAL).

As generally defined here a shaped optical beam or a SAL is a beam of light characterized by a face contour matching or adapted to match optimum light energy injection into a target. Should the target be rectangular, then the beam is shaped rectangular; should the target be ovoid, then the beam is shaped ovoid; should the target be of irregular profile, then the beam is shaped to a corresponding irregular profile. While this is somewhat of a simplified approach to the subject, it nonetheless serves to point up beam-target matching, other things being equal; also, target irradiation where only a part of the target is to be exposed. By use of the expression "simplified approach" I do not take into consideration such parameters as the inverse square law, target distance, and the like, all of which obviously enter the picture.

In addition to shaping the exit portal of the light leg, e.g., 82 in FIG. 5, and 62 and 72 in FIG. 4, a light-shaping member or aperture stop(or contrastop) of any necessary or desired opening configuration can also be used, which modification is preferable for a sequence of changes. Such a member may be a suitably thick and strong slab of refractory rock, metal or ceramic.

The cross-sectional or face area(throat or aperture, as variously termed by the different disciplines involved) of the various legs, particularly the light leg(e.g., 16 in FIG. 1 and 16a in FIG. 2), may range from several square feet to several hundred square feet, or more(cf. the discussion given subsequently of venturi, and converging and diverging "nozzle" (especially light leg geometries). This is usually decided by the size, type and configuration of the optoexplosive system taken together with the kind and yield of explosive light source.

An abandoned railroad tunnel, of which there are several hundred in the United States, has a face area of upwards of 150 to 180 square feet. The thousands of abandoned or worked-out lode or other hard rock mine tunnels and shafts range in face area anywhere between about 25 and 100 square feet. These are examples of ready-made tellurian system components which, in addition to their usual remoteness and virtual lack of cost, can be utilized for experimental, feasibility and prototype testing.

Likewise, extant in the Montana-Nebraska area are some 150 abandoned missile silos which measure 80 feet in depth and have a face area of approximately 125 to 150 square feet. Missile silos and vertical mine shafts are adapted to a simplistic modification of this invention. Namely, they comprise the light of explosion leg loaded at or near the bottom with a large mass of slow-firing, low-order detonating optoexplosive composition.

At the surface exit of such a tunnel there is positioned the FRO at an appropriate optical coupling angle, say 45°, so as to direct reflected light to a target housed an appropriate distance away on the surface of the ground. The FRO may be mounted in a short-leg tower or emplaced by other suitable structure. While this basic form of the invention is not depicted in the drawings, I do not exclude it from the scope of the present invention. One advantage of this modification, as will be readily appreciated by those in the art, is that complex venting(of gas and plasma) means are not required, for there may be a plasma piston/shoothrough and a subsequent absorption by the atmospheric overburden without target insult. Such an optoexplosive system is well adapted for CX powered explosive sources, less so for NX because of release of radioactive debris.

The explosion or firing portion of the leg(e.g., means 10 in leg 14 of FIG. 1) may be enlarged into a suitably sized room or vault. Decoupling may or may not be employed, as desired. The crotch or conjoined leg portion(e.g., at 26 in FIG. 1) may be enlarged into an FRO chamber which is square, rectangular, spheroid or bulbous, or of other convenient volume geometry—particularly when FRO means of special sizes and contours are used.

Furthermore, none of the legs of the optoexplosive clean light generating system need be of the diameter, face area, or sectional geometry as the other legs. Thus it may be desirable in the case of high yield(brisant or blast-wise) explosions to have a light leg, e.g., 16a in FIG. 2, but a few tenths the face area of either 14a or 18a of FIG. 2. This, among other things, is to allow for the very rapid fluid pressure differentials which may develop. This facet of the subject is detailed hereinafter.

The length of the legs of the furcated system is varied according to CX or NX yield and the design of the system. Usually the system will have a light leg(e.g., 82 in FIG. 5, and properly overburden-compensated to provide lithstatic constraint 62 and 72 of FIG. 4, and so forth) at the least the burial depth of the explosive light source in the case of a T-configuration(as in the cases of FIG. 1 and FIG. 5), and greater should the light leg(s) join into the FRO crotch at a non-90° angle(as in the cases of FIG. 3, FIG. 2, also FIG. 4). In the more complexly tunneled and shafted systems the lengths are accordingly greater. Likewise, in the interrupted optical explosion versions like FIG. 7 and FIG. 8, the leg lengths can be foreshortened, particularly when there is a deep sump(e.g., 102 in FIG. 7, and 120 in FIG. 8).

For NX light generators the minimum leg lengths can be approximated on the basis of information extant on the damage to mine workings. Thus: a 1 KT NX shot in granitic rock causes only minor damage and offset at approximately 400 feet; a 2 KT at about 600 feet; a 5 KT at about 1000 feet; and a 20 KT at about 2000 feet. I believe that the confidence level decreases with yield, so a safety factor should be built into the design.

The RAINIER shot(1.7 KT) conducted at about 900 foot burial, and certain other NX underground shots since September of 1957 are frequently employed to get data for scaling laws. Since in the present improvement NX light generating sources utilizes, generally speaking, yields below say approximately $0.5 \times 10^2$ KT, and especially below the hectoton(hT) and dekaton(daT)—down to 1–2 tons(of particular interest when doped to enhance light output), it should be mentioned that extrapolations on large yield NX bursts cannot be made with confidence on the basis of present knowledge.

For example, the physical properties of the rock have little, if any, effect on the size of the cavity produced. The limiting parameters are device yield, the gas-producing constituents of the rock such as water, the depth at which the device is exploded, the average density of the overburden and the concomitant lithostatic pressure, venting and decoupling, and the like. However, for purposes of elucidation and for those in the art the following is of interest as it may apply to this facet of the present invention.

First, the equations of state of geologic materials are of fundamental importance in determining response to high yield explosions, particularly NX explosions. The equations of state derive from geophysical and laboratory measurements of physicochemical properties, also from theoretical calculations of the high pressure and high temperature conditions otherwise not feasible for measurement. Physical measurements of ground motion generated by explosions are used together with equations of state, chemical and thermodynamic theory, and the laws of continuum mechanics are employed to develop mathematical models for the prediction of explosion phenomena.

Nuclear engineering and excavation information like that growing out of Project PLOWSHARE experiments very largely appears to fall into two classes: (a) contained underground explosions, and (b) cratering. Scaling laws for both of these are available. In the case of (b), cratering, the interest would be secondary in that nuclear cratering is not employed in the present invention except in special optoexplosive systems such as that depicted in FIG. 2 or in near-surface bursts communicating their energies to the light leg 14a(having an open surface face) of FIG. 2.

For subterranean, contained nuclear explosions the usual law of scaling cavity radii is best modified for purposes of this improvement, as follows:

$$R = C(W^n/(ph)^m) k_{vent} k_{dcplg}$$

where
$R$ = cavity radius in meters
$W$ = yield in kilotons(1 KT = the release of $10^{12}$ calories or $4.2 = 10^{19}$ ergs)
$p$ = overburden average density in grams per cubic centimeter
$h$ = burial depth in meters
$C$ = an empirically-derived constant generally ranging between 60 and 80 for available tests results
$n$ = approximately 0.33
$m$ = approximately 0.25
$k_{vent}$ = an empirically-derived venting factor, usually a fraction of 1, determined largely by $W$ taken together with the configuration of the optoexplosive system viewed in terms of fluid mechanics or hydrodynamic analogy; in a sense, $k_{vent}$ can be regarded as that portion which departs from the ideal situation of a fully contained, non-vented explosion, e.g., when the shallow, subsurface cratering type of vented or semi-vented configuration is approached $k_{dcplg}$ = an optional, empirically-derived(in certain instances, e.g., those involving directed energy or highly asymmetric CX or NX sources, and complex optoexplosive systems of large and/or loaded firing chambers with or without multiducted vents) thermophysical factor generally of value less than 1, which expresses the explosive energy taken up by decoupling mechanisms. $k_{dcplg}$ can enter the afore-mentioned equation when (a) the explosion chamber is large, e.g., due to lithoelasticity and like effects the seismic effect of a nuclear explosion can be reduced to an apparent nuclear explosion of ca. $10^{-2}$ magnitude; (b) there is emplaced cooperantly with the NX a decouplant agent or structure (blast and/or optical, depending upon the nature of the decouplant); and (c) sundry parameter interactions, as for example $k_{vent}$ as just mentioned, the pressure P within the system and the nature of the radiative and collisional processes which make or break the local thermodynamic processes and their equilibrium of the P-medium loading the optoexplosive system; and the like.

In contemporary nuclear engineering directed to non-cratering results it is usually desired to prevent dynamic venting. This is done by NX burial equal to the anticipated chimney height of the cavity, while providing a 300 to 500 foot buffer of overburden. This can be used for approximating minimum burial depths of the explosive source, assuming the absence of vents engineered into the optoexplosive system. Thus, in the HARDHAT event of 1962 a 5 KT NX shot in granodiorite, at burial depth 939 feet, produced a cavity 63 feet in radius and a rubble chimney extending 281 feet above shot point.

In this invention vent adits and shafts function to relieve the system of blast and plasma, to valve-off or contain reactive or radioactive gases and debris. These vents may be surface exiting or, say in the case of high levels of radioactivity, are of a contained, dead-end kind. The primary function of vents and venting is to prevent non-wanted energies from getting into the light leg of the system and thence to the target.

For the aid of those skilled in the art and of interest in this connection is the HARDTACK series of five NX shots during October of 1958, as follows:

| Event | Depth | KT Yield |
|---|---|---|
| TAMALPAIS | 330 feet | 0.072 |
| EVANS | 840 feet | 0.055 |
| NEPTUNE | 99 feet | 0.090 |
| *RAINIER | 790 feet | 1.7 |
| LOGAN | 835 feet | 5.0 |
| BLANCA | 840 feet | 19.0 |

* The RAINIER shot is extensively used for the derivation of various scaling laws, including fully contained NX explosions, and is referred to herein for various parameters.

Otherwise, in the absence of extensive venting, decoupling, and use of multilegged means it is preferable to design and build a system very conservatively, say downwards by a factor of at least 100 per cent. A rule of thumb basis value, as indicated, from which minimum leg length(s) may be determined is the burial depth of upwards of several multiples.

The extensive literature on the PLOWSHARE program which is not practicable to cite in detail here(however, see Carl R. Gerber and Hugh E. Voress, A Selected, Annotated Bibliography of the Civil, Industrial, and Scientific Uses for Nuclear Explosives, U.S. Atomic Energy Commission, Division of Technical Information, TID-3522(rev. 8) May 1966; Proceedings of the Third Plowshare Symposium: Engineering with Nuclear Explosives, U.S. Atomic Energy Commission, TID-7695, 1964; The Effects of Nuclear Weapons, U.S. Atomic Energy Commission, 1962 and 1964 edns.; Peaceful Applications of Nuclear Explosives—Plowshare, Hearing Before the Joint Committee on Atomic Energy(Congress of the United States), First Session on Peaceful Applications of Nuclear Explosives—Plowshare, Jan. 5, 1965; and, especially for the artizen, the bibliographies in the aforementioned references including the extensive publications of the Lawrence Radiation Laboratory, University of California (Livermore) should be referred to for specifics).

Particularly as regards high yield optoexplosive systems the methods and means by which prevention or control of fluid excursions(gas and plasma) are attained may be conveniently, though somewhat arbitrarily, summarized and reiterated singly or in combination, as follows:

a. venting, as described herein, including ducts which originate at the shot point and shown along the explosion leg(e.g., 14 in FIG. 1, 40 in FIG. 3) arcing out say laterally from (and/or below) the explosion leg and around the FRO-carrying crotch portion so as to by-pass same, and feeding into the shock-sink leg(e.g., 18 in FIG. 1, 44 and/or 50 in FIG. 3) behind the emplaced FRO. Since the direction of flow is changed, work is done by the fluid and the total fluid energy decreases, so the laws of branching ducts and bends are appropriately taken advantage of;

b. venting by dilation or contraction, as for example contouring light leg 16 of FIG. 1 in conical, longitudinally-sectioned cone, or funnel geometry, with the apex or smaller portion of the cone joining in at the FRO portion; likewise, the shock-sink leg may be of conical or like diverging geometry. The result is that flow from the smaller explosion leg 14 of FIG. 1 into either or both of the larger legs 16 and/or 18 is accompanied by an increase in static pressure due to the decrease in velocity of fluid; the total energy of the system is decreased due to turbulence which takes place downstream from the crotch interface. I prefer that condition known as sudden enlargement so that head losses will be quickly and abruptly increased;

c. venting may be said to include burial at depths where the lithstatic pressure fails to contain the explosion and surface breakthrough occurs, as described herein;

d. venturi configuration of the system(cf. parent disclosure), wherein for example the explosion leg(e.g., 14 of FIG. 1) converges into a section coupled to the crotch, to form a throat, and a shock-sink leg diffuser(e.g., 18 of FIG. 1). Typically the throat diameter is about one-fourth to one-half the inlet duct diameter; for flow in one direction(as into the shock-sink), the included angle of the convergent inlet cone should approximate 20° to 22°, with the included angle of the diffuser cone approximating 5° to 10°. Turbulence can be designed into the venturi configuration by making cone angle and/or the diffuser angle overly large, which is frequently desirable when high Mach fluid of explosion origin is to be degenerated(i.e., when large kinetic energies are to be dissipated as thermal energies in the shock-sink).

e. "anablastic"(anechoic analog) wall projections within the explosion leg and/or shock-sink leg, as described, to enhance fluid power drop by wall-friction type and similar mechanisms;

f. ablatives within the explosion leg and/or shock-sink leg, as described, and which may comprise naturally ablating tellurian material(silica, feldspar, dolomite) or those incorporated in the form of slowly disintegrating anablastic means, wall liners, casings, and the like; impelled 7, employed g. droppable or impelled valving systems such as set out in FIG. 7, employed singly or in plurality along the explosion leg 104;

h. directed-energy explosions such as set out in FIG. 8, employed singly or multiply along the explosion leg 118;

i. choice of proper explosive charge sizes consistent with tunnel lengths;

j. use of asymmetric explosions, considered hereinafter;

k. optoexplosive system design incorporating fluidics principles, including series orifices(cf. (b) and (d) supra), the subject of a large literature available to the artizan;

l. systems design in which the different legs are in different attitudes with respect to each other, i.e., spatially rotated and not in the same plane;

m. liberal employment of zig-zag, blind-alley and comparable configurations, like that depicted in FIG. 3;

n. and the like.

FRANGIBLE REFLECTIVE OPTICS

The frangible, reflective optic(FRO) is an especially important element in this invention. A large number and wide variety of FRO means can be designed into the system. The types and kinds of optical performance embrace much latitude, corresponding to the many and diversified attributes of the FRO, comprising what I believe to be a new and unique family of optical devices.

For purposes of orientation the parent disclosure, Ser. No. 407,461, includes the following statement:

"By frangible optic I mean a member which, upon being struck by the light energy from the explodable light source . . . routes that light energy as light . . . freed of shock and like non-optical forms of energy into the light leg . . . and thence into the irradiable target.

". . . the term "frangible" will be equivalent to "-breakable," "destructible," "burnable," "sublimable," "vaporizable,' and the like. The reason for this is that the "frangible optic element" . . . e.g., mirror, can have qualities other than simple mechanical frangibility or breakability. Thus, the mirror can be simultaneously reflective for say the visible portion of the electromagnetic spectrum and absorptive for the infrared, the latter causing the sublimation, burning, vaporization or the like of the mirror member. Although the two radiations have the same velocity, reflection occurs first with a time constant of the order of $10^{-15}$ second or less, whereas burning, sublimation, ablative and like mechanisms take longer, e.g., greater by several or more orders of magnitude, because heat transfer is slower and change of state processes are slower; pure and simple reflection, for example, involves no change of state, whereas absorbed energy requires time to manifest itself as change of state, e.g., to vapor, reaction products, sublimone, or pyrofragments."

This of course means that the FRO as originally set out includes varieties which are other than simple blast-breakable and, by the same token, the operating principle of my explosive light generator may be other than that of simple light reflection-shock destruction sequence. As pointed out, the reflection time is of the order of $10^{-15}$ second, which changes of state or, at the least the cessation of functioning as an FRO, several or more orders of magnitude less; the best values I have been able to obtain for reflection time is 1.2 femtosecond for the widely used reflectant aluminum, obtained by Drude formulas.

Herein I refine and amplify the nature and characteristics of the FRO as a class of optics. Several working categories are convenient(albeit occasionally overlapping), for the one-shot or multiple-feed FRO which, in turn, may be fed into the optoexplosive system rotationally or translationally (preferred in this improvement), as originally disclosed, as follows:

A. Cross-section Geometry: The FRO is usually circular or a roundel corresponding to the sectional profile of the system, or, of such suitable geometry as to adapt to emplacement at the conjoining portion.

B. Optical(surface) Geometry: A variety of choices are available, as for example:
  i. plane surface(e.g., mirror);
  ii. curved surface(e.g., concave or convex mirror-lens);
  iii. other(e.g., fresnel mirror, parallel or circularly ruled, reflection grating).

C. Physical: This category includes, for example:
  a. rigid FRO;
  b. elastic or deformable FRO.

D. Thermophysical: FRO means responsive to absorbed light with cessation of performance as a reflective optic, including as previously mentioned:
  1. burnable;
  2. vaporizable;
  3. sublimable;
  4. fusible;
  5. other.

E. Optical Configuration: For example:
  x. simple optic(e.g., plane or spherical mirror);
  y. compound optic(e.g., active or passive optical medium(cf. below) backed by reflective member, or a stack or sandwich of materials of different optical characteristics backed by reflectant; may be plane, spherical or other surface or interface geometry);
  z. "bulk"(by this designation I means a volume of optical material which need not be angularly positioned or of substantially slab or sheet form(e.g., 78 in FIG. 5 and one or more elements 84 in the same figure); thus, a "volume" or "bulk" FRO can be a block of lasing material(reflectively backed in the direction of the shock-sink) of the solid or liquid kind, which modification is described in detail hereinafter.

F. Passive and Active FRO: I distinguish the two classes as follows:

I. Passive(defined as an FRO which performs by virtue of the explosively-generated optical radiation, and is independent of other energy input), e.g., simple mirror FRO;

II. Active(defined as an FRO which performs by virtue of the explosively-generated optical radiation, concurrently being dependent upon an energy input from a secondary source which confers upon the FRO particular mechanical, thermophysical, optical or like characteristics which alter its response to the explosion light and, hence, alter the reflected explosion light), e.g., explosive mirror or self-destruct optic, hereinafter described.

The overlapping of the various classes of FRO means is most evident when the distinction between burnable, fusible, vaporizable and sublimable is attempted. As purely working distinctions of convenience, each is more properly defined within the frame of explosion light energy input, and whether the thermophysical changes-of-state or the thermochemical changes(molecular or the like) result from absorbed optical energy or from shock and blast kinetics.

The aforementioned classification is emphasized as an arbitrary one, aimed to aid the artizan by providing convenient working categories; and, at the same time, illustrative of the actual and potential scope of the new large class of FRO. Additionally, while examples of the simpler FRO elements are set out in the parent disclosure, e.g., plane and spherical mirrors and gratings, it is desirable to give further examples of FRO, especially those of the more complex and sophisticated variety and/or those which embrace unusual or little-worked portions of the optical spectrum. The following are by no means exhaustive of the family and its species.

The materials from which an FRO is constructed are usually solid. However, in unusual or specialty optoexplosive systems FRO members including fluids can be employed. For example, a sheet of reflective liquid, e.g., molten metal alloys of low fusibilities can be injected by suitable nozzle means, as for example via duct 28, to form the member 26, the angle being an appropriate one as long as optical coupling is maintained, in FIG. 1. Such modifications are the less preferable of the other more direct and easily reduced to practice forms of this invention.

The FRO means need not fit snugly or be neatly seated into position or have the same cross-sectional shape as the leg-conjoined or crotch portion of the system, e.g., as might be the case of an ovoid 26 FRO or a roundel(with ovoid frame) in FIG. 1. Thus, the FRO may not be of the same cross-sectional geometry as the leg(s) of the system, e.g., a polygon may be emplaced within a circular leg. The space open around a non-fit arrangement enables better sinking of the shock in high yield optoexplosions, also a more effective disposition of the FRO into the shock-sink.

Likewise, the FRO may be perforated or it may be in the form of a small-hole annulus, plane or curved in surface.

In special applications, e.g., shaped pulse production by the FRO, a train of FRO members can be employed, the hole member(disk) being at first offset(towards the explosion leg) followed by a second FRO annulus, and then by a larger-diameter third annulus, and so on, each to reflect and undergo destruction in sequence, starting with the center disk member. Each of the FRO elements in such a train may be of different substances so as to provide different fail characteristics and different reflection spectra.

When it is desired to linearly or circularly or otherwise vary the flux pattern across the face of the reflected light beam, several techniques can be advantageous. The FRO may be a composite of individuals of varying reflectances in mosaic or other surface pattern to correspond to the sectional energy-density desired, e.g., a mosaic of squares, slats, or concentric rings. Or a metal FRO surface can be selectively graded from highly polished to increasing degrees of roughness, whence to shift from specular through to increasing admixtures of diffusely reflected light. Or—in a sense the rough equivalent of this—is an FRO member having a wavy specular or polished surface; wherein one ray incident at a point is reflected at a first angle and another, say adjacent ray incident at a second point is reflected at an angle different from the first. "Flux-shaping", as I prefer to call this technique for purposes of convenience, is discussed in more detail hereinafter.

The blast-breakable FRO, e.g., sheet or foil metal, undergoes variable behavior in its "punch-out." This behavior depends upon such factors as blast strength, the nature of the FRO material and the mode of mounting, the pressure within the system, and the like. In tests I have found that overly thick metal FRO may be shattered, with strands hanging from the edges of the mounting. On the other hand, when the balance between FRO strength (e.g., thickness) and the method of mounting(e.g., as when a series of "break holes" are made at the periphery of the FRO mount, a rather curious but not unexpected phenomenon occurs when the balance between blast (at atmospheric pressure) and metal foil are just right. The FRO is very cleanly punched out and is often found at the bottom of the shock-sink as a neatly self-wrapped, crenated ball. Of course for highly brittle or shatterable FRO materials this does not take place, the result being a simple mechanical fragmentation. The balling effect is due to the rarefaction component which travels immediately behind the shock front, the positive pressure front causing the metal to collapse inwardly upon itself and so form the interesting ball.

In modifications of this and the parent invention where shock or blast-ruptured FRO elements comprise the system, the artizan will be aided by existing knowledge on bursting diaphragms. Reference is made to J. Seremak, "Diaphragms: A Selected Bibliography," Clearinghouse for Federal Scientific and Technical Information(abbreviated CFSTI herein), AD 623,361, October 1965. The period of 1920 to 1965, with 135 references, is covered.

The large deformation, e.g., from plane to dome, response of a simply-supported, inelastic, circular membrane(i.e., FRO) which is subject to blast loading (usually from spherical or symmetric CX charges under water) has been investigated upon theoretical and experimental bases by Donald Boyd (Presented at the Third Martin Symposium on Solid Mechanics, 2–4 June (1965), Denver, Colorado (114 pp.); AD 830,109). This analysis is especially relevant to what may be termed "quasi-timed-life" FRO elements wherein, for example, the FRO is a reflection grating which, under blast loading and consequent spheroidal deformation, shifts its spectral output between blast impact and blast destruction.

The rupture strength of ductile metals subjected to pulsed loading(shock) has been investigated by Vitman et al. (Fizika metallov i metallovedeniye, 18(5):717 –723(1964)), with pulses of $10^{-5}$ to $10^{-6}$ second. Metals like copper, aluminum, lead and ferrous alloys are arranged generally in the same sequence as that formed by their values of static crack strength, with some deviations.

Experiments on time and failure on about 50 different materials has established that failure occurs under loads which do not attain the limit of strength, the lifetime of the materials being inversely proportional to the load, according to an analysis by Slutsker(Priroda, no. 8, 36–42 (1965)).

Consistent with the FRO ball-forming phenomenon set out herein, the metal failure under explosion force is not a permanent characteristic of its strength; it can undergo a wide range of changes depending upon the strain rate in the interacting rarefaction waves. The dynamic yield strength is apparently determined by the position of the minimum of the metal expansion curve in the area of negative pressures (e.g., of its theoretical tensile strength, according to Al'tshuler et al.(Akademiya nauk SSR. Doklady, no. 1, pp. 67–70( 1966)).

For abstracts of the above and 105 other items relating to elastoplasticity of FRO metal candidates, particularly high parameter energy and matter interaction, reference is made to: "High Parameter Energy Matter Interaction," Surveys of Foreign Scientific and Technical Literature, ATD Report 68–14–72–1, AD 660119, Aerospace Technology Division, (US) Library of Congress, Washington, D.C., dated 23 October 1967, 59 pages.

Because of their mechanical frangibility frozen liquids make excellent FRO elements, at the same time providing reflection spectra not easily obtained by use of conventional solids. For example, I have made FRO members in slab and mirror lens from by freezing water in its pure state, with aluminum particles in suspension ("aluminized ice"), and with aluminum foil backing. In every instance, when inserted into the test model of the optoexplosive system, small chemical charges(e.g., black powder doped with 10–15 percent aluminum powder) readily fragmented the ice FRO and shot its debris down the shock-sink. Reflected visible light could easily be seen, and infrared pulse observed through filter by an image converter. The infrared pulse evidently corresponds to peaks of reflection for ice at 3.2 microns and 13.0 microns, with other wavelengths contributing accordingly.

Note is made of the fact that restrahlen or "residual" rays occur in the reflection spectrum of ice near 13 microns. The subject of the FRO as a reststrahlen monochromator is discussed subsequently.

Suffice to state that clear frozen water(ice) is an example of an FRO characterized as a frangible reflective optic operant upon the well-known fresnel law of reflection wherein two or media of different refractive indices(in this case air and ice) form the FRO. Thus, by definition an FRO need not carry a metal or silvered or like foil or coating, although this is usually desirable from the standpoint of obtaining optimum reflection.

An FRO can be operated at the extremes of temperature, as in the case of an ice mirror, or molten metal sprayed in sheet fform or allowed to run over the light incidenting surface of a suitable substrate. High or low temperatures, particularly the latter, may be desired when it is necessary to alter the physical-mechanical characteristics of an FRO(e.g., plastic cooled to the glass point so as to be highly brittle), when chemical properties and practicability dictate(e.g., otherwise highly toxic or corrosive liquids in the frozen, solid state), and when certain optical properties are to be enhanced(e.g., alteration of electron or lattice energies), and the like.

The heating or cooling of an FRO is best accomplished by use of a conventional system which includes a hollow backing member or series of pipes having inlet and outlet conduits in communication with the source of the heating or cooling agent residing at the surface(e.g., $20c$ in FIG. 5). Molten metal, hot liquid(pressurized or not), or liquidified gas is circulated through the system and the FRO brought to the desired temperature point. The system itself should be frangible and, therefore, is usually constructed from light metal; alternatively, peripherally mounted pipes can be employed, or a concentric(and spaced) piping used, particularly for large area FRO members.

Alternatively, for fast heating to relatively high temperatures, as in the case of a fusible metal or alloy which is to act as the reflecting medium, a pyrotechnic heater. These explosive heaters are one-shot devices which consist of an actuating igniter and a piece of steel tubing containing a pyrotechnic, heat-generating composition. With a surface temperature of the order of 700°C such a heater can furnish 0.625 Btu/in. at a rate of 4 to 5 seconds per inch. They can be had in long lengths, and several sections can be connected together. The pyrotechnic heater can be bent into almost any desired configuration, e.g., plane spiral, for attachment to the back of the heatable FRO, or for immersion in the FRO medium, as may be desired. Large, non-round specialty pyrotechnic heaters of greater Btu output and controlled temperature (increased if wanted), as well as burning rate, can readily be designed. See Machine Design, 4(16), 116–122(July 4, 1968) for further information.

If in FIG. 2, the explosion leg 14a and the light leg 16a are say 45° with respect to one another(the shock-sink leg 18a continuing on through from 14a in line-of-sight to 34a), the FRO means 35 may then be placed horizontal or parallel with respect to ground surface 20a. In such a configuration the FRO means can then comprise an open-faced liquid reflector. This may be carried as an appropriately thin layer within a frangible pie-plate or like pan or tray container.

The liquid reflector may be the clean, freshly-fused surface of a metal, for example; such a metal may be a low melting point alloy or it can be fusible metal which liquifies at higher temperatures, e.g., Ag, Cd, Zn, Au, Pb. Heating is done in the usual way, as by high temperature heating elements beneath and around the FRO ensemble. When oxidation and dirty-surface filming present a problem because of the presence of air, hot gas like nitrogen or helium may be blown across the face of the molten reflector.

When it is desired to have an FRO element which is highly refractory or is material that is selectively temperature resistent(e.g., in which the parameters of melting point(or vaporization, sublimation or decomposition), specific heat, and thermal conductivity interplay to provide the ultimate performance profile), or in the case of a timed-life FRO (where built-in or controlled failure is desired for modulating or demodulating the incidenting light pulse or pulse complex), or in the case of an FRO which is to exhibit change in reflectance and/or reflection spectrum through the time of the incidenting event, a number of substances can be advantageously utilized. These may be worked in a cryogenic state or at elevated temperature(as by resistence heating), to preferentially alter optical and/or mechanical properties.

These FRO substances form a very large class, usually inorganic in nature, including metals and metalloids in the elemental state, borides, carbides, nitrides, single and mixed oxides, sulfides, silicides, various metalloid compounds, and intermetallic compounds and alloys, as well as specialty ceramics and glasses(which may or may not be colloided by optically active additive(e.g., absorbing particles of metal blacks) or reflectively backed when a high degree of fresnel reflection is to be avoided). The materials run the gamut of color between white and black, with pure and mixed, variegated colors in between.

For candidates of this class of FRO substances the artizan should make particular reference to compilations like that of J.F. Lynch et al.("Engineering Properties of Ceramics: Data-book to Guide Materials Selection for Structural Applications", Battelle Memorial Institute, Columbus, Ohio CFSTI AD 803,765, 688 pp., 1177 + refs., June 1966), wherein there is tabulated some 800 substances and upwards of 20 physical, thermal (table 4.3.2 lists about 600 materials according to melting point, including incongruent melting (which is of interest in connection with timed-life and variable-reflectance FRO means), vaporization and sublimation, and decomposition temperatures), mechanical, stress, and oxidation and corrosion properties. The temperature range is between about 1 and $7 \times 10^3$ °C, the latter being represented by the melting points of such substances as $Ta_2C$, ZrC, NbC, TaC, and HfC. Optical data like reflectances and reflecion spectra(including the extra-visual spectrum) are not given, and the literature cited should be consulted for what sparse information may exist on this facet of materials properties.

When an optical energy-disintegrable(burnable) FRO passes into its destruct phase, due to the time-varying deposition of light therein, there is a shift in (a) reflectance efficiency and (b) spectral nature of the reflected light. A simple example is an initially white or highly reflective, disintegrable (or vaporizable) FRO material which ends up black (and, finally, physically destroyed), exhibiting gradations in reflectance and of color(or, more accurately, reflection spectrum), e.g., through yellow to brown in the familiar burning process. This behavior is decided by the FRO substance and is generally more characteristic of initially heat-resistent substances which degrade through light pulses of long duration and relatively low flux.

This lays the basis for a special modification of the "-burnable" FRO, which may be said to correspond to photochromic and thermochromic phenomena observed in such substances as mercurous fluoride and the double mercuric iodides, $HgI_2 \cdot 2RI(R = Li, Na, K)$. The artizan is referred to the large literature on photochromism and thermochroism for additional examples and details.

Another reflection modifying or shifting FRO is that of a burnable or change-of-state(vaporizable, sublimable) overlay substance on say a temperature resistent FRO substrate. The top layer may be only lightly bound to the substrate, the two having different different heat response properties, such that the overlay peels, spalls or otherwise breaks away so as to expose the substrate FRO, which then functions until it too is destroyed. The time constants of these types must lie within the input pulse duration, and the change-of-state be fast enough to enable the substrate FRO to come into play at some useful point in that pulse.

With the injection of extremely large amounts of optical energy within very brief periods into an FRO of small mass, e.g., of thin-film type, that FRO can be expected to literally explode. In certain ways this may be said to be the optical analog of the exploding wire phenomenon. For example, on general thermodynamic grounds the high temperature matter should show vaporization waves, which is shown by various metals including frozen mercury(which can be utilized as an FRO element in this improvement) in the electrically exploded conductor effect, as well as the various fluid dynamical phenomena perculiar to that effect. Wave speed models and thermodynamic interpretations based upon the little available knowledge about vaporization waves are highly suggestive of method and means for the utilization of vaporization waves as the basis for a specific type of timed-life FRO. A theoretical background on the subject can be had by sterting with: F.D. Bennett, Phys. Fluids, 8, 1425(1965); G.D. Kahl, Phys. Rev., 155, 78(1967).

Included in the category of fusible FRO elements are those which are shock-fusible. Theoretically shock wave compression-fusion follows from the conservation law, and the calculation of the fusion curve is based upon the volume and fusion temperature interrelationship. Analysis by Urlin et al.(Akademiya nauk SSR. Doklady, 149(6): 1303–1306(1963); cf. p. 7 of ATD Report 68–14–72–1 cited herein) shows that by careful mechanical shock wave measurement the intersection of the shock adiabatic curve and the fusion curve can be adequately determined if the slope is not overly steep.

Taking the case of an FRO element of lead, fused by shock, as described by Belyakov(ibid., 170(3):540–543(1966); ibid., abstract 23 on p. 14ATD Report)); thusly: Since the thermodynamic parameters of a substance in a shock wave do not change materially, it is impossible to distinguish the shock adiabatic curves for heating a substance in its solid and its two-phase states by measurements of wave and mass velocities. Lead has a substantial thermal expansion, low fusion point, and tendency to non-polymorphism.

The mass-equivalent velocity required for the melting of lead is approximately 650 meters per second, corresponding to about $23 \times 10^4$ atmospheres pressure and a volume increase of between 22 and 23 percent. With a 2 millimeter lead sheet, as in the case of an FRO, the fusion takes place at about 1250 to 1300 meters per second; for 1 millimeter lead sheets the value is 1340 meters per second. Like the punched out FRO(i.e., cleanly made roundel of aluminum, metallized paper) I have observed in my tests, there is the splitting-off of a saucer-shaped layer(i.e., from the side opposite of impact).

The FRO may be elastic under mechanical or thermal loading so as to be of timed-life nature. For many materials used in the make-up of an FRO deformation obviously occurs upon shock insult or heat deposition at very high rates. However, it may be desirable for cut-off of the light pulse(derived from the explosion) at some point in time to have an "elastic" or thermally-deformable(warping, buckling, and the like) member whose optical surface(e.g., planeness or sphericity) is altered in a controlled manner.

Conversely, the FRO may initially be out of optical coupling with the explosion leg and/or light leg-target, so the function of an elastic FRO in this instance is to optically couple by form change source of light(CX or NX) and/or target.

Such an arrangement is adapted to chopping out a segment of the explosion light pulse beginning at a time later than the birth time T(e.g., of FIG. 6) of the explosion. This in effect enables the by-passing of unwanted early optical radiations corresponding to the leading edge of the source pulse. This may be desired when short wavelength radiations characteristic of the early, formative stage of the explosion are to be screened out.

This variety of FRO can be of one substance in contiguous form; or, a mosaic of various substances of different properties, for example. Likewise, the substrate, if any, or the backside support means(e.g., grid), if any, can be designed into a more complicated form of deformable, timed-life FRO. The material(s) employed is chosen mainly on the basis of elastic modulii, particularly at elevated temperatures where thermal energy from the input light causes abrupt excursions, and hence of form. Polymers, especially silicone or other metal-organic and fluorinated, metals, and glasses and cryptocrystalline ceramics can be used. The FRO of this type can be at either elevated temperature or in a cryogenic state, depending upon the substances and the structure.

The dynamic behavior of impulse-loaded(shock but preferably thermal) deformable, timed-life FRO means embraces a large number and wide variety of disciplines and technologies, no small number of which involve a good deal of empiricism. For example, seals and diaphragms, vibrational and waveform analyses of damping, mechanical and thermal dynamic properties of materials, and the like. This is a very broad subject no feasibly gone into detail herein, so the artizan is referred to the relevant literature. For spherical optic types of FRO elements the equations of De Luca, for example, can be used as starting approximations. Otherwise, such problems are evidently best approached by computer analysis.

As originally disclosed, the FRO may be a reflection diffraction grating, usually a replica. This may be of the usual kind, linearly or circularly ruled and coupled to appropriate slit or onion stop at say the exit of the light leg, or, a series of such gratings can be employed(e.g., 78 and 84 in FIG. 5). However, for the far infrared, e.g., in the region between $10^2$ and $10^3$ microns, a wire grating can be utilized. This and the transition region are usually considered difficult for experimental work, partly because of the paucity of radiant power available from the more conventional sources, making for a considerable signal-to-noise problem. The wire grating can also be used as a reflection polarizer for the regions indicated.

Wire gratings exhibit interesting characteristics in the transition region between the infrared and the microwave, where the wavelength is approximately equal to the grating spacing. Note is made of the fact that transition energy is included in the output of NX explosions. Wire gratings and their theory for the long wavelength and transition regions are described by Wessel(Hochfrequenztechnik, 54:62(1939)). Large area wire gratings suitable for use in this invention can be made by scribing metal-coated dielectric substrate (e.g., plastic, glass, fused silica).

Narrow band or essentially monochromatic explosion-derived light can be obtained by means other than the reflection grating(absorption filters are generally less desirable because of working limitations, although the refinement of compound FRO elements discussed herein can be used). Thus, the FRO can take the form of a reststrahlen optic. Typically this is a plane or spherical mirror of the FRO kind having a first surface coating of material which provides reflected residual radiation. The coating is usually in crystalline form, sintered, pressed or minimally cemented as a coating on the substrate. Such devices are worked in the infrared. Examples of materials include sodium potassium niobate(11 to 40 microns), and cesium iodide and cesium bromide(120 and 170 micron peaks). Structurally such FRO elements may be considered in the class of the compound FRO.

The FRO need not be of plane or spherical surface contour. It can have a bulk or volume geometry when it is desired to include lasing material, for example, adapted to pumping by explosion light. Illustratively, in FIG. 1 member 26 is set parallel to the axis of leg 16; at the light input 34 or face of 26 there is positioned a square, rectangular or other appropriate bulk of lasing substance. Light 34 enters the lasing substance and reflects back thereinto, giving a side pumping. The lasing material may be stacked rods of solid laser material such as ruby, Nd activated glass, or the like. The laser light exit ends of the laser stack align parallel to leg 16, to impact target 30.

Alternatively, the laser may be a liquid carried within say a silica cell backed by FRO at say the Brewster angle. The silica cell is usually plane at the front(facing the incoming beam 34, which pumps), and may be of rectangular or square or circular side wall geometry, enclosed at its top by the exit or portal(which may be plane, i.e., parallel to axis 34, Brewster or other angle, again to issue the laser beam up and through leg 16 to target 30. In order to enhance lasing efficiency, also frangibility(secondarily), the laser liquid may be supercooled.

An extensive listing of laser substances is set out in the parent disclosure, including liquid lasers substances like rare earth chelates. A contemporary liquid laser of higher efficiency than those originally described is the aprotic solution of neodymium salt dissolved in an acidified solution of selenium oxychloride. Not exlcuded from the FRO version described supra, wherein the FRO is faced by a cell containing optically active material, are those agents which are marginally responsive to the pumping levels of present light sources, e.g., so-called Raman lasers and Brilluoin lasers.

Not excluded are gas-loaded cells carrying gas or gas-mixtures well known in the art which can be made to lase by optical pumping. As in the case of liquid lasers the gas lasers may be in the configuration of a solid cube, rectangle, or the like.

Likewise, the FRO backing member need not be in intimate association with the bulk lasing substance. The FRO may be set back therefrom and may, in such an ensemble, be non-plano in type, e.g., ellipsoidal, so as to reflect explosion light back into the laser.

A detailed analysis is not necessary to demonstrate that a CX or NX light pumping involving a laser is adequate to produce (a) laser pulse energies far exceeding those now attainable or feasible with the various electrically-driven discharge pumps, e.g., double- or multiple- pulsed, high-pressure flashlamps, zeta and theta discharges, and ablative light sources, particularly taken with the aperture or laser beam diameter (b), which may lie in the range of several tens of square feet.

When non-destructible laser pumping is desired, then the target is the laser, as for example 30c in FIG. 4, wherein the laser 30c at any appropriate attitude with respect to shock-free, pumping beams 64 and 72, is excited by multiple inputs; 30c can be surrounded by retroreflective mirrors. An asymmetric, e.g., cruciform, optoexplosive light source is preferred in the multilegged system depicted in FIG. 4.

The lasing and fluorescence-transducing FRO ensembles are examples of the "passive" FRO types of the previous classification in that they function independently of energy other than optoexplosion light. Upwards of 20 such physical effects involving electromagnetic radiation impinging on matter, which are of interest in connection with the present subject, have been described and tabulated by George Raabe("A Selection of Physical Effects and Their Description: Appendix(Part IIIa), CFSTI AD 276,381, Rept. No. SMIR 62-5, 130 pp., 1962(67 physical effects are clearly and succinctly described, not all of which I note are applicable to the design of compound FRO elements of either passive or active kinds because of constraints placed by materials, energy(e.g., large magnetic fields), low-order effects, or the like, but which should be surveyed by the artisan in any event); "A Selection of Physical Effects and Some of Their Implications in Recent Materials Research," Part III, CFSTI AD 272,930, Rept. No. SMIR 62-4, 8 pp. + 6 tables, 1962(see especially Table 2A)).

In an "active" FRO ensemble energy is supplied so as to give field-controlled electromagnetic energy propagation, the supplied energy being other than that created by the optoexplosion. Field-control is usually the result of electrical energy fed to a responsive substance comprising the FRO and, to a lesser extent, input acoustic energy. Because of size and mass an other working limitations field-control by magnetic energy is generally limited to smaller optoexplosive systems equipped with small area, active FRO ensembles.

Thus, Table 2B of the Raabe publication(Part III) details upwards of two dozen physical effects which are field-controlled insofar as electromagnetic propagation is concerned. Again, it is not deemed necessary to detail the specifics of each and every candidate phenomenon, other than to point out that certain of these will be readily recognized by those skilled in the art as incorporating novel behavioral attributes into an FRO member. These behavioral attributes include spectral shaping, polarization, oscillation and vibratory qualities, light switching, spectral transduction, and the like. Examples of the physical phenomena include, for example: piezoelectric effect, Cotton-Mouton effect, Kerr and Pockels electro- and magneto- optical effects, magnetostriction, and electro- and magneto- photochromism and thermochromism(not described in the reference).

A typical active frangible, reflective optic is a mass, say a slab roundel, of high detonation velocity chemical explosive. Such an explosive FRO is a self-destruct device which can be made to fail at any desired point from immediately after the initiation of the optoexplosive CX or NX source to the arrival of blast and shock. These performance parameters enable the self-destruct FRO to cut in on the CX or NX light pulse at any desired time, chopping out a sinusoid, so as to reflect a shaped light fragment which is time-intensity modulated.

Illustratively, an explosive FRO is a cast or pressed suitable explosive slab which carries on its face a metal reflector, e.g., Al, W, Au, say of thin foil. The explosive substrate, in this simpler version, carries at its edge or inserted into the periphery a series of detonators(with or without boosters, as required); these are fired simultaneously, to cause the explosion and self-destruction of the FRO. The timing of the firing is determined by the size and geometry of the explosive mass(which may be plane or non-plane), its detonation velocity, the point of CX or NX light pulse interruption, and like factors.

For example, a roundel of mannitol hexanitrate, having a detonation velocity of approximately 8000 meters per second, of 1 meter diameter and 2.5 centimeters thickness, is provided with between 8 and 24 detonators or electric igniters, requires about 4 milliseconds for self-destruction. If spaced detonators are placed close together on the backside of the explosive roundel, the explosion life of the mass can be reduced to the submillisecond realm.

A somewhat more complex explosive FRO can be employed when very fast self-destruct times are required. Typically, this comprises a hoop or ring of shaped charges, the cone or jet faces of which are all aimed at the center of the ring(in or not in the same plane, as required by the geometry of the FRO). Over the hoop of shaped charges or emplaced within the ring is destructible reflective solid, such as thin polished metal sheet. The simultaneous explosion of the charges produces exceedingly high velocity jets which give the FRO a disintegration time in the nanosecond domain.

An unbalanced explosive charge ensemble can be employed, shaped or not, to destroy only a part of the FRO, leaving a subsequently-destroyed portion, the combination of the two or more portions acting to intensity modulate(by reflection) the incident optical beam.

As desired, the explosive FRO can be heat-ignited by the impacting explosion light; copper, graphite or other heat-conductive metal "squibs" are partly embedded in the explosive, with a portion extending out into the oncoming beam.

The explosive can be liquid encased in a frangible container, e.g., nitroglycerine or nitromethane in thin steel, aluminum, plastic.

Following are explosives of high detonation velocities adapted to use in the explosive, self-destruct FRO, in the case of solids the values differing somewhat according to density as well as method of test, but representative:

| Explosive | Detonation rate (meters/second) |
|---|---|
| Mannitol hexanitrate | 8250 |
| Nitroglycerine(metal container) | 7800 |
| Picric acid | 7350 |
| Tetryl | 7850 |
| Trinitrotoluene(TNT) | 6640 |
| Tritonal(80:20 TNT/Al) | 6700 |
| Cyclonite(RDX) | 8180 |
| Nitromethane(container) | 6200 |
| Pentaerythritol tetranitrate(PETN) | 8300 |
| Pentolite(50:50 PETN/TNT) | 7500 |
| Cyclotol(75:25 RDX/TNT) | 8000 |

Preferred as the optoexplosive light source for this improvement are:
I. Chemical explosives and explosive compositions(CX);
II. Nuclear explosives and explosive compositions(NX);
III. Combinations of the two.

These may be (a) symmetric in that their energy release roughly corresponds to a "point source", as from a spheroidal mass of explosive, or (b) asymmetric in that their energy release is characterized by taking a particular direction (directed-energy explosion), as from a hollow or shaped charge. Combinations of the two, (III) supra, may involve interaction with or interruption of the primary optoexplosion by secondary explosion, usually directed-energy in nature(e.g., CX) as described hereinbefore for the accompanying FIG. 8.

The parent disclosure gives examples of optoexplosives, and I refine and expand upon this facet of the subject in the following.

CHEMICAL OPTOEXPLOSIVES

CX energy sources are variegated and of large number, including individual substances, combinations of materials and reactions having as a primary quality the liberation of very large amounts of energy, both kinetic and electromagnetic. These can be tailored to, and explosives ensembles and systems designed for, maximization of light generation and minimization of blast and like kinetic energy.

Compounded upon the plateauing of light outputs practicable with the various flashtubes available, constraints are further placed upon the generation of very high energy, ultrahigh power light generation by the limitations of large primary power storage systems. These constraints and limitations inherent to the electrical art include inordinate size, weight, bulk and a lack of portability, as well as severe restrictions in time and place. One answer to this problem is the seizing to purpose the energy stored in an explosive. Thus, figures in the art give a $5 \times 10^4:1$ saving in bulk, size and weight of chemically-stored energy over capacitor-stored energy, although in many instances this has to be revised downwards by one or two orders of magnitude to be realistic.

Herein I supplement and expand upon those CX light sources originally disclosed, giving special emphasis to what I believe to be unique approaches to the subject of optoexplosive technology, in line with my continuing theoretical and experimental studies of: (a) methods and means for the seperation of light from blast in an explosion, and (b) optoexplosives per se, together with the designing of those optoexplosives into means by which optimum light generation is obtained.

Since it is not feasible to here detail the explosives art other than to emphasize areas of especial interest to the artizan from the optoexplosion viewpoint, I would reiterate what is stated in the following section on nuclear optoexplosives; namely, that a preponderance of the existing body of knowledge on explosions relegates optical phenomena to a secondary or often in absentia role. The computer rundowns for information retrieval I have had performed turn up a scarcity or complete absence of data on optical energy generation in explosions, the radiant energy and spectral qualities of which otherwise would be of considerable pragmatic value. The striking paucity of data on optical energy inherent in other-parameter-monitored explosions of the large yield kind perhaps points up the fact that, traditionally, chemical explosions have been and are first and foremost blast energy workhorses.

The foregoing is a critique which in oversimplification relates to detonation light as contrasted to shockwave light. There is a substantial body of literature on the latter subject. I regard an optoexplosive as an agent which performs out of detonation light and, to a lesser extent in most instances after-cumbusting light, although certainly not excluded from the meaning of the word is shock light. The reason for this is that detonation light is essentially independent of its atmosphere or environment, e.g., the process can occur in a vacuum, whereas by definition shock light is environment-dependent.

For high explosives the physical and chemical processes are actually not this simple, and the demarcation is not always clean-cut, for there are complex interdependencies and interrelationships between detonation light and shock energy and the afterburning explosive substance. For low explosives detonation and shock contribute to a much lesser degree to the light generation, while combustion-like processes play the dominant role.

Despite this rather easy approach, the distinctions do serve as a working basis for the development of improved optoexplosives, and for their implementation in the problem of shock-light separation.

Chemical optoexplosive light sources can for present purposes generally be considered as broadly of two kinds:

1. Molecular(or single-substance) materials, which may be solid, liquid or gas in form, or combinations thereof( as when not in intimate admixture or when employed in groups, the individuals being regarded as substantially non-interacting in the explosion process);
2. Multisubstance(or ingredient) compositions, which may be intimate admixtures, solid or liquid or gas solutions, or sorptives or the like, which may be solid, liquid or gas in form, and which may comprise binary, ternary or like formulations of the explosives art, particularly those which have been redesigned physically(as by increasing the density), chemically(as by introduction of a light-emitting metal into an organic molecule), and/or stoichiometrically(as by raising or lowering the fuel-oxidant ratio in say a nitrate or chlorate-metal admixture).

Thus, taken together with the original disclosure, Ser. No. 407,461(filed Oct. 29, 1964), the following may be taken illustratively and typically as optoexplosives together with methods and means for stimulating their output in the optical spectrum.

Molecular(or single-substance) explosives include those of the usual variety, e.g., polynitro- organics such as TNT, RDX, PETN(and others listed elsewhere herein(as in the table of detonation rates)) can be employed per se but, preferably, these are modified so as to enhance light output and reduce the proportion of kinetic to optical energy released. These substances are primarily designed for blast effects. Thus, by lowering the density of an explosive of this kind the detonation rate and, hence, the light contributed by afterburning appropriately raised.

For example, conventional high explosives of the molecular class can be physically treated so that in a cellular mode, e.g., foamed, where air or other gas interstices contribute to density reduction, the performance is markedly altered. In addition to cellulation by foaming, other techniques include binding the explosive particles with an elastomer, drawing into strings or threads, weaving these into an "explosive fabric", and then fashioning the optoexplosive element from this fabric, which fabric may have interstices of any desired opening size. The explosive fabric can be wound upon itself from yardage of the same, or randomly aligned woof and warp stacks made by piling one sheet on top of the other, to form the optoexplosive "-pile". As desired, such a mass can be impregnated with liquid explosive, liquid or colloidal dopant, or with solid dopant.

"Area CX" energy sources provide an approximation of a Lambertian radiator when the interstitial or cellulant explosive sheet(e.g., fabric, hole-punched sheet, or spumed sheet) is hung vertical to the axis of the firing leg and within its explosion vault or portion. Such area-explosives, which may be sheets of circular or other desired form, may be hung flat, or they may be hung after the manner of drapes in pleated, folded or accordianized contour. A plurality of such sheets is preferable, in contact or closely spaced, behind one another, so as to build the required mass of optoexplosive. The sheet surface may be coated with dopant or the spaces between the various sheets may be occupied by dopant in sheet form, as for example foil of Al, Mg, Zr, Hf. Alternatively, warm(so as to rise) gas like He, Ar, Xe, Kr, and Ne, may be fed by an appropriate series of nozzles at the bottom of the area-explosive ensemble, to contribute to intensity or spectral shaping upon firing; likewise, reactant gases may be utilized, as well as warm convection-rising vapors(inorganic(e.g., tetrahalides like the chlorides or iodides of tin, silicon, germanium, or substances like uranium hexafluoride), metal-organics(like certain of the Grignard compounds; cf. those for hypergolic reaction set out herein), or organics(e.g., high carbon content gas from polycyclic hydrocarbon sublimones). By fusing means well known in the art, an area-explosive can be made to detonate substantially simultaneously, or such a detonation can be time-delayed as regards the components; the latter situation will be recognized as one which produces optoexplosive pulses of longer durations.

When the CX material is sensitive to impact, friction or electrostatic charge, special precautions must be taken in loading the system with large masses of the explosive. Pumping in as a slurry, and then dewatering and drying in situ is practicable in many cases, and this is gone into subsequently in the discussion on sensitive optoexplosives like the azides. When slurry-loading is not feasible the firing portion or vault in the explosion leg can be modified in: (a) atmosphere and/or (b) underwater or under-oil loading, for the building of a pile of explosive.

Slabs or bricks of static-sensitive explosive, which may or may not be coated with thin, electrically-conductive plastic, are built into the explosive pile in say an atmosphere of conductive ammonia gas or organic amine vapor, this to be subsequently outpumped when the pile is completed.

Racks or like structures may or may not be employed in stacking large numbers of explosives pieces.

When the explosive is impact or shock or friction sensitive, it can be loaded under water or under oil, both providing cushioning, and the water conductive, as may be desired. Thus, a small coffer dam, crib-coffer, or canvas-plank bulkhead container is made within the firing chamber and then filled with water or oil; grillage, piers or the like may be employed. The coffer structure may have a neck extending up the loading hole, to ground surface, the hole also being filled with liquid. After loading the liquid is pumped out and the coffer gently taken apart.

The foregoing coffer dam and like technique is designed for making explosive piles of large mass and size, e.g., say 10 tons or more. For quantities less than this, depending upon the material involved and the system parameters, a more straightforward solution involves the initial emplacement of a thin plastic bag or balloon; this is partly filled with water or oil or other cushioning liquid and the pile gently and slowly built by positioning the explosive pieces; the liquid is pumped out after the pile is constructed, and drainage and drying(as by warm air circulation) put into effect. The dry explosive pile is now ready for detonation (firing means have already been placed therein, as by waterproof squibs and surface-communicating electric firing cables), with or without removal of the encasement; gentle cutting can be used to remove the plastic envelope, or it can be merely dropped over and around the explosive pile to the floor of the firing vault.

When high detonation and large gas volume production(as to contribute to the production of shock light) is desired, Astrolite-G(not "astralite") can be employed. Astrolite-G is a clear liquid explosive especially designed to produce a very high detonation velocity(8200 meters per second). It is 40 times less sensitive to impact shock and antibatic compression than nitroglycerine and four times safer than nitromethane, characterized by high energy release and very high gas release. Astrolite-G can be sorbed onto porose substrates for ease of handling, for reduction of density (in terms of explosive material), and for the production of physicochemical systems in which the sorptive material may enter into the optoexplosion to alter the balance between kinetic and optical energies.

Astrolite-A, a solid, and Astrolite-P, a plastic explosive are both tractable to the fashioning of explosive masses of an interstitial nature, e.g., foamed solid explosives and explosive fabrics, just described.

Furthermore, Astrolite-P can be used as a "liner" or "lens" charge in the firing chamber of the system, as for example layering the surface of the concave rear of the explosion leg.

Binary, ternary or other multisubstance explosive ingredient preparations may initially be in admixture(as in the case of aluminized explosives, or the baronal-type compositions), or they may be separated and then brought intimate relationship with a resulting explosion(as in the case of hypergolics).

Hypergolic optoexplosives were set forth in the original disclsoure and further detail is not necessary here, except to add that useful classes of compounds fall into the groups comprising metal(usually aluminum) alkyls, $MR_3$( M = metal, R = alkyl); metal alkyl halides, $MRX_2$( R = halogen, usually iodine) and metal dialkyl halides, $MR_2X$; and metal alkyl hydrides, $M_2H_2R_4$, like aluminum tetramethyl hydride, which undergoes explosive combustion with oxygen or air with the release of violet light. Air, oxygen, chlorine, fluorine and other gases are usually the second reactant in driving the system into optoexplosion.

Dust explosions, i.e., particulates usually metal reacting with an atmosphere like oxygen(with firing means), comprise a versatile binary optoexplosive light source characterized as capable in the present improvement of supplying optical energy in a sequence of bursts, enabling repititious shots when FRO feed is employed. A basis for this is set out in my U.S. Pat. No. 3,309,620. Thus, the reactants are fed separately into the firing chamber by pipe from a source at say ground surface, with say electric ignition means being employed to induce the dust explosion. In order to sustain a dispersion of solid particles in the gaseous reactant medium, bottom and/or side up-jet(s) of particulate reactant and/or gas reactant can be utilized; slit deagregators and ancillary means can be employed in such a system. Various dust cloud generators are summarized by D.J. Seery and H.B. Palmer("The Combustion of Dust Clouds: A Survey of the Literature", Coal Research Board, Dept. Fuel Tech., College of Mineral Ind., The Pennsylvania State Univ., Special Research Rept. No. SR–17, 30 pp.(28 refs.), Nov. 30, 1959).

The theory and applications of dust cloud explosions are set out by Seery and Palmer, cited supra; and for further information in the practice of this modification of the present invention the artizan is referred to: "Handbook on Aerosols," Washington, D.C., U.S. Atomic Energy Commission, 1950; J. Dalavalle, "Micrometrics", New York, Pitman Pub. Co., 1948; "Third Symposium on Combustion and Flame and Explosion Phenomena", Baltimore, Ma., Williams and Williams Co., 1949; Ibid., "Sixth Symposium on Combustion", New York, N.Y., Reinhold Pub. Co., 1957; H. Green and W. R. Lane, "Particulate Clouds", London, Spon Publishers, 1957.

In connection with the area of metal dust explosions, I would especially refer to the abundant literature generated out of the activities of the Hartmann Group, Dust and Explosions and Mine Experiments Branch, Explosives and Physical Sciences Division; U.S. Bureau of Mines, Pittsburgh, Pa., wherein a great deal of data are set forth on the numerous facets of the subject; also, cf. S. Haffner, "A Survey of Available Literature on the Rapid Combustion of Metals in Air," 18 pp., PATR 2061, Picatinny Arsenal, Dover, N.J., September 1954, AD 44,543(25 refs.), which paper also sets out data on the flashtimes and relative outputs of various metals and alloys and binary nitrated and chlorated metal (Al, Mg, Al—Mg, Zr, Al—Li, Al—Ti, Al—Mg—Zr) formulations.

Of distinct interest in connection with the subject of chemical optoexplosives is the work of I. Hartmann, J. Nagy, and M. Jacobson("Explosive Characteristics of Titanium, Zirconium, Thorium, Uranium and Their Hydrides," 16 pp., U.S. Bureau of Mines, Rept. of Investigations 4835, December 1951), wherein there is set out data on the explosive behaviors of these elements and their hydrides in such atmospheres as pure oxygen, nitrogen, carbon dioxide, helium, and argon, the latter four in various mixtures with oxygen.

It is not deemed necessary to detail this subject herein, other than to reiterate my critique given at the outset of the present section, wherein optical assay of the dust explosion phenomenon has not been monitored in the many studies in this field because of the tilt to blast phenomena. Reference is made to my patent cited supra on the optoexplosive facet of reactaions of various metal particulates with different atmospheres, including those of air, oxygen, nitrous oxide, nitrogen, and carbon dioxide. The gaps extant in dispersed metal and metalloid reactant,and gas and vapor reactant, species are quite large, with blast predominant and light nugatory. For example, the ignition and combustion of powdered metals(Al, Li, Be, B, Ca, Ce, Ti, Zr, Th, U, Mg) are reported for the atmospheres of earth, Mars(2.16 percent Ar, 11.21 percent $CO_2$, and the balance $N_2$), and Venus(4.10 percent Ar, 9.17 percent $N_2$, and the remainder $CO_2$)—the latter two being simulant atmospheres—by R.A. Rhein(Astronautica Acta, 11 (5), 1965). These data may be of interest to the artizan in designing metal dust opto-explosive light sources and systems.

An example of a large class of binary optoexplosives is what I call the "baronal-type." These are thermochemically designed or formulated out of empirical test batches, as may be necessary, and may be represented by:

$$mA_x(B)_y{:}nC{:}oD$$

where:
- $A$ = a cation portion of the molecule $A_x(B)_y$, which is usually alkaline earth or metal;
- $B$ = an anion portion of the molecule, such as nitrate, chlorate, perchlorate, bromate, iodate or other available oxygen anion or oxidizing moiety;
- $C$ = a particulate metal, such as Al, Zr, Hf, Mg;
- $D$ = an optional explosive to assist in chemically driving the reaction between $A_x(B)_y$ and $C$;
- $x$ and $y$ = the valences of the anion and cation, respecyively;
- $m$ and $n$(also the optional $o$) = the mole proportions or weights of the ingredients.

Cation A is preferably one of the 19 elements in the table of R. K. Landshoff et al. (cited herein) which lists the states and spectra of monoxides, covering the spectrum between the ultraviolet and the far infrared, although I do not exclude others in the periodic table. In addition to monoxide and like spectra, the kinetics of baronal-type reactions also involve emission by neutral and ionized A species, the spectral data for which can be found in the standard handbooks.

A typical baronal-type optoexplosive is made of barium or magnesium nitrate and aluminum or zirconium powder in say 60:40 proportions; TNT, PETN, RDX, up to say 10 parts, can be added to enhance the detonation reaction and lift the reaction rate. A similar system studied by J.M. Gerhauser(cf. Ordnance, July-August 1967, pp. 1-2(article by W.W. Cavell et al.)) on the flame temperatures of metals(Mg, Al, Li, Ca, Ni, Ti, Bi, B, V, Mo, Cr, Mn, Zr, Hf) under oxidizing conditions established the brightness of a reaction, in addition to being a function of high flame temperature, as dependent upon the boiling point of the oxide and the solubility of the metal in its oxide.

Ternary and quaternary compositions may be exemplified by the foregoing working formula wherein $A_x(B)_y$ comprises two compounds, the cations of which may be the same of dissimilar and the anions of which are dissimilar when the cations are the same, as for example alkali metal chlorate and metal nitrate. Likewise, C may include two or more metal particulates and, in addition to the metals just listed, I especially point to particulate rare earth metals.

My broad designation by the foregoing formula for the baronal-type optoexplosives, therefore, gives a galaxy of agents of greatly widened scope insofar as choice of ingredients is concerned. When thermodynamic modeling is feasible(and it is not always available because of lack of thermodynamic data on substances of potential interest), such formulations are tractable to reduction by computer.

Certain metallic compounds, particularly metal-organic compounds, are a preferred class of optoexplosives. These include picrates, azides, fulminates, amides, and various double compounds. (Substances like chlorine azide, $ClN_3$, while not considered here are not excluded from the scope of this improvement; $ClN_3$ explodes with an emission from the ultraviolet(UV) to the red, intense in UV and blue, and peaking at 5000 to 5500A).

The explosive rearrangement of metal-organic molecules like the azide group bound to metallic cations known to be unique for spectral emission properties is an example. Thallium azide, $TlN_3$, explodes with a pronounced green flash(Tl(neutral atom) emits persistent lines at 5350.4(strongest), 3775.7, 3519.2, and 3229.7A; singly ionized Tl emits its strongest line at 1908.6A). The explosion spectra of the azides of Ca, Sr, and Ba show not only the triplet system but also lines of the singlet system. Zinc azide, $Zn(N_3)_2$, emits only triplet lines of the diffuse and sharp series. Oxide bands are also present in these spectra(cf. A. Petrikaln, Zeit. phys., 37, 610–618(1926); Chem. Abs., 20, 2791(1926)). The explosion spectra of various substances has been recorded by H. Muraour and A. Michel-Levy, Mem. Artillerie Francaise (Paris), 21, 263–270(1947). R.K. Landshoff et al.(cited herein) has tabulated the states and spectra of the following monoxides: Al, Be, Bi, Ca, Ce, Cu, Cr, Fe, La, Mg, Mn, Ni, Sc, Sn, Ta, Ti, V, W, and Zr; these data should be consulted in the workup of spectral data for the corresponding azides.

Because of the highly tempermental nature of certain metal-organic optoexplosives like the azides exceptional precautions must be taken in the preparation, refinement and handling of the substantial amounts which may be used in an optoexplosive light generator. It goes without saying that the artizan should very thoroughly acquaint himself with all aspects of the knowledge about a particular metal-organic optoexplosive, and should make scaled-down runs before attempting a full-sized shot made say from the piling of dry or semi-dry(preferably thinly coated with conductive polymer so as to prevent electrostatic charge build-up and detonation) bricks or briquettes. Reference should be made to Basil T. Federoff, et al., "Encyclopedia of Explosives and Related Items," vol. I, pp. A520–A73, CFSTI AD 257, 189, Picatinny Arsenal, Dover, New Jersey(1960), 691 pp., for information and extensive documentation of the inorganic and organic azides, azo compounds, and the like; also, H. Rosenwasser, "Hydrazoic Acid and the Metal Azides(A Literature Survey)," Rept. 1551-TR, 28 October 1958, USA Engineer and Development Laboratories, Fort Belvoir, Virginia, AD 208,892(437 references to the literature).

Metal-organics like the azides are extremely sensitive to friction and shock, so extraordinary and special precautions and measures must be used in the large-mass loading of an optoexplosive system. This loading is done by emplacement of a water slurry in situ, with subsequent drying or dewatering to bring the mass to the state necessary for the explosion. Among the various means which can be used are the following:

a. Pumping the azide or other slurry into the firing chamber of the explosion leg of the system, allowing the water to drain by gravity and other natural means, with a final gentle drying by circulating warm air over the mass;

b. Pumping the explosive slurry onto a horizontal pallet or tray, allowing the water to drain and evaporate, and then cautiously bringing the pallet up to or near vertical position, with a final drying by circulating warm air; a small amount of water-soluble binder such as methyl cellulose or polyvinyl alcohol is added to the slurry to keep the mass from crmbling; like (a), supra, this procedure can be carried out within a large, thin, transparent plastic bag first emplaced in the firing cavity, its bottom having drain holes;

c. As of (a) or (b), above, with internal warming means provided by circulating hot water pipes or by low-temperature pyrotechnic heater pipes, both embedded in the explosive mass, so as to drive off the undrained water at a slow rate and bring the optoexplosive to the required state of dryness;

d. Similarly to (b) and (c), supra, when an enclosure is utilized adjacent water-sorptive(e.g., silica gel) means for dry-out. Should there by compartmentalization(e.g., a backing cell to the pallet or tray) chemical desiccant like $P_2O_5$ can be employed(suitably chosen desiccants might also serve as brightness and temperature modifying dopants in the subsequent explosion);

e. The use of freeze-drying and soil dewatering techniques well known in the chemical process industries and in engineering, as for special applications or problem of handling and loading.

The sensitivity of the azides, like the fulminates, styphnates, and the like, can be reduced by leaving residual water and by dextrinating. The detonation velocities of these explosives depends, like most explosives, upon the density, so detonation velocity is generally on the low side of the values given in the literature, if not much less, e.g., about 4000 meters per second for lead azide, and about the same value for silver azide. For lead styphnate the value is approximately 5000 meters per second; and for copper chlorotetrazole the value is evidently not reported. Metal halotetrazoles, metal 2,4-dinitroresorcinates, and metal 4,6-dinitroresorcinol basics are included in the foregoing category. These and like substances may be preferable to the because of their lessened sensitivities which make for easier handling.

The tellurian optoexplosive light generator, in particular, is peculiarly suited for the use of chemical combinations, detonable or hypergolic, which are difficult to work with because of handling hazards, toxicity, and like factors. And especially when large masses of reactants must be manipulated for optoexplosive light generation, as for example between several hundred pounds and several tons or more. The oxidative optoexplosion of cyanogen($C_2N_2$), using oxygen, nitrous oxide, or other suitable oxidant is an example of a reaction having a brightness temperature ranging between 6000° and 8000°K. This reaction, as desired, can be doped so as to raise the color or brightness temperature. For example, an excess of carbon particles or of carbon in the stoichiometric or other reactant ratios; or of including very high surface area metals(e.g., rare earths, alkali, transition elements); or of including(e.g., as explosion leg filler) such gases as those of the inert family of He, Ar, Kr, Ne, Xe, or of other gases selected out of consideration of quantum mechanics and their behavior under excitation.

A large amount of work on cyanogen and other related compounds of the carbon, nitrogen, and oxygen system has been carried out by the A. V. Grosse group at Temple University, wherein flame temperatures between approximately 5000° and 6000°K were obtained, at pressures ranging between atmospheric and 40.82 atmospheres(600 psi). High temperatures are obtained from certain of the compounds of the N:C.(C:C)$_n$·C:N series reacted with oxygen, including gaseous ($C_4N_2$) and others.

Typically, the investigations of the John L. Wright group (as reported in Volume II of "Army Science Conference Proceedings," pp. 539–552, 14–17 June 1966(AD 634,616; the Wright paper per se is AD 634,655) set out light pulse data from cyanogen-oxidant combinations, particularly detonations sparked or squibbed at atmospheric pressure. I note that these studies establish feasibility and proof-out my U.S. Pat. No. 3,309,620, titled "Method and Apparatus for Pumping a Laser by Exploding Dispersed Metal Particles," filed Mar. 23, 1963, and granted Mar. 14, 1967. This, in turn, concerns optoexplosive sources utilizing metal or other particulates, as described elsewhere herein, as well as in the parent disclosure.

Thus in the reaction

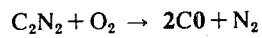

$$C_2N_2 + O_2 \rightarrow 2CO + N_2$$

high adiabatic flame temperatures are produced, the maximum theoretical temperature being 6200°K for 50:50 mixtures at atmospheric pressure(rising to 57 atmospheres pressure upon detonation). Detonation velocities are in the range of 2700 meters per second. The detonation time(i.e., the light pulse life) ranges between 50 and about 200 microseconds. Brightness temperature is increased by doping with an excess of carbon, and temperatures in the vicinity of 8000°K are attained by admixture of small amounts of such dopants as Ar, He, and Xe.

Illustratively, in this improvement I prefer to use the cyanogen reaction on a larger, pressurized scale. Thus, the cyanogen and the oxygen can be moderately presurized into a double balloon provided with suitable detonators. Balloon container materials include clear tetrafluoroethylene elastomer (Teflon) of the like. The balloon container is filled immediately before the explosion, each compartment having an inlet pipe. The disadvantage of the presurized balloon system is, of course, the limitation placed on the mass of reactants; however, for relatively small, low energy optoexplosive systems this is an advantage a sequence of runs is desired and destruction or injury to the firing leg is to be avoided(e.g., caving).

Alternatively, for high energy systems I prefer the use of (a) large masses(e.g., several tons or more) of reactants, (b) under pressure(usually liquified or, if not, in a suitable combination of dewars or cryostats which are separately vented to the surface of the ground) which are (c) implosively combined to give the optoexplosion. Admixture or commingling of the reactants isolated from one another in a compartmented container or two adjacent, fitted containers can be forced by low order explosion, including shaped charge means. The resulting optoexplosion may be symmetric or asymmetric, depending upon the form of the contained, reacting masses, and upon whether or not a directed energy explosion is used for their blending. As desired, part or all of the container may serve as dopant(e.g., when coated with dopant), to raise the brightness temperature.

Cyanogen is liquid below 34.4°C; it is soluble in water, ethanol and diethyl ether. Above 500°C cyanogen forms a solid, paracyanogen, (CN)$_n$, a substance of potential as a reactant. The oxidants may be several, as for example liquid air, liquid oxygen(with or without carbon(a commercial explosive known in that art)), liquid ozone(liquified at approximately $-193°C$, obtained as a blue liquid by supercooling ozonized air), and liquid or pressurized nitrous oxide, $N_2O(-90.8°C)$.

For highly pressurized reactants, supra, which are to be explosively blended, a convenient container is that of biconical geometry, with the cone bases in apposition(i.e., diameter largest at the girdle), and with a frangible wall separating the two conical chambers. At each end is placed a shaped or other explosive charge, the two detonated simultaneously. When of the gas-bottle type of pressure container, middle and side wall strengths should be such that they are ruptured. When of the dewar-type each compartment is provided with inlet pipes for filling, and with separated, outlet pipes for venting.

For the aid of those in the art the following literature relates to cyanogen reactions and the kinetics thereof: H.E. Williams, "Cyanogen Compounds: Their Chemistry, Detection and Estimation," London, Arnold & Co., 1947; V. Migrdichian, "The Chemistry of Organic Cyanogen Compounds," New York, Reinhold, 1947(Amer. Chem. Soc. Mon. No. 105); H. James et al., Compt. rend., 236, 811–813(1953); H. James and P. Lafitte, Fifth Symposium on Combustion, Pittsburgh, Pa.(US), pp. 616–619 (1954); Basil T. Fedoroff, "Enclyclodepia of Explosives and Related Items," vol. III, Picatinny Arsenal Tech. Rept. 2700, Picatinny Arsenal, Dover, New Jersey(USA) 1966(cf. pp. C–586 to C–588, wherein such compounds as cyanogen bromide, cyanogen chloride, cyanogen fluoride, cyanogen iodide, and others are described); A.V. Grosse and C.S. Stokes, "Study of Ultra High Temperatures," (Temple University Research Institute, Philadelphia, Pa.), U.S. Dept. Commerce, OTS Rept. PB–161,460, 26 pp. (1960).

When, as for example using a CX source 10d in FIG. 5, 10d is a cylindrical mass aligned so that its long axis is parallel to 76, as is detonated at the butt end, the resulting explosion is "quasi-asymmetric"–for the direction of the light output is not perpendicular to the axis, but is inclined in a direction opposite to that of the detonator. In the case of FIG. 4, where 10c carries the detonator at its center and say mid-way along the cylinder, the same thing obtains, except that the explosion energy issue is bilateral in the direction of 64 and 74(or 56 and 66, as the case may be).

These cylindrical explosions, as they are termed in the art, have for example been investigated by R. Collins("Some Methods of Generating Cylindrical Explosions," Univ. of Toronto, Institute of Aerophysics, UTIA Tech. Note 43(1960). Solid, liquid and gas-mixture explosive compositions exhibit cylindrical explosions phenomena. Features such as the main shock wave, contact front, and imploding second shock wave are present in these explosions.

The cylindrical explosion is particularly suited for use in optoexplosive systems where directed-energy explosions are desired, e.g., directed into the shock-sink; also, where gas and liquid explosives are employed in repetition shooting when system integrity is to be maintained.

The cruciform luminsoty phenomenon is an explosive effect highly adapted to asymmetric energy release, particularly in the case of multilegged optoexplosive light generators. When a cube of explosive is detonated the resulting explosion takes the form of an optical cruciform having its legs in directions perpendicular to the faces of the cube, with a dark zone all around the crucifix(called the "dead zone" or "zone morte").

Therefore, in FIG. 4 for example, when source 10c is a cube or rectangle, energy will be directed into legs 56 and 66(with, of course, corresponding lateral emission). Should FIG. 4 take the form of a Y, then a prism of explosive is employed, each face of the prism facing into each of the light-legs and thence into the shock-sink legs. Should FIG. 4 take the form of a crucifix, with four legs, then the cube of explosive is arranged so that each of the faces corresponds to each of the legs. Likewise, should FIG. 4 be of what I have previosly called "spider-leg" configuration, i.e., of many branching legs, then a polygonal mass of explosive is utilized, the number of faces corresponding to the number of legs.

For additional information on the theory and mechanics of the cruciform luminosity phenomenon and like asymmetric effects, the artizan is referred to: E. Burlot, Mem. Artillerie Francaise(Paris), 9, 789–957(1930); P. Demougin, ibid., 9, 961–972 (1930); H. Ahrens, Zeit. gesamte Schiess- under Sprenstoffwesen-Nitrocellulose(presently Explosivstoffe(Munchen)), 38, 175–177 (1943); H. Muraour, Compt. rend., 222, 1108(1946); A. Michel-Levy, ibid., 223, 62 (1946); D. Riabouchinsky, ibid., 237, 222–224(1953); also, the Federoff tomes cited herein(vol. III, C563–C564(1966)).

The shaped-charge can be fabricated in the usual manner from explosive material of desired detonation rate(cf. the table given previously herein). For extra-large shaped-charges, or those of special configuration, where casting or conventional methods are difficult or not feasible, the technique I have devised(and tested using dynamite powder between two sheets of heavy paper) may be useful: Namely, an asymmetric charge rolled into shape from a flat sheet. Detasheet flexible explosive(= PETN(ca. 85 percent + elastomer binder), having a detonation velocity of the order of 7200 meters per second, is first cut into a right-angle triangle. This triangular sheet is then truncated by cutting off both of the acute angle ends, the truncation of each being decided by the length of cone-apex-to-base and the overall diameter of the final product desired; the angle of the cone is determined by the angle of the greater of the two acute angles; the length of cone-apex-to-base is the truncated length at the lesser of the two acute angles. The sheet thus cut is then rolled back onto itself, beginning with the truncation at the lesser angle, with a cylinder having a coned face being the result. As desired, dopant metal(Al, Zr, rare earth), carbon or the like may be rolled into the shaped charge formed in this way. Cement may be applied to the surface just before rolling, or the cylinder may be tied. Detonation, with or without booster, at the base is done in the usual way.

Illuminating flash and flare and light-signaling compositions are chemically designed as light producing media(involving not only the visible but also the ultraviolet and/or the infrared). By nature these are considered as burning or deflagrating, as contrasted to explosive in their behavior. However, when highly confined so as to permit pressure buildup, most of these agents become explosive, producing a shock along with the light output.

In this improvement I employ as a CX light-emitting source an otherwise pyrotechnic and deflagrating composition, as desired. Instead of container confinement I prefer implosion confinement of the pyrotechnic material. Thus, the pyrotechnic may be a component in an optoexplosive system which comprises a mass of that pyrotechnic having mild implosion means, e.g., one or more hemispheric hollow charges, enveloping the pyrotechnic. These shaped charges act as the confining "container", allowing pressure build-up and resulting explosion of the light-emitter. The explosion "container(s)' may be of any suitable size and configuration, and of explosive well known in the art; the implosion sheaths or envelopes are squibbed and detonated in the usual manner, e.g., as by electric firing.

Alternatively, explosive pressurization or compaction can be used upon an otherwise deflagrating, light-emitting composition(or other suitable compositions or substances, described below) so as to induce an optoexplosion in that composition. This includes the simple expedient of sandwiching a layer of the composition between two steel plates (making a flat sandwich when the plates are parallel, or a wedge-shaped sandwich when they are angular to one another). The top plate carries a slab of explosive, which upon detonation causes the explosive pressurization and compaction. The light is released from the edge of such a sandwich, so the ensemble should be aligned accordingly in the optoexplosive system. Other, more elaborate and sophisticated arrangements of this kind can follow the techniques employed for explosive-cladding and forming of metals. In this and like instances there is a layer of light-generating reactant which undergoes high-rate and high-force pressure effects between a slapper and an anvil.

So that enhanced light-releasing area is obtained such an ensemble may comprise a core of driving explosive within a slapper tube which is made up of two, three or four "petal" members (which move outwardly in the discoid or doughnut arrangement upon explosion of the core). The petal members, in turn, are surrounded by a ring of the optoexplosive composition and this, in turn, is rimmed by an outer hoop of high-strength steel which makes up the anvil. This explosive disc ensemble is characterized by a greater light-emitting area, and may be of any desired diameter and thickness.

When greater explosive forces are required for the pressurization and compaction process what I call an "implosion doughnut" can be utilized. Illustratively, this is a doughnut ring or a segment of same (e.g., of an anchor ring or torus) of square, rectangular or circular cross-section; the ring or segment thereof may be formed as a single piece or may be assembled from a series of segments. The inside surface of the ring is grooved, e.g., having a V-shaped or U-shaped or like groove, and the peripheral edge is provided with a series of detonators, it is seen that a "shaped implosion charge" is the result. The ring may be of cast explosive, pressed explosive, or molded explosive composition characterized as having a high detonation velocity (e.g., TNT, RDX, PETN, Astrolite(not the "astralite" of the earlier explosives art) compounded into a settable preparation with suitable cement or binder, and the like).

The hole of the implosion doughnut is filled with chemical or nuclear(as for low-grade explosions; cf. my discussion hereinafter on this subject) explosive reactant. Simultaneous firing of the detonators(with detonation of a booster ring which may be present) results in an implosion which rises to a pressure peak and then quickly drops off as the reactant undergoes reaction and escapes from the face of the doughnut. Such an implosion doughnut may or may not be backed by a contact wall of high-strength metal or very hard rock, as desired. When light-release from the hole filler is desired from both sides such backing of course is not used(e.g., as 10c in FIG. 4).

Illustratively, the reaction of $$Ca(NO_3)_2 \cdot 4H_2O + 5Ca \rightarrow 6CaO + N_2 + 4H_2O$$

with 46% Ca and 54% $Ca(NO_3)_2 \cdot 4H_2O$ proceeds in a typical deflagration, with a theoretical energy output of 1.45 Kcal/gm.

However, when this afore-mentioned mixture of calcium and hydrated calcium nitrate is pressurized to approximately $14 \times 10^3$ psi, an explosion occurs. At this order-of-magnitude pressure or greater, as may be produced by implosion confinement, I consider that the light-emitting species are not the same as those of the simple deflagration. Thus, a portion of the light emitted in the optoexplosive reaction can be considered derived from $CaO(^1\Sigma)$:

| State | Energy | F.S. | System | v' | v'' | Wave lengths (A) |
|---|---|---|---|---|---|---|
| $A^1\Sigma$ | 0.94 | X | Red | 5 | 3 | 9229–7308 |
| $B^1\Pi$ | 3.2 | X | Blue | - | - | 4519–3373 |
| $C^1\Sigma$ | 3.6 | X | UV | - | - | 3753–3287 |
| ? | - | - | Far IR | - | - | 10533–9133 |

(Notes: (a)Light generation together with the deflagration behavior of the $Ca + Ca(NO_3)_2 \cdot 4H_2O$ system is set out by R.M. Blunt, "Evaluation of Processes Occurring in Pyrotechnic Flames," Denver Research Institute, Denver, Colorado, RDTR No. 91(AD 655,820), 75 pp. (cf. pp. 4–5), 15 March 1957, including magnesium and calcium species spectra, and a resume of the important papers since about 1920 on sodium spectra (see dopants herein). (b) In the aforementioned data for the CaO molecule and its ground state and higher energies are first given, with the initial and final states of the transition given by the system; v' and v'' are the maximum and initial and final vibrational transitions; wavelengths refer to those of the transition, according to the best data I have at hand (Table of the States and Spectra of the Monoxides, p. 290–295, in DASA 1917-4, "Thermal Radiation Phenomena," volume 4, "Excitation and Non-Equilibrium Phenomena in Air," by R. K. Landshoff and J.L. Magee, Lockheed Missiles and Space Company, Sunnyvale, California, November 1967(AD 664,496)).

It is not practicable here to go into detail on pyrotechnics, especially as it relates to flare, flash, illuminating and like preparations. Suffice to say, however, that the foregoing example illustrates the domain of explosively or implosively confined light-generating chemicals.

In this connection I would especially point to those pyrotechnic and deflagratable compositions set forth in my U.S. Pat. No. 2,995,526(filed July 27, 1951 and granted Aug. 8, 1961), wherein some 600 varieties of preparations including about 60 different elements are disclosed. Although originally intended as smoke-forming munitions, these pyrotechnic compositions, upon implosive reaction—especially with an excess of fuel and/or oxidant to raise the reaction temperature—offer a large number and wide variety of light emitters. Thus, since my tests and studies from about 1950, with an intensive following of the literature on pyrotechnology, there has been a paucity of information on preparations containing oxygenated and peroxygenated halides other than chlorine. As for example, bromates, iodates, and perfluorinated compounds, both organic and inorganic.

There is an abundant literature on light-creating pyrotechnics, and the artizan is referred to the following examples: A.A. Shidlovsky, "Fundamentals of Pyrotechnics," 3d. edition, Tech. Memorandum 1615, translated by U.S. Joint Publication Service from "Osnovy Pirotekhniki" (1964), May 1965, 414 pp. + 308 references, AD 462,474; Duane M. Johnson, "-Proposed Kinetics and Mechanics of Illuminant Flares: Maxi-mizing Efficiency," U.S. Naval Ammunittion Depot, Crane, Indiana, 13 January 1966, 40 pp. + 6 references("...the best combination of chemicals for illuminant flare compositions has continued to be a fuel-rich mixture of magnesium and sodium nitrate. Unfortunately, very little information is available to explain the reason why this type of composition gives the best illumination efficiency.")(AD 627,649); John E. Wildrige, "Experimental High Intensity Flare Systems; Design and Tests of," ibid. August 1966, 111 pp.(AD 638,490); J.N. Gerhauser, "Spectral Emissivity of Flash Combustion Reaction Study Program(Final Technical Report)," North American Aviation, Inc., Los Angeles, California, 1 June 1963 to 31 May 1964, 152 pp.(AD 443,158); Paul Tavernier, "Contribution to the Study of Flash Powders," Tech. Memorandum No. 1082, by U.S. Joint Publication Research Service (October 1963) from The Laboratoire De La Commission Des Substances Explosives, 17 May 1944(AD 42,446); Basil T. Federoff, et al., "Encyclopedia of Explosives and Related Items,"(vol. I. 1960(AD 257, 189);vol. II, 1962(AD 422,747); vol. III, 1966(AD 653,029)), Picatinny Arsenal, Dover, New Jersey(USA); Ibid., "German Section," 1958(AD 160,636), PATR 2510; and, of course, the usual books and periodicals on explosives and the like.

Encapsulants(or microencapsulants when on small scale) can be made free-flowing, after the manner of dry powders, even though they contain liquid cores; thus, liquids can be handled as if they were solids, volatile materials and reactive compounds retained and then released under selected conditions, and sensitive materials susceptible to moisture or oxidation preserved until needed. By varying the wall thickness and mass a time-delayed release can be had. And by varying the nature of the wall material that material can contribute to chemical reaction, e.g., as a fuel. Microencapsulated moieties can be produced over a wide range of temperatures involving a wide range of atmospheres, e.g., formed within inert gas atmospheres when highly reactive substances are encapsulated. While the wall material of the coacervated product is most often organic, it may also be a specialty substance like fluorinated polymer or silicone or metal imidazole.

Many substances alone flare in combination are uniquely interesting as optoexplosives, but are not ordinarily practicable because of instability singly or ultraviolet multibase mixture, sensitivity to low-order kinetic forces, volatility, extreme chemical reactivity, and the contrasted The literature is, in fact, filled with examples of this kind of material—not used because of the various working obstacles they present. I prefer to overcome these obstacles by isolation of the substances, typically by microencapsulating the various ingredients and then by combining these into the final polyphasic product.

Briefly, the art of microencapsulation—dating back some 30 or more years—embraces the conversion of two-phase systems into one-phase by encapsulating the reactive ingredient(s) to block their activity until such time as they are required for use. Microencapsulation involves the formation of small spheric bodies, usually between several microns and upwards of a centimeter in diameter, comprising a wall or envelope enclosing the active medium of gas, liquid or solid, generally the latter two states. The envelope is most often a polymeric substances like gelatin, polyvinyl alcohol or the like, which may be reinforced by additive and/or hardened by subsequent chemical treatment.

Thus, optoexplosives or optoexplosive ingredients which cannot be worked alone or, especially, handled in the large amounts which may be required for certain versions of the present invention, microencapsulation is frequently the answer; the following substances, liquids and solids, are usually compliant to this approach, illustratively including for purposes of this disclosure:

i. highly reactive substances characterized by an exceedingly high surface area, as for example particulate, dust and filament solids like colloided metal powders and pyrohphorics;

ii. alkali and alkaline earth metals, including alloys thereof;

iii. peroxy compounds, particularly peroxy organics and peroxyacids;

iv. reactive allotropes like white (or yellow) phosphorous;

v. fuel-oxidizer type multibase compositions wherein incompatibility precludes use, especially on a large scale (a study of the literature on propellent double-base and multibase candidates that have been excluded because of explosive or other dangerous qualities provides a very good guideline, and the same is true for the same reason for rejects in the deflagratives and pyrotechnics art(e.g., flare, flash, smoke, and like munitions);

vi. ozone, fluorine and like enriched agents such as solutions and sorptives; also, ozonides, which are notoriously difficult to handle;

vii. interhalogen compounds like chlorine monofluoride, ClF; chlorine trifluoride, ClF$_3$; iodine pentafluoride, IF$_5$; bromine pentafluoride, BrF$_5$; bromine trifluoride, BrF$_3$; and the like;

viii. oxyhalogen compounds like chlorine heptoxide, Cl$_2$O$_7$ chlorine monoxide, Cl$_2$O; chlorine dioxide, ClO$_2$; fluorine nitrate, NO$_3$F; so-called fluorine perchlorate (chlorine tetroxyfluoride), EClO$_4$; perchloryl fluoride, ClFO$_3$; and the like.

A further advantage of microencapsulated explosives is the cushioning provided by both the resilient wall member and the matrix gas, if any, or the matrix liquid (which may be reactant, as desired), to protect the sensitive material from insult. Note is made of the fact that the wall of the encapsulant body can be electrically-conductive, as may be the case with the encapsulant environmental medium, to prevent build-up of electrostatic charges.

Encapsulated substances—herein generally designated as microencapsulated—of the optoexplosion modifier kind are mentioned elsewhere in this disclosure.

NUCLEAR OPTOEXPLOSIVES

From an applications standpoint the blast energy of an NX device has dominated the art. Materials treatment by NX blast is exemplified by the PLOWSHARE program of the United States, involving nuclear mining engineering and excavation. Penetrating electromagnetic and particulate radiations uses are usually of secondary role, as in tellurian transuranium isotope studies. Sundry proposals and investigations embrace the thermal effects of NX energy on mineral values in situ. Information on the status of the subject can be found in "Major Activities in the Atomic Energy Programs," January-December 1967, 397 pp., U.S. Atomic Energy Commission, Washington, D.C., 1968 (U.S. Government Printing Office).

A varying and often substantial portion of the energy released in the explosion of an NX device is optical energy, depending upon the yield, nature and design of that device, and depending upon the environment in which it is exploded. Except for direct conversion to heat by absorption in a material, the optical energy per se and substantially freed of blast and shock and explosion debris, and penetrating and particulate radiations, has not been hitherto available, let alone used, in the case of close-in NX explosions (e.g., explosions typified by distances from the shot where blast and non-optical radiations are overwhelming by their magnitude).

In this invention I extract and isolate the light per se of a close-in NX explosion and, as desired, manipulate it in one or more of several ways; for example:

a. When the raw light is extracted from a nuclear explosion free of extraneous energies, I call this "clean atomic light" and designate it by the acronym "CAL"; a CAL beam can be impacted upon an irradiable target to produce photophysical or photochemical changes therein, for example;

b. Under ordinary circumstances an NX device-powered tellurian optoexplosive system produces a CAL beam of round or circular cross-section with a face area which may vary between several and several hundred square feet. However, when the CAL beam is passed through aperture means of desired configuration the resulting CAL beam is changed into what I call a "shaped atomic light" or "SAL" beam. One utility of the SAL beam is that it can be made to correspond to the profile of a near or far target, consistent of course with ancillary optics which may be included in the fashioning of the beam and consistent with the inverse square law; additionally, the limitations placed by the inverse square law can be overcome by use of a flux redistributor system (described hereinafter);

c. Without further manipulation the CAL or SAL beams will generally have a more or less uniform energy density across the face at a given point; however, by suitable treatment, e.g., selected portions of the beam given reflection or reflection-diffraction pass through a flux redistributor (cf. FIG. 5), the energy density at a given point may be made to vary within that beam, as for example a longitudinally bisected CAL or SAL beam of halves of different fluxes;

d. By means of a multilegged system (as in FIG. 4), two or more CAL or SAL beams can be fashioned so that each is of different spectral qualities, as for example two invisible beams one of which peaks in the ultraviolet and the other of which peaks in the infrared; this is accomplished by the use of FRO means in the legs, each of appropriate and different optical behaviors; in turn, these two or more beams can be worked together;

e. Following from (c) and (d), supra, multiple and/or longitudinally multisected beams may be spectrally different;

f. An additional working of the two or more beams results from either the superposing or sequencing of sinusoid light bits obtained from timed-life FRO means of different lives;

With the target including suitable optics, as for example a train of imaging reflectors, the aforementioned arbitrary, working distinctions for the light enable mixing, non-linear working, or other optical treatment. In effect, then, by changing the design and performance parameters of this as well as the parent invention there may be obtained an explosion-produced light beam characterized by:

1. Time (or integrated energy)-modulation;
2. Frequency (or wavelength)-modulation;
3. Intensity-modulation;
4. Combination of these.

While I have just described the fashioning, working and manipulation of optoexplosively-derived light within a nuclear source framework, it is evident that what I have stated holds equally for the light emitted by chemical optoexplosives.

As to the characteristics of NX energy sources, these have been published in such sources as: W.J. Frank, "The Characteristics of Nuclear Explosives," (pp. 65–68 of the Third Plowshare Symposium Proceedings, 1964, cited herein); also, S. Glasstone (ed.), "The Effects of Nuclear Weapons," rev. ed., U.S. Atomic Energy Commission, Washington, D.C., 1964, which also sets forth literature references of interest to the artizan.

A nuclear reaction under explosive or implosive confinement produces enormous energies for the mass and volume of the materials involved. NX sources may range down to 1 to 2 T in yield, and of course upwards by a factor of $10^3$(KT) or $10^6$ (MT). The traditional unit for measuring NX explosive energy is the kiloton($10^3$ T) TNT energy equivalent:

$10^{12}$ calories
$4.2 \times 10^{19}$ ergs
$1.2 \times 10^6$ kilowatt hours
$4.0 \times 10^9$ British thermal units (Btu)
12.6 Gigajoules(GJ)

Although there is a substantial body of knowledge extant as regards NX device yield and the partition of the energies of that yield, most symmetric NX explosions have common qualitative and quantitative features. Illustratively, these are set out by R.E. Jones("Nuclear Weapon Burst Parameters Governing Urban Fire Vulnerability", U.S. Naval Radiological Defense Laboratory, San Francisco, California, CFSTI AD 659,981, 24 pp., 12 ref., 24 May 1967), including the following aspects relevant to the present invention:

The initial phase of a nuclear explosion proceeds in a manner independent of the surrounding environment. Within a fraction of a microsecond after detonation, the fission products, device casing and ancillary, close-in debris, and like material, are raised to a temperature of several tens of millions of degrees. Before the explosion plasma has time to expand appreciably (within a microsecond), about 70 percent of the total energy present appears as "thermal radiation"(as it is called in that art) in the form of soft X-rays of several kiloelectron-volt energies, depending upon the temperature produced by the NX device. The remainder is primarily contained in the kinetic energy of the vapor-plasma entity, which expands until collision with the environmental medium at a velocity of about $0.5 \times 10^6$ feet per second.

In an air shot at about sea level or at low altitudes the primary thermal X-rays are absorbed within a few feet of the device, producing exceedingly high temperatures within the initial fireball. The energy is immediately reradiated and again absorbed in the surrounding air; hence, the fireball grows at high velocity as the radiant energy diffuses outward. Since the mean free path of the thermal radiation in air at these temperatures is large compared to the fireball dimensions, energy is rapidly distributed within the fireball, and the temperature throughout remains quite uniform as the fireball grows and cools. The mass of hot gases(or plasma) in the region behind the radiation front is referred to as the isothermal sphere.

The spectral distribution of radiation from the fireball can be approximated by the spectrum of a black body corresponding to the surface temperature of the fireball. In the more conventional NX explosions, which are not necessarily dealt with herein, only relatively low energy(visible and near-visible) radiation, a small fraction of the total, escapes from the immediate vicinity of the isothermal sphere during the early stages, and substantially all of the short wavelength radiation is reabsorbed by the surrounding air.

In the nuclear explosion art it is generalized that fireball temperature at the second thermal maximum(92 in FIG. 6) decreases slightly as the yield of the NX device increases, not considering the aforementioned phenomena dependent upon a surrounding gaseous medium. An approximate function which describes this variation derives from knowledge of the thermal pulse shape and fireball size(note is made, again, that this is essentially an uncontained fireball; and that evidently little is known about highly, partly or vented subterranean fireballs in this respect, which is quite germane to the improvement here addressed to) and the Stefan-Botzman law for the power emitted by a black body;

$$p = \sigma A t^4$$

where:
$P$ = the power
$t$ = the temperature of the body
$A$ = the emitting area
$\sigma$ = the Stefan-Boltzman constant
and that:

$$t_P = (P/\sigma A)^{1/4}$$

represents the power temperature of the fireball. Note is to be made of A as not being equal to that of a sphere, $4 \pi r^2$, in the present improvement because of aperture or throat or FRO surface of the optoexplosive light generator.

Subsequently, there is a sequence of radiation-pressure mechanisms, explained usually on a hydrodynamic basis, the temperature drops to a typical value of just under $10^4$ °C, with most of the radiation lying in the visible, and corresponding to the time when the fireball reaches maximum size. Roughly, approximately 30 to 40 percent of the NX device energy is converted into thermal radiant energy, the preponderance being in the visible and near-infrared portions of the spectrum, with the balance as kinetic blast energy, i.e., at about atmospheric pressure. The spectral distribution of the thermal energy does not exactly correspond to that of a black body, and is depleted in the ultraviolet and the infrared.

However, viewed as a Planckian radiator a good approximation is obtained for the conventional NX explosion at hand: For typical fireball temperatures the Planck spectrum predicts about 10 percent of the energy in the ultraviolet, 40 percent in the visible, and 50 percent in the near infrared. Likewise, for the usual, non-optoexplosive NX device, i.e., the NX device not optimized for the generation of optical radiation, as should be the case in the present improvement in certain of its modifications, about 1 percent of the total thermal energy is released in the prompt pulse(90 in FIG. 6), with about 99 percent in the second pulse(92 in FIG. 6) which is radiated over a much longer period of time and at a lower temperature.

At NX burst altitudes of approximately 50 miles— or the equivalent in a depressurized optoexplosive system—the atmosphere can no longer be assumed isotropic, since the mean free path of the primary thermal X-rays(and thus the radius of the initial fireball) balloons to some tens of miles. Because of the density gradient, in a high altitude explosion, the otherwise spherical fireball becomes spheroidal, prolate above and oblate below, and at even greater altitude equivalents the distortion will be extreme. The thermal radiation at ground level will consist of two main components: (a) a brief flash of a few microseconds lifetime, the visible and near-visible tail of the high-temperature NX device plasma spectrum being followed by (b) a pulse of longer duration emitted by the excited region of the tenuous atmosphere. The extra-visual portions of the spectrum may be enhanced.

Viewed simplistically the fireball from a just-detonated NX device, as well as that from a CX device, is a "plasma balloon," having high-rise rate(several hundred feet per second in the case of an open NX burst, more slowly in the case of CX detonations) and unique buoyancy—maintaining a certain structural and configurational integrity until it breaks out, as by hydrodynamic separation.

Thus, when a T or Y or like bifurcated explosion leg (e.g., 96,102 in FIG. 7, and 110, 120 in FIG. 8, with the light-traversing legs 104 and 117, respectively) carries an optoexplosive source(say at 10e(FIG.7), 10f(FIG. 8), and the other members shown in these drawings are not present), the explosion of that source results in the plasma balloon I have described, which rises and thus removes itself from the line-of-sight communication with the FRO means.

By venting the top arm of the T or Y or the like, venting can be obtained; otherwise, rebound into the lower arm, with an essentially lateral to-and-fro fluid flow between the side-arms(with of course some escapement, depending upon the configuration of the system), to decompose and dissipate the plasma balloon.

Similarly, taking FIG. 7 as an example of a T butt configuration, should the NX device 10f(or a CX device, as may be desired), be emplaced in the lower arm 102 and detonated, the plasma balloon will first form and then be constrained by the walls of the system, forming a plasma piston which will shoot upwards into upper arm 196(again, in this illustration members 94, 98 and the like are not present). If arm 96 rises to and opens at the ground surface 20e, the thusly-formed plasma piston follows the course of least resistance and vents at that ground surface. However, the plasma traverses the T made with leg 104 and light 106 therefrom passes down 104; the duration of this pulse depends of course upon the length and velocity of the plasma piston, and in any event generally making for the production of a lengthy light pulse 106. The easement of the plasma in its movement from shot point within 102 and up into and out of 96(should the venting modification be involved and, as just pointed out supra, this may not always be desirable) can be obtained by making 102 and 96 of relatively large diameter as compared to leg 104, offering by least-resistance pathway a lessened spillover of plasma into leg 104.

Knowing the expansion velocity of an NX or CX fireball readily enables those in the art to calculate the length and therefore the duration of light pulse production when the throat diameter of leg 104 is also known(as by a systems science reduction to a least-parameter model), although in such calculations the fluid mechanical properties of the plasma generally enter into the figuring at a more refined level.

It is noted in these versions that the burst or detonation light from an optoexplosion is not utilized, for that prompt pulse of optical radiation largely is confined within the arm 102 of the T—or its equivalent. Rather, the highly reacting or "combusting"(sometimes called "afterburning") explosive and explosive device and optional (e.g., dopant) materials account for the light production. The situation is well adapted to the use of dopants as liners or means say upon the walls of arms 102 and/or 96(in the latter instance as when the plasma is made to rebound back-and-forth between 102 and 96 in a partially or fully closed T configuration, until dissipated). Likewise, such an arrangement is suited to the employment of optoexplosives characterized as of the long-lasting low-order detonation or near-pyrotechnic kind, so as to yield a maximum of plasma. Highly brisant optoexplosives are utilized when comparatively short pulse outputs are desired, although usually with concomitant insult to the structure.

Illustratively, if an optoexplosive detonated say off-alignment with 106 as in FIG. 7, e.g., emplaced in sump 102 for that detonation, and within 10 milliseconds produces a fireball of 15 yards diameter, then the unconfined(as when 102 is larger than 15 yards in diameter) plasma balloon will occupy a volume of approximately 1750 cubic yards. Fifteen milliseconds later, when the plasma balloon is 50 yards in diameter, i.e., at 25 milliseconds from detonation, the spheric plasma body mensurates out to 6500 cubic yards volume. Assuming a cylindrical member like 102 in FIG. 7, and knowing its diameter, the rough length of the plasma piston formed once the plasma balloon is constrained and formed into the piston by arm 102 conveniently follows from the usual relation for the volume of a cylinder, $\pi r^2 l$ ($r$ = radius, $l$ = length); or when of square cross-sectional face from $S^2 l$ ($S$ = face side, $l$ = length); or when of hexagonal section, $0.866 f^2 l$ ($f$ = distance between opposite faces of the hexagon, $l$ = length of the hexagon); or when of octagonal form, $0.829 f^2 l$ ($f$ and $l$, as before); and the like, including frustrum-joined configurations(as 102 and 96 in FIG. 7) at the intersection with leg 104 of FIG. 7(which, for example, may be round, elliptical or the like), like variously truncated cones and polygons, e.g., a pyramid.

The explosive coursing of a plasma mass from one side arm into a second side arm in communication therewith, and passing by an apertured stem(as illustrated here by shot within 102, traveling past 104, and through to 96 in FIG. 7), with stem 104 offering pressure release and shock dynamics like diffracted shock, secondary or reinforced reflections, and Mach-stem effects involves attendent fluidics, hydrodynamics, plasmadynamics and gasdynamics, among other features, which will not be detailed here, as these involve computerization for the solution of situations concerning the spill into the leg like that of 104(FIG. 7) of plasma(which may be taken as fluidic medium) and of kinetic energies like blast.

The otherwise wasted energies of the spilled plasma and blast, into the leg 104 optically coupled with the FRO means, can be reconstituted as useable optical radiation. For example, as by the employment of 104 dopant liner to take up and reradiate plasma energy; as by the use of fast-time fluorescent transducers for the same purpose; and as by loading part or all of leg 104 with luminously-shockable gaseous medium like a noble gas, with or without containing partitions singly or multiply sectioning out portions of 104.

Abruptly shock-densified nuclear reactant generates explosive energy by two processes: (a) fission, e.g., of uranium or plutonium isotopes, and (b) fusion, e.g., of deuterium and tritium, the latter forming out of the fragmentation of lithium-6. NX energy sources can be controlled by proper design of the device: The desired amount of energy can be metered out, although it is not always evident from available information just how this energy is partitioned; the release location can be designated and controlled; and the time of release of NX energy can be determined.

NX devices can be optimized in design for some single property or characteristic, although as I point out in the present disclosure, designs maximized for say the ultraviolet-visible-infrared window of the atmosphere(of principal interest herein) seem to have received attention not at all or at least secondary to blast and other forms of energy. When small diameter or cost are paramount, these features can be designed into an NX device. Often there are trade-offs between the attributes of particular NX device designs.

Thus, herein the primary function of the NX energy source is an optoexplosive one, wherein optimizing for light output with or without attendant reaction rate change, and with or without dopants(as contrasted to "salting" agents which relate to another facet of the NX art), there is included: (1) varying the criticality and/or (2) varying the symmetry of the nuclear reactant, as for example singly or combined the following:

a. Reducing the criticality by lessening the enrichment of the nuclear reactant, as by alloying with the same element(but of different isotopic species), or by use of an additive element in alloy, solid-solution, chemical combination or like form, in which case the element(s) is essentially nuclear non-reactive and say of appropriate(e.g., low) neutron-capture cross-section;

b. Lowering the density of the nuclear reactant, as by explosive liquifaction(e.g., ensembling the nuclear reactant as liner, cone, filler or like element in one or more hollow-charges of the NX device), or by gasification-compaction techniques(discussed subsequently);

c. Reducing the reflected neutron flux, as by decreasing the surface area and/or changing the profile of the neutron reflector;

d. Changing the shape of the nuclear reactant by raising the surface-to-volume ratio, as by powder metallurgy and foamed-metal techniques;

e. Demoderating by reducing or modifying the moderation envelope;

f. Tamping, as by use of inclusives(e.g., particulates, cellulants(gas-loaded spheres and foamed-metal members), foil, rods, and the like-which may or may not act as dopants) characterized by appropriate(e.g., high) neutron-capture cross-section.

Furthermore, the performance of an NX device can be altered by suitably changing the nature, strength and configuration of the CX explosive media which actuate it.

Since the rise-time of the prompt pulse of an NX explosion may be of the order of $10^{-8}$ second (or 100 nanoseconds) (approximately the time constant for optical transitions in many substances, which value should be contrasted with the typical $10^{-15}$ second taken as reflection time), the foregoing can also be employed to: (I) change the rise-time by varying the nuclear reaction rate, and/or (II) expand the time base of pulse 90 and foreshorten or coalesce pulse 92 into 90, making for more of a monopulse in FIG. 6, so as to provide a more useful optoexplosion, and, hence, to better match the optical absorption-reflection parameters of the FRO.

In the conventional NX device art and in the various nuclear explosions I have observed, the resulting explosion is usually regarded as substantially a symmetric one, i.e., spheroidal or approximating same until the point of environmental factor take-over. In certain versions of this invention(e.g., where venting, fireball plasma, and pressure problems are severe) I prefer to utilize an asymmetric or aspheric NX device explosion.

Asymmetric NX energy sources, for purposes of this disclosure, can be said to fall into two categories: (a) gun-type and (b) implosion, as follows:

a. NX source 10d in FIG. 5, for example, may comprise the usual constraining envelope carrying the necessary fissionable pieces, which are explosively brought together for the fission reaction by CX charges on either side of the group of pieces; however, in order to make the resulting explosion asymmetric or the analog of CX cylindrical explosions, with the preponderance of released energy emitted from one end of the tube over that of the opposite end, one of the two CX charges is stronger than the other. Thus, at the butt of 10d there is placed a more powerful shaped charge, whereas at the front(in the direction of 76 and 88) there is placed a less powerful shaped charge, with the fissionable matter ancillary elements between the two. Other versions of this basic approach by asymmetric NX explosions, adapted to say multilegged optoexplosive system like that of FIG. 4 within design capacity of those skilled in the NX design art;

b. Likewise, in the implosion-type NX energy source one or more of the CX implosion "lenses"(as they are often called in the art) is of lesser yield than its opposing counterpart(s). The result, like that of (a), is that the explosive fission reaction(or fusion reaction, as the case may be) first breaks through at that portion corresponding to the less power of the implosion lens(es), giving asymmetry or a directed-energy explosion. There are many possible variations to this approach, utilizing multiple "-break-out" implosion facets, which need not be detailed here.

One advantage of the directed-energy explosion, particularly NX, is that high Mach blast energies, debris and the like can be made to sink into the shock-sink leg(s) of the system; that more efficient venting can be had(see venting methods and means set forth herein); that insult to the firing chamber of the explosion leg is reduced; and that the problem of plasma piston handling in the case of high yield energy sources is expedited by sinking and/or venting.

The usual and more conventionally designed NX devices utilize nuclear reactant in solid form. Many NX devices are optimized for blast rather than optical energy output, and hence do not appear as well adapted to use in tellurian optoexplosive systems as they might be.

Since the requirements of a tellurian optoexplosive system may include NX energy generators of low yield(e.g., T to daT or, at least, in the sub-KT range), maximized for light generation and having reduced detonation rates(for longer light pulse production, albeit generally at lessened temperatures and efficiencies), I submit a gas-loaded NX energy source as an optoexplosive, which may or may not be doped to increase the color or brightness temperature.

Thus there is contained at suitable pressure a subcritical mass of say $U^{235}$ in gaseous form, e.g., uranium-235 hexafluoride, $U^{235}F_6$(with the combining element(s) of low neutron cross-section or capture) within a CX implosion system. Upon firing the latter explosive pressurization of the fissionable gas compound takes place with compaction into a critical mass which undergoes low-grade nuclear explosion. Gasified plutonium compounds should also be useful. The nuclear reactant gas may initially be at elevated pressure, atmospheric pressure, or reduced pressure. The latter conditions are favored by the spatial latitude and large working volume available in the firing chamber of the explosion leg of the optoexplosive system. Immediately before use the gas-type NX energy source can be loaded by in-pumping gasified nuclear reactant from multiple (subcritical) bottles at the surface, the nuclear reactant container being of any suitable material used in the NX devices art. Modifications of the gun-type explosive source should be feasible for larger yield NX explosions, e.g., in the range of daT to several hectotons(hT), the gun envelope say being provided with a rupturable "window"(e.g., thinned and structurally weaker section) so as to give a directed-energy NX explosion and/or an NX explosion of controlled yield. Otherwise, asymmetric NX energy sources should result from proper use of implosives, as described in the foregoing.

Certain NX devices are designed for maximum neutron generation, and this is accompanied by an intense flash of light. The neutron energy of such devices can be transduced into optical spectrum frequencies by an appropriate neutron-excitable phosphor, with emission in the visible and extra-visible portions of the spectrum. The phosphor can, for example be turned to account as a coating on the walls of the explosion leg, preferably near the crotch where the FRO is emplaced, and/or by using a phosphor-surfaced FRO member. It is desirable that such a version be operated at reduced pressure, although it is feasible at atmospheric pressures or in tenuous gas atmospheres other than air, consistent with neutron absorptivities of gases. In the BARBEL ADD-ON event of 1961, an NX of special design produced an ultrahigh neutron flux which was collimated to a small beam for experimental purposes.

OPTOEXPLOSION MODIFIERS

By the expression "optoexplosion modifiers" I mean those adjunctive processes and agents, usually involving solids but not excluding gases and liquids, which chemically and/or physically interact with and modify the performance of an optoexplosive device or ensemble and/or the dynamics and kinetics of the reactions thereof which produce blast and light.

Optoexplosion modifiers and adjunctives take the two forms of: (I) incorporation with and into the optoexplosive energy source per se(e.g., dopants in intimate admixture with explosive substance), and/or (II) agents and adjunctives external to that source, but in close and reciprocal relationship with the dynamic explosion(e.g., decouplants).

Optoexplosion modifiers fall into a miscellany of overlapping classes, the functionality and exact role of which are sometimes overlooked or are upon very empirical bases in the more traditional explosives art. For working purposes herein these modifiers include the following:

a. Dopants: agents and/or processes which interact during the reactive, dynamical phase of the explosion, i.e., at some time during the first-to-last of the reaction, serving to enhance color and/or brightness, and/or functioning to add to and introduce into light output spectral qualities, e.g., particular lines and bands (both emission and absorption, the latter being especially emphasized here for those optoexplosion beams desired as characterized by spectral gaps), of the kind to be worked into an irradiable target; and, agents and/or processes which interact with the kinetic energy output, particularly shock, to produce usable light.

I demarcate the two aforementioned working varieties of dopants as follows:

A. Detonation dopants: those which physicochemically interact with and enter into the explosion reaction per se, including the combusting which may be involved in say the after-median or trailing edge of the detonation sequence, to provide adiabatically or otherwise excited atomic and molecular species or both(e.g., C, Si, B, Al, Mg, Zr, Hf, Ta, Nb, Th, U, and rare earths, and their various species like monoxides(as of alkaline earth metals), it being emphasized that the line between the usually small amounts of dopants typical to an enhancement process(involving detonation and/or combusting) and the generally larger amounts of the same or similar materials that more properly have to be regarded as daltonide(as contrasted to bertholide) ingredients of many of the usual explosives;

B. Shock dopants: those which interact with shock, blast and the general category which includes "-kinetic energy," which generally do not enter into the chemical reaction or affect the rate thereof, and which transduce essentially kinetic energy into optical radiation; e.g., the various gases like the noble gases, the more reactive and single element and compound gases and vapors(including those derived from sublimones) like $N_2$, $O_2$, $N_2O$, $CO_2$, CO, the halogens, and certain halogenated and group- or radical- coupled carbon compounds(e.g., fluorocarbons, metalorganics, nitrocarbons);

And, as is evident, kind (A)—detonation dopant— is an integral part of the explosive device or at least in interreacting relationship with or closely intimate to the reacting explosive mass; whereas, kind (B)—shock dopant—may be in an external relationship which includes reception of and interaction with the light excitant(shock) but does not necessarily exclude the highly dynamic phase (A) which due to pressure and similar characteristics of its own may engage in a feedback relationship with the shock dopant situation;

b. Decouplants: substances external to a CX or NX device which, via entropification processes, reduce and degrade kinetic energies,; normally these are thought of in terms of NX energy sources, but here I specifically point out decouplant masses cooperantly arranged with CX sources of high yield, or of CX devices seated within and detonated in a tellurian optoexplosive system characterized by comparatively short and large aperture legs, and formed out of a medium of high seismic permeability;

c. Ablatives: agents of a rather arbitrary classification, e.g., overlapping for example (b), supra, wherein change-of-state like pyrolysis, vaporization, sublimation, fusion, and the like are involved. The situation is complexed by the fact that ablatives(e.g., forming melts, vapors, sublimones, spalled particulates), as from a tunnel or shaft wall of siliceous make-up, can and do contribute as a detonation dopant in that light output is increased. Conversely, ablatives can behave as decouplants by entropying and decomposing unwanted energies like those in kinetic forms and those at the extremes of the electromagnetic spectrum, particularly X-rays;

d. Optical transducers: usually fast-time fluorescent agents, e.g., pure emitters, phosphors, doped glasses, of less than approximately $10^{-8}$ second lifetime, and not excluding gases and vapors and liquids, albeit usually solids, which absorb optoexplosion exciting light and emit in a Stokesian mode; anti-Stokesian luminescents of suitable relaxation time are not excluded, although these comprise a small minority of the family;

e. Coolants: agents which interact with an infant, mature, or senescent explosion in such a way as to limit the rate of reaction or the temperature of the reaction(which kind of definition may be said to hold in converse for some dopants, supra); coolants are employed mainly in low-order detonation and pyrotechnic-type optoexplosives to regulate light emission by a given atomic or molecular species by keeping the reaction rate and/or temperature favorable for the existence of that species;

f. Velocity modifiers: agents or physical characteristics which increase or decrease detonation velocity within an optoexplosive mass, usually by changing the density. Entrained air and variations in crystalline state, e.g., ranging from the more dense cryptocrystalline to the less dense coarse or macrocrystalline, loosely a situation which is an analog of confinement, wherein the transition from deflagration through to detonation involves the former in a mode of explosion as distinguished from the latter by constituting the very rapid autocombustion of particles as a surface phenomenon; in deflagration the reaction products flow away from the unreacted material, while in detonation these are at exceedingly high pressure and flow toward the unreacted material (cf. W. Rinkenbach in G. L. Clark (ed.), "The Encyclopedia of Chemistry", New York, Reinhold Pub. Co., 1957, pp. 284–285; M.A. Cook et al., Proc. Roy. Soc., 246A, 281–283 (1958); M.A. Cook et al., J. Appl. Phys., 30, 1579–1584(1 959)); the well known variation of detonation rate with density of explosives like TNT may be taken as an example. The density of an optoexplosive, and hence the detonation rate, can be varied by numerous methods and means: e.g., rate of cooling from molten state, gasification by inert or noble gas during the casting step, compositing by adding low-density filler or diluent, and loading with microencapsulated solid, liquid or gas.

Throughout the present disclosure I have set out illustrative and typical optoexplosive modifiers; these data may be complimented and reinforced by the following pertinent information and examples.

As just indicated, my concept embracing the dopant is a very broad one. It includes a large and variegated category of substances(and, in some cases, physical effects and agencies) not always neatly defined or classed in terms of chemical and physical properties. The more easily functional approach, however, provides certain common qualities which run through the solids, liquids and gases I have demarcated as detonation dopants and shock dopants. Generally, the common feature from the standpoint of functionality is simply the alteration of the balance of an explosion process in favor of light output of practicable and usable nature—to make for what I call an optoexplosion—and to contribute to the production of that optoexplosion optically transduced energies from otherwise unwanted and wasted optical, chemical and kinetic energies.

Dopants may or may not be Planckian, and they may raise the system to one or more optical parameters—real or apparent but, in any event, useful—to that level beyond what would be expected by application of black body law, spectrum-additive-dopants included. Likewise, dopants in an explosive configuration may result in an optical output above that usually set by stoichiometric and thermodynamic and like considerations.

Throughout this disclosure I have endeavored to emphasize dopant and like agencies in the particular reactions set out. For example, that of the oxidation of cyanogen, where in the presence of carbon a severalfold enhancement results; or in the case of high detonation rate chemical explosives like TNT, PETN, RDX, where the addition of metal powder like aluminum may nearly double the energy; the same thing being true of low detonation rate explosives like black powder (where an essentially "carbon flash" is changed to an "aluminum flash"), and so forth.

Carbon, an example of a dopant in a high explosive which is otherwise of low luminosity, leads the way to a class of dopants which may be described as "high temperature." These are the substances noted with respect to refractory FRO means, set out by J.F. Lynch et al.(cited herein), which are solids until the ca. $10^4$ °C region is attained(e.g., carbides of tantalum, niobium, zirconium and hafnium). Certain of the nitrides and silicides fall into this category.

Certain silicon alloys possess a dopant quality, causing an increase in brightness when added in percentages up to approximately 5–8 percent. For example, I have tested calcium-silicon alloy(e.g., Ca(28–35):Si(60–65), an example of alkaline earth metal:silicon alloys, and have found that there is a pronounced enhancement in the light-giving qualities of pyrotechnic compositions of the fuel-oxidizer type having a combusting or deflagrating temperature in the range of less than $10^3$ °C.

Dopant-enhanced light output appears generally within the area of chemical explosives and explosions. At first sight detonation and like dopants would not seem to be applicable to nuclear explosions, aside from shock dopants like noble gases which interact in the usual way with the shock front. However, despite the often different energy levels between the CX and NX explosions and the means producing them, there are features which allow for detonation doping and, therefore, the use of dopant(s), in the NX energy process.

Thus, in both prompt flash and particularly the afterburning fireball luminosity dopants either are present by virtue of NX device design or of nuclear reactant; Thus, the casing and like immediate and adjacent material contribute to both, as is the case when the nuclear reactant is say not highly enriched and the diluent contributes to the nuclear burning process. When the temperature of this process drops into the $10^5$ °C, or at least below $10^6$ °C, the high temperature dopants, supra, are advantageously employed. Likewise, dopants such as certain metals and metalloids, W, Nb, Ta, Si, B, can be utilized.

These are usually in particulate form in a mass in which the NX device is embedded, of symmetry characterized by a larger mass of the dopant at the rear(away from the leg leading to the FRO) of the device. Special ensembles and geometries can be employed for directed-energy NX devices so that maximum nuclear energy is taken up by the dopant body.

Taking the nuclear plasma as an analog of flashlamp plasma of high power, gas-discharge type, the nuclear plasma in a siliceous or artifically-prepared(as by shaft or tunnel coating) tubulation can be expected to produce what is called in the flashlamp art "impurity radiation" from the "evaporated" wall surface material. When the system design is such that nuclear plasma(and the same holds for CX-derived plasma, in both cases afterburning or combusting material of high energy and a high degree of ionization of elementary particles like atoms) passes into the explosion leg, that leg may be lined with dopant(e.g., high temperature variety) or have projections out from its walls made of the dopant.

The concept and principle of decoupling and the use of decouplants derives from the NX device art. Thus, the signal produced by a given underground burst depends upon the nature of the medium within which it occurs. This is due to the difference in magnitude of kinetic(or mechanical) energy transfer(or coupling) between the explosion and the surrounding tellurian medium. For example, tests have been made on the seismic effects of CX energy sources in saltine medium with TNT charges up to 1 T in size. Although the extrapolations into NX device shots of the KT range indicated that a saltine medium would have a decoupling factor of 2.5 for a tamped shot in tuff, the GNOME NX shot(December 1961) of about 3-4 KT, also in salt, shows that in these yield ranges the salt has a coupling(as contrasted to a decoupling) factor of about 2.5 under similar conditions. However, by use of a large hole for emplacement and shot of the NX device, the apparent yield of that device can be pared down to between several tenths and several per cent of the original value in terms of the seismic signal generated. In the sense of "decouplant", as generally used here as behaving cooperantly with an NX or CX explosion to take up unwanted kinetic energies in particular, graphite is an example of a material which by heat and like absorption—entropification via change-of-state—decouples by a theoretical factor of $3 \times 10^3$ or more, although evidently not all skilled in the NX art agree with this(cf. "Technical Aspects of Detection and Inspection Controls of a Nuclear Weapons Test Ban," Summary Analysis of Hearings, pp. 26–27, 74, Joint Committee on Atomic Energy(U.S.), Washington, D.C., April 19–22, 1960).

Typically, for present purposes the NX device-decouplant arrangement is specifically structured so that, for example, within the firing or explosion chamber of the explosion leg of the system, said chamber being enlargened in appropriate manner and geometry and size, the optoexplosive device—NX or CX or both—is surrounded by decouplant, except that the portion facing the explosion leg and thence to the FRO element (e.g., device 10$f$ in cavity to 122, facing into 117 and providing optoexplosion light 118 in FIG.8(the other features in this drawing are omitted for present purposes) is not surrounded by decouplant so that optoexplosion light 118 can traverse leg 117.

The structural arrangement between NX or CX or both and the decouplant, taken together with the chamber size, is made in accordance with shock and explosion phenomena, and can be as fully decoupled an arrangement as possible consistent with the generation and liberation of light into leg 117, or a partially decoupled arrangement. In the latter case there may be an intervening space of an atmosphere, and the member 122 or its equivalent comprising the decouplant. In such a version slabs or briquettes of graphite or other heat-absorptive material, which may be an endothermic chemical composition or a simple change-of-state material like a conventional ablative, say composite wherein randomly oriented fibrous, particulate or other dispersed solid within matrix solid like thermosetted polymer is utilized.

Decouplants of the ablative species(not to be confused with "ablatives" as modifiers also set out herein) can be chosen and designed out of experience with entry materials, heat shield substances, and the like in the missiles field. This is the subject of a large literature and the artizan is referred to such examples as: H.G. Landau, "Heat Conduction in a Melting Solid", Quart. J. Appl. Math., 8(1), 81–94(1950); R.G. Fleddermann, "Analysis of Transient Ablation and Heat Conduction Phenomena at a Vaporizing Surface," Chem. Eng. Symp. Ser., 57(32),24(1960); H.Bethe and Mac C. Adams, "A Theory for the Ablation of Glassy Materials," J. Aerospace Sci., 26(6), 321–328(1959); R.S. Barriault and J. Yos, "Analysis of the Ablation of Plastic Heat Shields that Form a Charred Surface Layer," J. Amer. Rocket Soc., 9, 823–829(1960); H.S. Carslaw and J. Jaeger, "Conduction of Heat in Solids," London, Oxford Univ. Press, 1959; J. Kanzlarich, "Ablation of Reinforced Plastics for Heat Protection," J. Appl. Mech., 3, 177–182(1965).

I particularly cite these and like references herein to exemplify those facets which deal with the state of the art not only as it may concern decouplants and candidates for that role, but also in connection with facets relevant to other kinds of optoexplosion modifiers, e.g., optical transducers(as physical configurations, for example), coolants, and velocity modifiers. Furthermore, operancy of the various forms of the FRO means relates to this area, e.g., timed-life FRO and reflectively-changeable(during input pulse history) FRO.

When I speak of ablatives as a category of optoexplosion modifiers I distinguish these from dopants and decouplants which in certain instances involve ablative behavior, admitting that again there is overlapping between the classes; but at the same time pointing up the fact that certain materials within or interacting with explosion plasma contribute materially to light generation. For example, it is recognized as a fact that high power gaseous discharges(plasmas) are acompanied by "impurity radiation" evolved from "evaporated" wall portions of the envelope—these are called "ablative light sources." In these sources the major portion of the radiation is emitted by the wall particles rather than by the gas initially loaded in the electric discharge tube. The ablated wall material may be fused silica or a thermoplastic like lucite(methyl methacrylate), and in connection with the present improvement I would especially emphasize the following ablatives: non-silicates, e.g., boron and phosphorus based glasses; heavy metal(like lead) and rare earth glasses; heavily doped("impurity") glasses; and the like.

When the shot vault and/or explosion leg of the system, e.g., 14 back to and including means 10 in FIG. 1, is of highly siliceous material like granite, granodiorite, rhyolite, or the like, it can be considered the analog of the envelope of an ablative light source of the electric discharge variety. In the latter the conversion of electrical energy occurs with an efficiency of between 10 and 30 percent, in the microsecond domain, with a good proportion of the emission in the ultraviolet. Thus, R. Goldstein and F.N. Mastrup(IEE J. Quant. Electronics, Q–3,249(1967); J. H. Gonz and P. Newell, J. Opt. Soc. Amer., 56,87(1966); see especially, for summary and review, A. Papayoanou et al., "High-Power Incoherent Light Sources", CFSTI AD 664,148,11 pp. (cf. pp. 8-9), Fort Monmouth, New Jersey, November 1967), establish an increase by a factor of 5 due to ablatives, ranging down to 3500 A in the case of silica.

Papayoanou and Buser(cited above) reinforce the objects and features of the present and parent inventions by stating that a plateau has been reached in the use of standard (electrically-powered) flashlamps as pulsed incoherent light sources, and that deficiences are pronounced in very high power ultraviolet light sources.

A fluorescent solid having a very fast transition time, e.g., phosphor or doped fluorescent glass (preferably comprising high temperature host material), behaves as a transducer in that particulate radiation and short wavelength optical radiation is absorbed, with emission in the ultraviolet, visible, and/or infrared portions of the spectrum. Many such substances are known and need not be detailed herein. Substances of high quantum efficiency are preferred. Such a fluorescent transducer enables an upgrading in efficiency of an optoexplosive light source in that otherwise wasted light or particulate energies are converted into useful light.

The fluorescent transducer may be coated on the wall of the explosion leg and/or layered upon say a frangible, reflective metal substrate. In the former instance an optical arrangement of wall-projecting reflectors gathers the initial exciting light (the reflection surface faces the explosive light source), and then directs it to projecting members which carry the fluorescent transducer (which faces the FRO), say as a spaced series of half-pyramids (the flat or curved faces being the reflection and transduction faces.

When fluorescent transducer excitation is to be made by particulate radiation, the system is preferably outgassed so as to reduce absorption and increase mean free paths, depending upon the particle(s) involved. For neutron beams tenuous air or low cross-section gases can be loaded into the system. For increased luminescence efficiency the fluorescent substance can be supercooled, and this is particularly desirable in the case of a large fluorescent mass carried in the form of an FRO element at the crotch of the optoexplosive system.

An example of a calculation of the maximum brilliancy of a phosphor excited by an unlimited energy input is that of H.W. Leverenz(R.C.A. Rev., 5,162(1940)):

$$E_{max} = ZPE/t$$

where:
- $E$ = the luminescence energy in ergs;
- $Z$ = the optimum concentration of activating centers per millimeter, being $10^{21}$;
- $P$ = the penetration of the exciting electrons into the phosphor layer, in centimeters;
- $t$ = the transition time for luminescent output in seconds.

In a typical calculation this comes out to $9 \times 10^{12}$ ergs per square centimeter, or about $9 \times 10^5$ watts per square centimeter.

Coolants form an assortment of often seemingly little-related compounds. Flash reducers and flash hiders of the munitions art, and certain ingredients common to pyrotechnics are included as coolants. Federoff et al.("Dictionary of Explosives, Ammunition and Weapons(German Section)", PATR No. 2510, CFSTI AD 160,636, 343 pp., Dover, New Jersey, 1958, p. Ger. 51) lists the following substances which have been used, most of which date back many years in the pyrotechnic art: potassium salts like the sulfate, nitrate or oxalate; alkali salts generally, with improved performance going up the series in the periodic system, e.g., Cs is better than Rb and Rb is better than K; oxalic acid; potassium chloride; sodium bicarbonate; nitroguanidine(an explosive in its own right). A.A. Swanson and D.D. Sager are cited(by Federoff et al., supra) as examining the following compounds as flash reducers:

Aminoguanidine bicarbonate; ammonium acetate, phosphate, sulfate; apatite; asbestos; barium sulfate; boron nitride; cerium oxide; cryolite; dicyandiamide; dimethyl oxamide; dimethyl urea; disodium phosphate; mercurous nitrate; methylene urea; potassium bicarbonate, chloride, iodide, metaphosphate, perchlorate, phosphate, silicofluoride, urea oxalate; sodium ammonium sulfate; sulfur; zinc sulfate; and zirconium oxide.

The explosive flash of an exploding projectile can be reduced to the point of flashlessness by surrounding the explosive body with a 5 to 6 millimeter layer(sheath)of chlorine containing material such as ammonium chloride, tetrachloronaphthalene or hexachloronaphthalene.

Additionally, in my investigations of deflagratives and like munitions I have successfully used such compounds as alkali acid sulfates(e.g., $KHSO_4$, alkali carbonates and bicarbonates and oxalates(cf. U.S. Pat. No. 2,995,526, p.3; also, various items on fluorescent, radioactive, carcinogenic and like specialty smoke-forming pyrotechnic munitions in Official Gazette(U.S. Patent Office) and Chemical Abstracts for the period of early 1950 and on).

When compatible with other optoexplosive material coolants can be added in small amounts, e.g., of the order of several percent(depending upon the result desired). Or, such agents can be arranged cooperantly with such explosive material but isolated therefrom, as by barrier or layer partition using thin plastic film to form a laminate; coolants can also be prilled or coated after the manner of the pharmaceutical art; microencapsulated coolant agent may be employed to advantage.

BEAM MANIPULATION — LARGE AREA OPTICS

The shock- and debris- freed optoexplosion light may be variously manipulated or fashioned, and/or applied to target in one or more of the following ways:
a. In its pristine form, as delivered by the FRO means, as in the case of CAL;
b. In the form of collimated and/or sectionally-shaped raw light, as in the case of SAL;
c. In the form resulting from alteration by one or more passes involving reflection and/or refraction optics, with or without special treatment by such optical devices as beam-splitters, polarizing elements, and electrooptic switches, particularly what I call "flux-varied"(i.e., across the face) beams.

As it issues from the light leg of the system the beam may be collimated or otherwise passed through one or a series of stops, diaphragms, slits, or like aperturing means well known in optics, with scale-up commensurate with the beam size and energy.

As regards ancillary optics which shunt the light to the target mirror lenses are by far the more efficient and economical when large-body beams of light are manipulated. The mirrors are usually formed metal sheet of highly polished and reflective surface, although they may be first surface, metallized glass, plastic or metal. The glass and the metal have the advantage of rigidity in large sizes. The plastic is advantageous from the standpoint of low cost and light weight. The glass base, and in the case of thermoplastics, may be formed by the technique of slump-molding over a master mold. Should pressure of blast effects be involved to a slight degree by spillover from an improperly vented or over-explosived system, the mirror elements may be perforated in one or more places, though not to the extent of reducing to a great extent their light gathering surface. Extra-large area mirror lenses may be made and assembled in sections, as from a number of pie-shaped wedges tied together, which approach is often feasible and desirable when otherwise untransportable mirrors are involved, e.g., because of large size, need for structural and form integrity.

A low-cost, easily-handled and formed mirror optic is that of the inflatable balloon(or like structure) variety. This is simply a round bag adapted to air or other gas filling, having temperature-resistent fabric(e.g., Teflon, asbestos or organometallic polymer) metallized on its optical face, with or without reinforcing stays or like members. Lighter-than-air gas(e.g., He) filling, together with tie-down cable, enable positioning the "aerial optic" at any convenient or reasonable altitude, in the appropriate beam shunting attitude, above the exit portal of the usually ground-surface light leg. Thin metal or plastic stays, girders or like members serve to form the optic(e.g., as an ellipsoidal or paraboloid mirror) and to maintain the integrity of that shape involved. High winds, of course, and to some extent heavy rain, limit the performance of such an aerial optic. The reflecting portion of the aerial optic, alternatively, may be a sheet of polished metal foil or metallized plastic film. Numerous design, structural and functional variates of the inflatable optic will be evident to those skilled in the art, and for approaches to the bases of these reference should be made to the literature on inflatable structures and balloons.

Optically, the mirror lens(usually paraboloid or ellipsoidal in configuration) can be the first and only member to gather the optoexplosive light, to pass it to the irradiable target. Or, such a reflection optics system may comprise more than one mirror lens, as for example double-ellipsoidal and double paraboloid(two mirrors in each system), single compound reflective system, and double compound-reflective system, including flux distributors. For optics design information the artizan should consult P. Glaser and G. Walker, "Thermal Imaging Techniques," New York, Plenum Press, 1964; H. Lazlo, "Image Furnace Techniques Survey," Solar Energy, 7, 4(1963); and, "The Use of a Kaleidoscope to Obtain Uniform Flux Over a Large Area in a Solar of Arc-Imaging Furnace", by Chen, Mattack, and Glaser, Applied Optics, 2(March)1963.

Like the primary optic element in an optoexplosive system, the FRO, secondary optics such as mirror lenses may be adapted to selectively and preferentially change the flux value across the face of the reflected light beam. The same technique can be used for secondary reflectors as for the FRO, singly or in combination therewith; namely, modifying the surface of the mirror between one of highly specular and one or highly diffuse reflectances. When this is done in desired or predetermined pattern the resulting beam will, in its cross-section, exhibit the lower energy densities due to loss by diffuse reflection and the higher energy densities resulting from specular reflection. This and like methods are more suitable for light beams which are not brought to focus upon an irradiable target, and where that target truncates the beam a short distance below the actual or calculated focal point.

Alternatively, "flux-shaping" may be had by a composite secondary mirror; that is, one made up of materials of given patterning, and of different reflectances.

Like large-area reflection optics, large-area refraction optics need not be the elegant and sophisticated ones of fine optics, although it is always desirable to engineer an optoexplosive system to within reasonably good working tolerances. Surface imperfections, microbubbles, striae and other defects are generally not of importance in large-area optics, being compensation-cancelled by the area.

Large-area refraction optics are less desirable for the reasons just mentioned. However, in those special cases where they are necessary, and in the smaller optoexplosive systems, refraction optics are sometimes advantageous, e.g., they may be more rugged and suited to a series of shots. Such optics can be fabricated by molding(one-piece or compositely), or by the slumping methods of the art when glass or optical thermoplastic is the medium. About 110 "plastic glasses" have been described by H.C. Raine("Plastic Glasses", Proc. London Conf. Optics Inst., 243 et seq. (1950); Amer. Inst. Physics Handbook, "Optical Plastics", p. 6–19, New York, McGraw-Hill, 1957).

The so-called optical glasses are tabulated for refractive indices and reciprocal dispersive powers; chemically they include vinyl polycyclics, polycyclic acrylics and their esters, and halogenated styrenes—among others—as well as certain metal derivatives thereof(e.g., Pb), with refractive indices ($n_{20}$) ranging between approximately 1.41 and 1.68.

To meet the need for large-area optics of the (a) refraction (lens) type, and/or (b) light-guide type(e.g., fiber and plate light pipes or conduits), wherein there is a refraction interface situation, I have designed and tested on a modest basis the two aforementioned kinds, emphasizing that this new class of optics is primarily designed to gather and refractively guide incident light—with beam shaping according to the geometry of the device—with resolution, chromatic aberration, and like qualities of fine optics secondary.

I call these "wound-optics." Thus, in simple form, take a strip or tape of transparent thermoplastic and tightly wind that strip into a roll upon itself, so as to form a flat roll like a roll of common tape. The start of the winding can begin upon a small-diameter mandrel or rod of the same plastic. From this product there is derived:

a. A plate-type light-guide when the faces of the tape roll are substantially plane and smooth. Should they not be smooth, the body of rolled tape can be chilled(e.g., to the glass point of the polymer), and in the resulting brittle form cold-lapped by fine and gentle abrasive action to produce a plane, polished surface. Because of the air layer of lower refractive index between the layers of plastic tape the product behaves as an incoherent light guide. As desired, instead of lapping and polishing, a coating of suitable lacquer can be put upon the faces;

b. An obvious alternative to the form taken by the wound optic of (a), supra, is that in which the polymer tape surface is first coated with viscous liquid like a polyalkyl silicone polymer(e.g., a silicone) of suitable refractive index for the material used;

c. When the thermoplastic roll of (a), supra, is placed in an oven and very gently brought to melding(i.e., interfusion of adjacent layers) temperature, preferably with a mild negative pressure(to degas so to prevent bubble formation from entrained air or volatile plasticizer), the product is now ideally a roundel slab of optically and physically homogeneous material;

d. If, instead of a rectilinear strip of thermoplastic there is employed a polymer strip of side-elevation contour corresponding to a halved bi- or plano-convex lens shape, and the winding is started at the truncated portion, there results a roll of bi- or plano- convex lens configuration, which may be heat-melded;

e. Conversely, instead of a rectilinear strip of thermoplastic, should the strip in side-elevation correspond to a halved bi- or plano- concave lens shape, and the upon-itself winding begun at the long-axis verical half-cut, there results a roll of bi- or plano- concave lens configuration, which may be oven-treated to give a substantially homogeneous body;

f. I would now expand upon the foregoing techniques of wound-optics, including same but not excluding other methods embracing heat-workable polymers, glasses or the like(including particulate and concentric-mold techniques) to derive what I call "plate-lenses"(i.e., substantially flat plates of circular or polygonal or other sectional geometries). Plate-lenses are characterized as refractively manipulating an incident beam of light into a convergent or divergent beam or the like. While, typically, such optic elements are parallel-plane plates, not excluded of course are plates of spheric facial aspect, consistent with the positive or negative magnitude of the lens desired. The materials approach to the fabrication of plate-lenses is exemplified by the series of acrylics:

| Substance | Refractive index (rough value) |
|---|---|
| tert-Butyl methacrylate | 1.464 |
| Isopropyl methacrylate | 1.473 |
| n-Hexyl methacrylate | 1.481 |
| n-Butyl methacrylate | 1.483 |
| Methyl methacrylate | 1.491 |
| 2-Methyl-cyclohexyl methacrylate | 1.503 |
| 2-Chlorocyclohexyl methacrylate | 1.518 |
| Methacrylic anhydride | 1.523 |
| Butyl mercaptyl methacrylate | 1.539 |
| b-Bromoethyl methacrylate | 1.542 |
| p,p³-Xylylenyl dimethacrylate | 1.556 |
| Benzyl methacrylate | 1.568 |
| 2,3-Dibromopropyl methacrylate | 1.574 |
| a,b-Diphenylethyl methacrylate | 1.581 |
| p-Bromophenyl methacrylate | 1.596 |
| Methacryl phenyl salicylate | 1.600 |
| Pentachlorophenyl methacrylate | 1.610 |
| b-Naphthyl methacrylate | 1.629 |
| Fluorenyl methacrylate | 1.632 |
| Lead methacrylate | 1.645 |

When a series of several or more strips of the foregoing or equivalent materials is made say by lap-splicing invidual members into a single length of tape, and this tape is tighly wound upon itself to form a roll, there results a plate-lens which is either positive or negative. When the roll is started with the material of higher refractive index and ends at its periphery with the material of lower refractive index, a positive lens results; and vice versa. The magnitude of the positive or minus quality depends the index intervals and the homoheneity of the resulting heat-treated body, other things being assumed equal. Of course the plate-lenses are not designed primarily as image formers, rather they are optics which may be said to be "quasi-coherent" in they they function to gather light and refractively shape a transmitted beam into diverging or converging, as the case may be.

What I call "stacked-lenses"—characterized by large area and low cost—can readily be made by piling a series of transparent plastic(or glass or polycrystalline optical substance) plates or sheets, each sheet having a slightly lesser diameter than the sheet beneath(as in building a plano-convex lens); or by stacking a series of sheets of decreasing-diameter O-rings, with a final disk plate for the center or last element in the sequence(as in building a concavo-convex lens); or by stacking a series of O-rings of the same diameter but of decreasing hole size from bottom to top, the bottom plate being discoid or roundel without hole. Aplanar bi-lenses result when two of the stacks(of like kind) are placed face-to-face or back-to-back(plane areas meeting).

The piled or stacked plates are then made into a more or less optically homogeneous mass by one or more of several treatments. Thus, just prior to stacking and arrangement the contact faces of the plates are lightly and evenly coated with plastic cement of base the same as the plastic being employed for the lens fabrication; slight side-wise sliding before drying can be used to eliminate unwanted air bubbles. Or, the stack, with or without the cement, may be placed in an oven and gently heated under outgassing conditions(to pull off entrained air) until fusion occurs between the layers, with a resulting solid body.

In certain instances(e.g., extremely large area optics) it may be desirable to screw-bolt or dowel the stack, using bolts or dowels of the same plastic(suitable plastic cement is again usually employed).

The stacked-lenses can be used as-is or, preferably, given a final working, as by lapping to remove the steps between the plates or sheets, and to optically contour and finish the surface. Since the polymers used are usually thermoplastic, slumping over a master form can further be employed to shape the product.

Like aerial or inflatable optics, reinforcing ribs, stays, and like structural members can be incorporated into the design for strength and to prevent gravity sag; or, suitable mechanical mounting can be used for the same purpose.

And, after the fashion of the fresnel filters described below, a large family of very interesting optics results when stacked-lenses are made from sheets of material of different refractive index(cf. the discussion herein on plate-lenses).

The foregoing principles may also be utilized to fashion aplanar substrates for large mirror lenses, appropriately low-density and high-rigidity material being selected(e.g., plastic, foamed plastic, plastic-glass composites, balsa wood).

When the secondary optics, if any, in the system are of the refractive kind, or it is desired to rely upon a transmitted pass of light instead of a reflected one, the aforementioned "flux-shaping" or energy density patterning can be accomplished by a composite body or stack of neutral density filters, i.e., plates or sheets, each graded between wholly transparent and shades of grey and wholly black or absorbent; individual members of the laminate correspond in shape and transmissivity to the reseult wanted.

Alternatively, and preferably when maximum light is to be had, is such a stack of the same or preferably different refractive indices, the sheets or plates otherwise being transparent for the portion of the spectrum being worked. Such an optic, in effect, is a fresnel filter, performing out of the well-known law(for an air-isotropic solid interface(e.g., plastics and glasses or the both in combination): $R = (n-1)^2/(n+1)^2$. A simple example of such a fresnel filter is that of two roundels of plastic and/or glass held together, one of the roundels being smaller than the other. Depending upon the refractive index differences, and taking into consideration the increased number of multiple internal reflections occurring between the two(and to some extent the layer of air in between), the flux-shaped beam transmitted by such a device will comprise a ring of light of greater or lesser energy(usually lesser) enclosing a circular beam of different flux, depending upon the optical qualities of the materials employed.

Taken together with their large areas and variegated refractive characteristics the various refraction optics I set forth herein are pecularialy suited to operate as an Andrew's Separator(W.S. Andrews, Genl. Elec. Rev., 9, 817(1917)). This system enables the isolation of spectral regions by virtue of chromatic(i.e., wavelength or frequency) aberration, wherein radiations of longer wavelength are less refracted than those of shorter wavelength. Thus, to provide shorter wavelengths in the ultraviolet, visible and/or infrared, or, especially, to isolate regions from each other within the ultraviolet and infrared, a ring-stop(or, for rough work an open stop or diaphragm) is placed before the lens-emergent beam at that point where a particular spectral region is to be passed and the adjacent spectral regions are to be cut off. Various refraction optic + field stop arrangements can be employed, and the technique has been elaborated upon and extended by A. Terenin(Physik Zeit., 31, 33(1925)), and by G.S. Forbes et al., Rev. Sci. Inst., 5,253(1934)).

IRRADIABLE TARGET

Reiterating and amplifying my original disclosure on irradiable targets: The target may be of any appropriate shape and form, of solid, liquid and/or gas, at ambient, elevated or reduced temperatures and pressures, contained or uncontained, and with or without special envornment of solid, liquid and/or gas, as may be desired. Solid irradiable targets, unless transparent, like liquids, present the best attitude towards the FRO shunted beam when in layered form. Ancillary backing or retroreflection or like means can be used to conserve the light by passing it back into the target after the initial pass.

The target is usually stationary, mounted so as to receive the beam; however, the target may be of the moving kind, in which case the incidenting light and target movement are synchronized. The target may be positioned at ground level(as at 30 in FIG. 1), partly beneath the surface(as at 30c in FIG. 4), just beneath the ground(as at 30a in FIG. 2), deeply subtellurian(as at 30b in FIG. 3), or set above the surface in a close or distant relationship with that surface(as exemplified by 30d in FIG. 5).

Typically, exceedingly large optical energy fluxes can be deposited in a target for purposes of heat treatment, fusion, evaporation, crystal growth work, induction of thermochemical and thermophysical change, molecular disruption, excited radical production, electron-stripping of atoms, and the like. The investigation and production of very high melting refractories, alloys, eutectics, and the like is expedited by ultrahigh power optoexplosive light generators. In many instances the mass of substance to be irradiated can act as its own crucible, with say a core portion that is impacted and treated. In certain cases the so-called magnetic-suspension or magnetic-floating techniques can be utilized to isolate a target from its surroundings.

Becase an irradiable target is apt to explode when large optical pulses are injected into it, it may be desirable to irradiate within a container and atmosphere of transparent, inert gas at elevated pressure, such a container ensemble having say a thick window of fused silica. A less complicated container for use under such conditions is one of elongated neck, made of high strength metal and polished to specular reflectance on the inside surface, with the irradiable target placed in layer or like form at the bottom. The incidenting beam enters the bottle, to strike the target, with multiple internal reflections within said container routing the light back into the target.

I have found from laser experiments that an interesting and unique class of irradiable targets can be prepared by incorporating, as by simple mechanical admixture(with semi-fusion as a pretreatment to consolidated the mass, should this be feasible), particles of a more refractory(and unreactive) light absorptive solid with the less refractory(and reactive or energy-responsive) target phase(usually solid). The target material may be otherwise only slightly absorbent for the optical energy involved, e.g., white or very light in color. This hetereogenous system responds to the optoexplosion light involving absorption thereof by the darker substance which transfers its energy as thermal energy to the less-absorptive, lighter target material. After an irradiation the two may be separated by simple pulverization (the absorber particles, when hard and non-pulverizable under the conditions employed, are then simply screened out), by solution of the target material, by mechanical sorting, and the like. The same approach can be utilized in the case of liquid targets which are relatively non-absorptive; inert light-absorbing particles are mixed therewith, to transfer their energy to the liquid; in this instance the target medium should be withina container and under pressure(if not sealed), so that explosion and dissipation of the liquid does not result.

By the same token, for low input fluxes an otherwise transparent, colorless or non-absorptive(say for a particular wavelength) target material can have in solid or liquid solution an absorptive solute, e.g., black dyestuff.

Transparent and relatively non-absorptive target material of the solid kind(including frozen liquids and solified gases) can be first comminuted, so that the resulting mass comprises many particles each of which presents a fresnel-reflecting surface, thus to give multiple internal reflections; preferably the surface of such a mass is the unbroken, transparent substance itself.

I would include an "active target" as a form of irradiable target. Illustratively, this is target material which is say field-responsive(electrical or magnetic), and changes its optical properties upon the application thereto of energy. For example, many of the physical phenomena recited by George Raabe(cited hereinbefore), like the Kerr and Pockels effects, are adapted to active irradiable target modifications when, of course, the target material is a substance which shows the response in question. Thus, a so-called Kerr- or Pockels- active liquid or solid, upon energization, assumes an optical configuration wherein it will behave differently towards the polarized and unpolarized components which may make up light derived from an optoexplosion.

The irradiable target may be an optical transducer or amplifier. In the former it may be a phosphor or broad excitation spectrum comprising in a given instance unwanted wavelengths, to transduce these into wanted wavelengths which are optically coupled with a medium absorptive and responsive thereto. The large literature on luminescence need not be cited at this point, except to illustrate same by ultraviolet-emitting phosphors of high intensity output(cf. J.W. Gilliland et al., "Research and Development of Cathodoluminescent Phosphor with High-Intensity Ultraviolet Emission," CFSTI AD 657,589, 132 pp., 92 refs., 205 phosphors listed, June 1967; I would particularly point out for the artizan that a preponderance of cathodoluminescent phosphors can be excited by short wavelength ultraviolet to emit in Stokesian mode, also that this list contains substances(including pure materials) which emit in the vacuum ultraviolet, which is of especial interest in connection with the present invention as a "FUV-generator" (far or extreme ultraviolet, into the trans X-ray portion of the spectrum).

Like the phosphor transducer which is characterized by the emission of light, when the irradiable target is an amplifier like a laser a number of advtangeous features are the consequence. My original disclosure gives an extensive listing of laser media(for the time, 1964), and in the section herein on frangible reflective optics I set out an active FRO which includes lasing material. These, generally, include, solids (crystals and glasses), liquids, and gases tractable to optical pumping by optoexplosion light bounced from the FRO element. Various means like Q-switching, cooling, and the like can be utilized to shape the performance and output of the laser target which, in turn, is in optical communication with the end target of the series. Because it is often that such an arrangement of the present improvement with a laser is a one-shot affair, I prefer lasers which are low in cost and which can be worked and handled in relatively large bulks or volumes. For example, the Lempicke-type aprotic solutions of neodymium or other rare earths; plastic and glass laser resonators; and the like. Snitzer-glasses in fagot configuration(a bundle of rods) of glassified laser ions are especially good for high efficiencies, although many of these are limited to the infrared; the report of C.G. Young(Microwaves(Laser Technology Sectn.), 7(7), 69–78(July)1968) should be consulted for these data. I do not exclude, for example, gas and vapor laser resonators which, in the case of $H_2O$, $D_2O$ and HCN, for example, are capable of lasing into the + 700 micron range.

I therefore include within the scope of this invention a chemical-explosive-pumped and/or a nuclear-explosive-pumped laser, consistent with what is disclosed and claimed in my parent application. The laser and its cooperant optics(e.g., retroreflective mirror lens(es), Q-switches) may be positioned in fixed or static attitude, or the laser ensemble can be movably mounted(e.g., 30d and 30c in FIGS. 5 and 4, respectively), so as to be translationally and/or rotationally mobile, as by gimbal support.

Another example of an irradiable target is tissue, live or dead, healthy or moribund. For simulated flashburn studies, to further knowledge of the various kinds and degrees of nuclear flashburn, the living animal model is the target. This model can be exposed to raw CAL or to raw CX source light. Or, should it be desired to program into the model situation a varying energy flux the techniques set out hereinbefore can be employed, as for example when it is necessary for whole body or, at least, large surface area, irradiation by light fluxes which vary in energy densities across their faces(e.g., depiction by simulant test of "shadowed" light exposures).

By definition an irradiable target includes photoresponsive devices. These may be sensors of the roughly categorized (a) electronic and (b) non-electronic varieties. Many light sensors and light recording devices and methods and means are well known. The choice of a particular sensor will usually depend upon the form this invention takes with reference to the purpose thereof, including a consideration of the light flux values and the region of the spectrum being worked, and such choices are well within the capability of those skilled in the art—other than to add that within the realm of ultrahigh power optical energies non-linear and intensity-dependent effects may well come into play(cf. A. Einstein, Physik Zeit., 18,122(1917); G. Bret and F. Gires, Compt. rend., 258,3469(1964); G. Bret and F. Gires, Appl. Phys. Lttrs., 4,175(1964); E.U. Condon, Proc. Natl. Acad. Sci.(U.S.),53(3), 635–637()).

Auxilliary circuitry and the like may be chosen from the conventional art of electronics, according to sensor readout in terms of final signal, recording, image(including computer imaging and computer graphics and electronic image display, which methodologies form their respective states of the art), and the like.

The electronic and like sensors in my working distinction here include photocells(e.g., photoemissive, photoconductive, photovoltaic), thermopiles, thermistors, radiometers, bolometers, pyrometers, photomultiplier tubes, and the like. As indicated, the choice of a given sensor is decided by, among other things, the light flux, the spectral range involved, the relative intensities between the various lines and/or bands, and the adaptability to amplification or subsequent readout upon a machine like an oscilloscope, tracing machine, or strip recorder, and the like.

When degradation of the optoexplosion light(e.g., intensity) is involved, as by multiple reflections through a series of passes or by multiple refractions, or is beam-splitted, an image intensifier can be employed when the irradiance is low(as for example in monitoring diffusely-reflected or glossy-reflected light or fresnel-reflected light from a highly transparent optic) and/or when the light varies greatly through its time-intensity profile(as in the case of a low-flux leading edge and a low-flux trailing edge, with a median peak, in a sinusoid pulse).

The so-called non-electronic and like sensors and recorders include photosensitive chemical structures, as for example photographic emulsions, including: (a) halide, (b) non-halide, (c) black-and-white for the previous two, (d) spectrally specific or color for (a) and (b), also, (e) photochromic and thermochromic agents(as in screen form) and, as detailed herein (f) various luminescents including fluorescents, thermoluminescents, and infrared transducing phosphors(into anti-Stokesian luminescent light), and the like.

The luminescents can be incorporated with or adapted to emission-coupling with target medium by admixture with the latter. Or by solution therein. Thus, as described previously a luminescent transduces optical energy into a wavelength suitable for treating a target material. However, an quite conversely, a luminescent can act to preferentially and selectively absorb undesirable wavelengths so as to protect a coupled target medium from those wavelengths, with emission in inactive regions of the spectrum.

While I have shown and described the various preferred embodiments of my invention, it is to be understood that the drawings and detailed disclosure are to be construed in an illustrative sense since various versions, modifications and substitutions of equivalents may be made by those skilled in the art within the spirit and scope of this invention. I would again particularly emphasize and point out that in many instances close-in explosion phenomenology is little or scantly known because of the obvious working difficulties. This invention aims to overcome certain of these obstacles. At the same time I would venture to say that other than the raw optical effects of CX and NX explosions a great many gaps exist in close-in, sophisticated optical phenomena characteristic of substantial yield explosions—which phenomena are adapted to control, manipulation and utilization by proper approaches. Among those proper approaches is the feature and aim of this invention.

Hereinbefore I have endeavored to discern and point out certain of the gaps which from a methodology and fact basis seem either lacking in the art or to have been neglected, one reason I ascribe the state of the explosives art being the somewhat traditional and, therefore, rigidized view that explosives are chemical or nuclear workhorses pronounced by their kinetic energies. An aim and a feature of this improvement has been to demonstrate that explosives, especially when properly designed as molecules and formulations and physical shapes, possess great potential utility for what I have previously termed *optoexplosive technology*.

Finally: Although I have described my invention and its parent in detail—the disclosures of which interrelate and commingle—so as to complement and reinforce one another—and have specified numerous particular examples and various combinations, and have proposed various explanations, it is to be understood that these are not binding nor exchaustive. Rather, they are intended for the assistance of others skilled in the art to enable them more easily to apply my invention—together with the parent invention—under widely varying conditions encountered or desired in actual practice and to change and modify the particular embodiments and examples herein set out as may be necessary or desirable under such varying conditions.

The theoretical statements and explanations of working principles, which to my best understanding are correct, are of course not necessarily conclusive and my invention is in no way dependent upon their correctness, particularly in view of the absence of knowledge in the ultrahigh power optical energy domain. I have found them helpful and have based them wherever possible upon the best knowledge of the physical sciences (which knowledge I have extensively searched out in the literature) and give them for the aid of others, but my invention will be equally useful should it prove that these explanations and conclusions are not altogether correct.

I claim:

1. In combination with an irradiable target characterized as sensitive to the kinetic energies of an explosion, for the irradiation of said target with reflectable electromagnetic radiations, the system which comprises:
   a. an enclosed main duct emplaced underground, said duct having two end parts;
   b. a firable explosive positioned within a first end part of the said main duct, said explosive characterized as generating reflectable electromagnetic radiations and kinetic energies of different velocities;
   c. a secondary, branching duct joined with the main duct between the two end parts;
   d. a frangible reflective optic angularly sited within the main duct to reflect reflectable electromagnetic radiations into the said branching duct;
   e. and an irradiable target reflectively coupled to the said frangible reflective optic through the branching duct; such that upon the firing of the said firable explosive reflectable electromagnetic radiations strike the frangible reflective optic and reflectively couple with the said irradiable target and the non-reflectable energy breaks through the said optic and deposits within the said second send part of the main duct, so that the target is irradiated.

2. The combination as set forth in claim 1, wherein the said firable explosive is a nuclear explosive.

3. The combination as set forth in claim 1, wherein the said firable explosive is a chemical explosive.

4. The combination as set forth in claim 1, wherein the said branching duct joined with the main duct between the two said end parts subtends by less than 90° in the direction of the said first end part of the main duct having positioned therein the firable explosive.

5. The combination as set forth in claim 4, wherein the said firable explosive is nuclear explosive.

6. In a branched underground tunnel system for nuclear explosive light generation a destructible reflective member optically coupled at a first angle with a nuclear explosive source of light and optically coupled at a second angle with a tunnel branching in communication with an irradiable target, the said second angle characterized as being different from the said first angle; and a receptable arranged at a third angle, said third angle characterized as being different from the said second angle, so that upon explosion of the said nuclear explosive source of light there is generated reflectable rays togethers with non-reflectable rays, the said reflectable rays having a velocity greater than the velocity of the said non-reflectable rays, such that the reflectable rays strike the reflective member before the non-reflectable rays and reflect at the first angle from the said member into the second angle and into the said irradiable target, and thereafter the non-reflectable rays strike the destructible reflective member to destroy the member with the non-reflectable rays and the debris from the destroyed member being carried into the said receptacle.

7. In a branched underground tunnel system for nuclear explosive light generation as set forth in claim 6, wherein the said second angle is approximately 90° with respect to the said first angle.

8. In a branched underground tunnel system for nuclear explosive light generation as set forth in claim 6, wherein the said second angle is less than 90° with respect to the said first angle.

9. In a branched underground tunnel system for nuclear explosive light generation as set forth in claim 6, wherein the said second angle is more than 90° with respect to the said first angle.

10. In a branched underground tunnel system for nuclear explosive light generation as set forth in claim 6, wherein a single nuclear explosive source of light at a common first angle is optically coupled with at least two of the said second angle tunnel branchings.

11. An underground nuclear device for the separation of the reflectable electromagnetic radiation from the non-reflectable energy of a contained nuclear explosion, wherein the said reflectable electromagnetic radiation has a velocity greater than that of the non-reflectable energy, which comprises:
   a. a substantially straight containment tunnel underground;
   b. at least one side-arm duct joining the said tunnel at a right angle between the closed ends of the said tunnel;
   c. a nuclear explosive device set at one of the ends of the tunnel, said nuclear device characterized as generating reflectable electromagnetic radiation together with non-reflectable energy of faster and slower velocities;
   d. actuation means for the firing of the said nuclear device;
   e. a frangible reflective optic at the said joining of the tunnel and the side-arm duct, said optic being in a common coupling with the tunnel and the side-arm duct at approximately one-half of a right angle with respect to the tunnel and the duct;
   f. an irradiable target sited within the said side-arm duct adapted to receive the said reflectable electromagnetic radiation from the said optic moving faster than the said non-reflectable energy;
   g. and a second end receptacle part of the said tunnel adapted to depose of the slower non-reflectable energy from the explosion of the nuclear device.

12. An underground optoexplosive device for the separation of the reflectable electromagnetic radiation from the non-reflectable energy of a contained explosion, wherein the said reflectable electromagnetic radiation is characterized as having a velocity greater than the said non-reflectable energy of the explosion, which comprises:
   a. a substantially linear tunnel situated underground, said tunnel having two ends at least one of which ends is closed;

b. an explosive energy source contained within the said tunnel at one of the said ends;

c. explosive energy source firing means in communication with the said explosive energy source;

d. at least one first side-arm duct having a closed end, the said first duct joining the said tunnel between the ends thereof at an angle less than a right angle in the direction of the end of the tunnel containing the said explosive energy source;

e. at least one second side-arm duct angularly joining the first side-arm duct between the closed end and the first joining thereof;

f. a series of frangible reflective optics positioned at an angle at the joinings of the said tunnel and the said side-arm ducts, said angle adapted to the common axes of the tunnel and the ducts;

g. an irradiable target optically coupled to the said series of frangible reflective optics through the ducts and tunnel;

h. and closed end portions of the tunnel and ducts adapted to receive the said non-reflectable energy from the explosion of the explosive source upon the firing thereof.

13. An underground optoexplosive device as set forth in claim 12, wherein the said first side-arm duct is sealed off underground and the said irradiable target carried within the said second side-arm duct is sealed off therein.

14. An underground optoexplosive system as set forth in claim 12, wherein the said explosive energy source is a nuclear explosive device.

15. An underground optoexplosive device as set forth in claim 12, wherein the said explosive energy source is a chemical explosive device.

16. An underground explotron for the separation of the faster moving reflectable electromagnetic radiation from the slower moving non-reflectable energy of an explosion, for the treatment of an irradiable target with refelectable radiation, the system which comprises:

a. an underground main tunnel having closed ends;

b. a firable explosive device positioned within the said main tunnel between the said closed ends;

c. at least two branching pipes joining the said main tunnel between the closed ends and on each side of the said explosive device;

d. an angular conjoinment of the ends opposite the closed ends of the said pipes so as to form a common chamber;

e. at least two frangible reflective optics emplaced at the joinings of the said pipes and the main tunnel, such that there is an optical coupling of the said explosive device with the said common chamber through the main tunnel and pipes;

f. and an irradiable target in optical communication with the common chamber; such that upon firing the said firable explosive device the faster moving reflectable electromagnetic radiation first reflects into the irradiable target and the slower moving non-reflectable energy breaks through the said frangible reflective optic and passes into the closed ends of the main tunnel.

17. The underground explotron as set forth in claim 16, wherein the firable explosive device includes a chemical explosive agent.

18. The underground explotron as set forth in claim 16, wherein the firable explosive device includes a nuclear explosive agent.

19. The combination in an underground optoexplosive system for the time controlled treatment of an irradiable target with explosion energy which comprises:

a. a main tunnel section positioned underground;

b. a firable explosion energy source sited within the said main tunnel section including a branching upper leg and a branching lower leg, the said legs being conduits and branching in a substantially common axis with respect to one another from the site of the said explosion energy source sited within the tunnel;

c. a controllably impellable piston movably emplaced within the said upper leg;

d. a passageway for the piston in the upper leg through the site of the explosion energy source;

e. a lower leg adapted to receive the said impellable piston upon movement from the upper leg and the traversing thereof of the said passageway in the tunnel section containing the explosion energy source;

f. and means for the time controlled release of the piston in the upper leg;

such that upon the firing of the explosion energy source into a live explosion the release of the said piston and its traversing of the said site diverts a part of the explosion into the said lower leg while the non-diverted part of the explosion enters the main tunnel section.

20. The combination of an underground optoexplosive system for the time controlled treatment of an irradiable target with explosion energy as set forth in claim 19, wherein the release of the piston is by mechanical release.

21. The combination of an underground optoexplosive system for the time controlled treatment of an irradiable target with explosion energy as set forth in claim 19, wherein the release of the piston includes the application of explosive force to the piston.

22. The combination in an underground optoexplosive system for the time controlled treatment of an irradiable target with explosion energy which comprises:

a. a main tunnel section positioned underground;

b. a firable explosion energy source sited within the said main tunnel section including a branching upper leg and a branching lower leg, the said legs being conduits and branching in a substantially common axis with respect to one another from the site of the said explosion energy source sited within the tunnel;

c. a secondary source of explosion energy firably emplaced within the said upper leg;

d. a passageway between the site of the said firable explosion energy source in the main tunnel section and the said upper leg;

e. a lower leg adapted to receive energy from the said secondary source of explosion energy firably emplaced within the said upper leg;

f. and means for the time controlled firing of the said secondary explosion energy source;

such that upon the firing of the firable explosion energy source into a live explosion the release of energy from the said secondary source traverses the site of the firable explosion energy source and diverts a part of the explosion thereof into the lower leg while the non-diverted part of the explosion enters the main tunnel section.

23. The combination in an underground optoexplosive system for the time controlled treatment of an irradiable target with explosion energy as set forth in claim 22, wherein the said secondary source of explosion energy is a shaped charge.

24. The combination in an underground optoexplosive system for the time controlled treatment of an irradiable target with explosion energy as set forth in claim 22, wherein the said secondary source of explosion energy includes chemical explosive.

25. The combination in an underground optoexplosive system for the time controlled treatment of an irradiable target with explosion energy as set forth in claim 22, wherein the said secondary source of explosion energy includes nuclear explosive.

* * * * *